(12) United States Patent
Li et al.

(10) Patent No.: US 11,341,422 B2
(45) Date of Patent: May 24, 2022

(54) MULTI-ROUND QUESTIONING AND ANSWERING METHODS, METHODS FOR GENERATING A MULTI-ROUND QUESTIONING AND ANSWERING SYSTEM, AND METHODS FOR MODIFYING THE SYSTEM

(71) Applicant: Shanghai Xiaoi Robot Technology Co., Ltd., Shanghai (CN)

(72) Inventors: Bo Li, Shanghai (CN); Zhongqiu Jiang, Shanghai (CN); Yongmei Zeng, Shanghai (CN); Pinpin Zhu, Shanghai (CN)

(73) Assignee: SHANGHAI XIAOI ROBOT TECHNOLOGY CO., LTD., Shanghai (CN)

( * ) Notice: Subject to any disclaimer, the term of this patent is extended or adjusted under 35 U.S.C. 154(b) by 921 days.

(21) Appl. No.: 16/106,680

(22) Filed: Aug. 21, 2018

(65) Prior Publication Data
US 2019/0188585 A1    Jun. 20, 2019

(30) Foreign Application Priority Data

Dec. 15, 2017  (CN) .......................... 201711346197.4
Dec. 15, 2017  (CN) .......................... 201711346210.6
(Continued)

(51) Int. Cl.
G06N 5/04  (2006.01)
G06N 5/02  (2006.01)
G06N 5/00  (2006.01)

(52) U.S. Cl.
CPC ............. *G06N 5/043* (2013.01); *G06N 5/003* (2013.01); *G06N 5/022* (2013.01); *G06N 5/027* (2013.01)

(58) Field of Classification Search
None
See application file for complete search history.

(56) References Cited

U.S. PATENT DOCUMENTS

2014/0201707 A1  7/2014  Schroeder
2015/0095849 A1  4/2015  Danton et al.
(Continued)

FOREIGN PATENT DOCUMENTS

CN    101650797 A    2/2010
CN    101739434 A    6/2010
(Continued)

OTHER PUBLICATIONS

Galitsky et al., Chatbot with a Discourse Structure-Driven Dialogue Management, Proceedings of the EACL 2017 Software Demonstrations, Valencia, Spain, Apr. 3-7, 2017, pp. 87-90 (Year: 2017).*
(Continued)

*Primary Examiner* — Alan Chen
(74) *Attorney, Agent, or Firm* — Flener IP & Business Law; Zareefa B. Flener

(57) ABSTRACT

The present invention provides a multi-round questioning and answering method, a method for generating a multi-round questioning and answering system and a method for modifying a multi-round questioning and answering system. The multi-round questioning and answering method includes: acquisition initial request information, and matching the initial request information with a knowledge point in a knowledge base; if it is determined that the initial request information matches with a thematic question in a thematic knowledge point, triggering a root node of a multi-round questioning and answering flow module corresponding to the thematic knowledge point; and, performing, according to a first interaction node to which the multi-round questioning and answering flow module is proceeded currently, one or more knowledge points corresponding to the first interaction
(Continued)

node stored in the knowledge base and user interaction information input by an interactive user, questioning and answering interaction with the interactive user.

20 Claims, 20 Drawing Sheets

(30) Foreign Application Priority Data

| Dec. 15, 2017 | (CN) | 201711346368.3 |
| Dec. 15, 2017 | (CN) | 201711346369.8 |
| Dec. 15, 2017 | (CN) | 201711346376.8 |
| Dec. 15, 2017 | (CN) | 201711346539.2 |
| Dec. 25, 2017 | (CN) | 201711419779.0 |
| Dec. 25, 2017 | (CN) | 201711419805.X |
| Dec. 25, 2017 | (CN) | 201711421595.8 |
| Dec. 25, 2017 | (CN) | 201711421670.0 |

(56) References Cited

U.S. PATENT DOCUMENTS

| 2017/0206241 | A1 | 7/2017 | Beller et al. | |
| 2019/0065625 | A1* | 2/2019 | Shinn | G06F 16/9024 |
| 2020/0380214 | A1* | 12/2020 | Galitsky | G06K 9/6201 |

FOREIGN PATENT DOCUMENTS

| CN | 105051761 | A | 11/2015 |
| CN | 105589844 | A | 5/2016 |
| CN | 105739954 | A | 7/2016 |
| CN | 105893524 | A | 8/2016 |
| CN | 105912600 | A | 8/2016 |
| CN | 105931638 | A | 9/2016 |
| CN | 105975286 | A | 9/2016 |
| CN | 106202270 | A | 12/2016 |
| CN | 106294341 | A | 1/2017 |
| CN | 106503242 | A | 3/2017 |
| CN | 106776649 | A | 5/2017 |
| EP | 2691876 | A2 | 10/2012 |

OTHER PUBLICATIONS

A man-machine interaction software-robot for E-commerce order human-like real-tmie processing, Zhichao Xu, et al. Journal of Harbin Institute of Technology, Feb. 28, 2006, 274-278, Volume-Issue No. vol. 38(2), Harbin Institute of Technology, China.
Stateflow logic system modeling, Wei, Zhang, Oct. 31, 2007, 225-233, Zidian University, China.
Intelligent Customer Service Robot, Pingping, Ren, Aug. 31, 2017, pp. 155-156, Chengdu Times Press, China.
The State Intellectual Property Office of People's Republic of China, First Office Action, Application No. 201711346539.2, Method, terminal device and storage medium for modifying multi-turn question answering system, Date of filing, Dec. 15, 2017.
The State Intellectual Property Office of People's Republic of China, First Office Action, Application No. 201711346369.8, Multi-wheeled question answering device, Date of filing Dec. 15, 2017.
The State Intellectual Property Office of People's Republic of China, Notification to Grant Patent Right for Invention, Application No. 201711346368.3, Apparatus for modifying multi-turn question answering system.
The State Intellectual Property Office of People's Republic of China, First Office Action, Application No. 201711346210.6, Generation method of multi-round question-answering system, equipment, medium, and multi-round question-answering system, Date of filing Dec. 15, 2017.
The State Intellectual Property Office of People's Republic of China, First Office Action, Application No. 201711346197.4, Multi-round question answering method, terminal device and storage medium, Date of Filing Dec. 15, 2017.

* cited by examiner

MULTI-ROUND QUESTIONING AND ANSWERING METHODS, METHODS FOR GENERATING A MULTI-ROUND QUESTIONING AND ANSWERING SYSTEM, AND METHODS FOR MODIFYING THE SYSTEM

CROSS-REFERENCE TO RELATED APPLICATIONS

This application claims priority to CN Patent Application No. 201711346210.6, filed on Dec. 15, 2017, CN Patent Application No. 201711346197.4, filed on Dec. 15, 2017, CN Patent Application No. 201711346376.8, filed on Dec. 15, 2017, CN Patent Application No. 201711346369.8, filed on Dec. 15, 2017, CN Patent Application No. 201711346539.2, filed on Dec. 15, 2017, CN Patent Application No. 201711346368.3, filed on Dec. 15, 2017, CN Patent Application No. 201711419805.X, filed on Dec. 25, 2017, CN Patent Application No. 201711421595.8, filed on Dec. 25, 2017, CN Patent Application No. 201711421670.0, filed on Dec. 25, 2017 and CN Patent Application No. 201711419779.0, filed on Dec. 25, 2017. All of the aforementioned applications are hereby incorporated by reference in their entireties.

TECHNICAL FIELD

The present invention relates to the technical field of intelligent questioning and answering, and in particular to a multi-round questioning and answering method, a method for generating a multi-round questioning and answering system and a method for modifying a multi-round questioning and answering system.

BACKGROUND

The human-machine interaction is a science that studies an interactive relationship between systems and users. The systems may be various machines, or may be computerized systems and software. For example, various artificial intelligence (AI) systems (intelligent customer-service systems, voice control systems, etc.) can be realized by the human-machine interaction. AI semantic recognition is the basis of the human-machine interaction. By the AI semantic recognition, a human language can be recognized and converted into a machine-understandable language.

Intelligent questioning and answering systems are one typical application of the human-machine interaction. When a user raises a question, the intelligent questioning and answering system provides an answer to this question. As one of very important intelligent questioning and answering systems, a multi-round questioning and answering system often needs to perform multiple rounds of questioning and answering interaction with the user. Meanwhile, feedback information to be provided to the user in the next round of questioning and answering is determined according to the interaction content input by the user in a certain round of questioning and answering. Correspondingly, one multi-round questioning and answering system usually corresponds to one multi-round questioning and answering flow. From a root node in a multi-round questioning and answering flow, a next proceeding trend for the whole multi-round questioning and answering flow is continuously determined according to user interaction information received on multiple interaction nodes (decision nodes) until the arrival of the final node as expected. Then, the whole multi-round questioning and answering flow is completed.

With the continuous improvement of technology, people's demands for the multi-round questioning and answering systems and requirements on questioning and answering in the multi-round systems are increased. Existing multi-round questioning and answering technologies already cannot satisfy people's increasing questioning and answering demands for personalization and facilitation.

SUMMARY

In view of this, embodiments of the present invention are aimed at providing a multi-round questioning and answering method, a method for generating a multi-round questioning and answering system and a method for modifying a multi-round questioning and answering system, in order to optimize the existing multi-round questioning and answering methods based on multi-round questioning and answering systems and improve the efficiency and accuracy of the multiple rounds of questioning and answering interaction.

According to one aspect of the present invention, an embodiment of the present invention provides a multi-round questioning and answering method, applied to a multi-round questioning and answering system, including steps of: acquiring initial request information input by an interactive user, and matching the initial request information with a knowledge point in a knowledge base, wherein the knowledge base includes multiple knowledge points and each knowledge point includes a question and an answer; if it is determined that the initial request information input by the interactive user matches with a thematic question in a thematic knowledge point, triggering, according to a thematic answer in the thematic knowledge point, a root node of a multi-round questioning and answering flow module corresponding to the thematic knowledge point, the multi-round questioning and answering flow module comprising multiple layers of interaction nodes; and, performing questioning and answering interaction with the interactive user according to a first interaction node to which the multi-round questioning and answering flow module is proceeded currently, one or more knowledge points corresponding to the first interaction node stored in the knowledge base and user interaction information input for the first interaction node by the interactive user.

According another aspect of the present invention, an embodiment of the present invention provides a method for generating a multi-round questioning and answering system which executes the multi-round questioning and answering method described above, including steps of: acquiring one or more graphic multi-round questioning and answering flowcharts; generating, according to graphic components contained in each of the multi-round questioning and answering flowcharts, a standardized code framework matching with the multi-round questioning and answering flowchart, wherein each of the graphic components includes multiple interaction nodes; generating, according to custom configuration information matching with the graphic components in the multi-round questioning and answering flowcharts, custom codes corresponding to the graphic components, and adding the custom codes at positions associated with the graphic components in the standardized code frameworks to generate multi-round questioning and answering flow modules corresponding to the multi-round questioning and answering flowcharts; establishing a correspondence between each of the interaction nodes and one or more knowledge points in a knowledge base, a knowledge point corresponding to the interaction node including an interaction question used for being compared with the received user interaction information and an interaction answer used for determining a next proceeding trend for the multi-round questioning and answering flow modules; and, adding, in the knowledge base, a thematic knowledge point corresponding to each of the multi-round questioning and answering flow modules, the thematic knowledge point including a thematic question used for representing a trigger condition for the multi-round questioning and answering flow module and a thematic answer used for establishing a trigger relationship between the thematic knowledge point and the multi-round questioning and answering flow module.

According to another aspect of the present invention, an embodiment of the present invention provides a method for modifying a multi-round questioning and answering system, the multi-round questioning and answering system to be modified executing the multi-round questioning and answering method described above, including steps of: acquiring modification information for set system components in the multi-round questioning and answering system, wherein the modification information includes any one or any combination of the following: modifying a thematic knowledge point corresponding to the multi-round questioning and answering system, modifying a multi-round questioning and answering flow module corresponding to the multi-round questioning and answering system, and modifying knowledge points corresponding to a set interaction node in the multi-round questioning and answering flow module; and, correspondingly updating the multi-round questioning and answering system according to the modification information.

In the multi-round questioning and answering method applied to a multi-round questioning and answering system in the embodiments of the present invention, by acquiring initial request information and matching the initial request information with a knowledge point in a knowledge base, triggering a root node of a multi-round questioning and answering flow module corresponding to a thematic knowledge point if it is determined that the initial request information matches with a thematic question in the thematic knowledge point, and performing questioning and answering interaction with the interactive user according to a first interaction node to which the multi-round questioning and answering flow module is proceeded currently, one or more knowledge points corresponding to the first interaction node stored in the knowledge base and user interaction information input for the first interaction node by an interactive user, specific implementations of performing multiple rounds of questioning and answering interaction with a user based on the multi-round questioning and answering system are provided. Interactive users' demands for multiple rounds of questioning and answering interaction are greatly satisfied, and the efficiency and accuracy of the multiple rounds of questioning and answering interaction are improved.

DETAILED DESCRIPTION

Figure 1A:
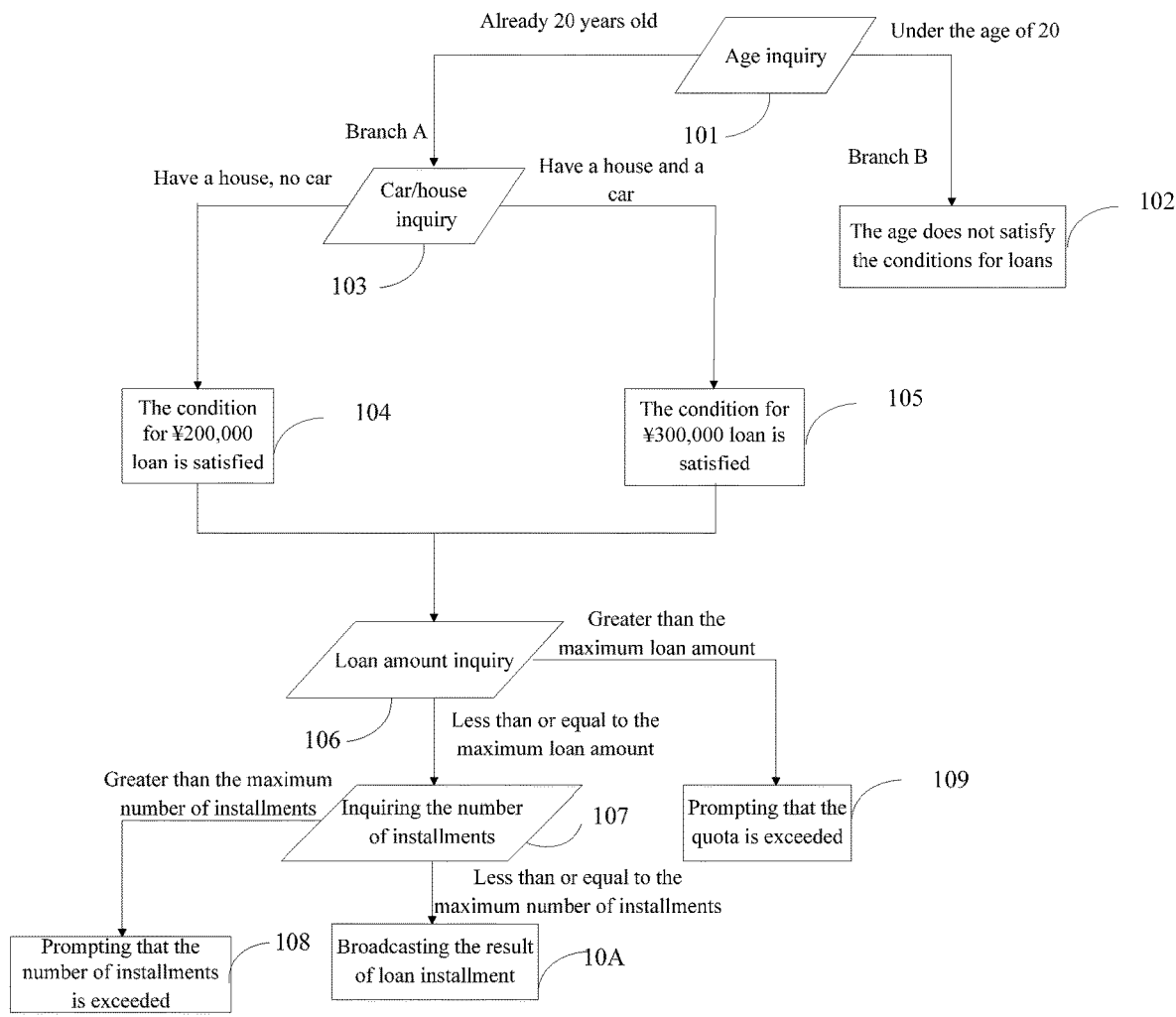
FIG. 1a is a schematic diagram of a graphic multi-round questioning and answering flowchart according to an embodiment of the present invention.

The technical solutions in the embodiments of the present invention will be clearly and completely described as below with reference to the accompanying drawings in the embodiments of the present invention. Apparently, the described embodiments are only some, not all of, the embodiments of the present invention. All other embodiments obtained by a person of ordinary skill in the art based on the embodiments of the present invention without paying any creative effort shall fall into the protection scope of the present invention.

In addition, it is to be noted that, for ease of description, only some but not all of the contents related to the present invention are shown in the accompanying drawings. Before the discussion on exemplary embodiments in more detail, it should be mentioned that some exemplary embodiments are described as processes or methods in form of flowcharts. Although various operations (or steps) are described as being performed sequentially in the flowcharts, many operations may be implemented in parallel, concurrently or simultaneously. In addition, the order of the operations may be rearranged. The process may be terminated when its operations have been completed; however, it is also possible that there are additional steps not shown in the accompanying drawings. The process may correspond to methods, functions, procedures, subroutines, subprograms or the like.

To easily understand the content of the embodiments of the present invention, the related concepts of the questioning and answering knowledge points and the semantic expressions in the multi-round questioning and answering will be briefly described below.

1. Questioning and Answering Knowledge Points

The most original and simplest form of questioning and answering knowledge points in a knowledge base is the commonly used FAQ, and the general form of the questioning and answering knowledge points is "question-answer" pairs. For example, "the charge for the ring-back tone" is a clearly expressed standard question description. Here, the "question" should not be narrowly interpreted as an "inquiry", and instead, it should be broadly interpreted as an "input" which has a corresponding "output". For example, for the semantic recognition in a control system, a user's instruction, for example, "Turn on the radio", should also be interpreted as a "question". In this case, the corresponding "answer" may be invocation of a control program for executing the corresponding control.

When a user inputs a standard question to a machine, ideally, an intelligent semantic recognition system of the machine can immediately understand the user's intention. However, users often input some variants of a standard question, instead of the standard question. For example, if the standard question for the switchover between broadcasting stations of the radio is "change a broadcasting station", a user's command may be "switch a broadcasting station", then the machine is expected to recognize that the two expressions have the same meaning.

For the intelligent semantic recognition, extended questions of a standard question need to be contained in the knowledge base. The extended questions are slightly different from the standard question in expression form, but have the same meaning as the standard question.

Therefore, the knowledge base includes multiple questioning and answering knowledge points each including a question and an answer. The question includes a standard question and multiple extended questions. The questions in the questioning and answering knowledge points are generally presented in form of semantic expressions.

2. Semantic Expression

A semantic expression mainly consists of words, the part of speech, and the "or" relationship therebetween, and mainly depends upon the "part of speech". The part of speech is simply interpreted as a group of words having something in common. These words may be semantically similar or dissimilar, and these words may also be marked as important or unimportant. The relationship between the semantic expression and the user's question is quite different from the conventional template matching. In the conventional template matching, there is only a matched or unmatched relationship between a template and the user's question. However, the relationship between the semantic expression and the user's question is expressed by a quantified value (similarity), and the quantified value can be compared with the similarity between a similar question and the user's question. Since the semantic expression, together with the similar question, will be involved in the calculation of the similarity, the template syntax should not be defined complicatedly, but must be competent to express the semantics.

In addition, in the embodiments of the present invention, a multi-round questioning and answering method for a set multi-round questioning and answering system is provided, wherein the multi-round questioning and answering system specifically includes:

a multi-round questioning and answering flow module corresponding to a multi-round questioning and answering flowchart, the multi-round questioning and answering flowchart including multiple graphic components, each of the graphic components including multiple interaction nodes;

one or more knowledge points stored in a knowledge base and corresponding to each of the interaction nodes in the multi-round questioning and answering flowchart, the knowledge point corresponding to the interaction node including an interaction question used for being compared with the received user interaction information and an interaction answer used for determining a next proceeding trend for the multi-round questioning and answering flow module; and a thematic knowledge point stored in the knowledge base, the thematic knowledge point including a thematic question and a thematic answer, wherein the thematic question is used for representing a trigger condition for the multi-round questioning and answering flow module matching with the multi-round questioning and answering system and the thematic answer is used for establishing a trigger relationship between the thematic knowledge point and the multi-round questioning and answering flow module.

Figure 2:
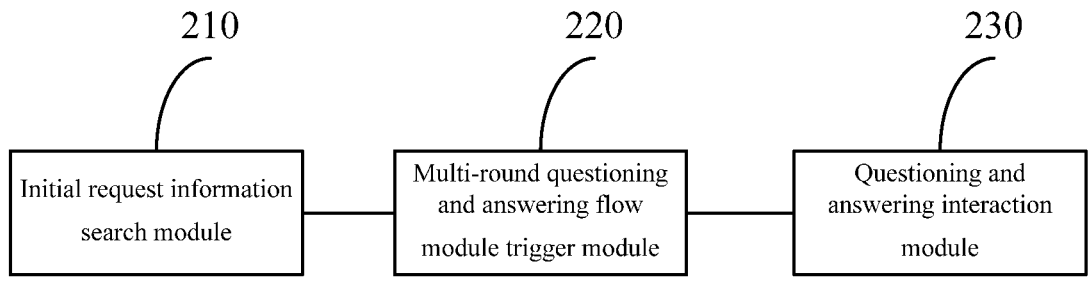
FIG. 2 is a schematic structure diagram of a multi-round questioning and answering device according to an embodiment of the present invention.

FIG. 2 is a schematic structure diagram of a multi-round questioning and answering device according to an embodiment of the present invention. As shown in FIG. 2, the multi-round questioning and answering device in this embodiment is based on the multi-round questioning and answering system. This embodiment is suitable for realizing multiple rounds of questioning and answering interaction with an interactive user. The device may be implemented by a multi-round questioning and answering device based on the multi-round questioning and answering system. The device may be implemented by software and/or hardware, which 105 for indicating that generally be integrated into a special interaction apparatus (e.g., an intelligent robot) with an interaction function or a general terminal apparatus (e.g., a mobile phone, a tablet computer, etc.) installed with interactive software (e.g., voice assistant). The device specifically includes an initial request information search module 210, a multi-round questioning and answering flow module trigger module 220 and a questioning and answering interaction module 230.

The initial request information search module 210 is configured to acquire initial request information input by an interactive user and match the initial request information with a knowledge point in a knowledge base, wherein the knowledge base includes multiple knowledge points and each knowledge point includes a question and an answer.

In this embodiment, the knowledge points stored in the knowledge base include: questioning and answering knowledge points, thematic knowledge points, and knowledge points corresponding to interaction nodes (i.e., interaction knowledge points). The related concepts of the knowledge points have been described above in detail and will not be repeated here.

The multi-round questioning and answering flow module trigger module 220 is configured to: if it is determined that the initial request information input by the interactive user matches with a thematic question in a thematic knowledge point, trigger, according to a thematic answer in the thematic knowledge point, a root node of a multi-round questioning and answering flow module corresponding to the thematic knowledge point, the multi-round questioning and answering flow module including multiple layers of interaction nodes.

In this embodiment, information capable of accurately positioning the corresponding multi-round questioning and answering flow module is stored in the thematic answer in the thematic knowledge point. After it is determined that the initial request information input by the interactive user matches with a thematic question in a thematic knowledge point, the multi-round questioning and answering flow module matched can be accurately positioned, and a root node of this multi-round questioning and answering flow module is correspondingly triggered, that is, the multi-round questioning and answering flow module is activated to perform questioning and answering interaction with the interactive user.

The questioning and answering interaction module 230 is configured to perform questioning and answering interaction with the interactive user according to a first interaction node to which the multi-round questioning and answering flow module is proceeded currently, one or more knowledge points corresponding to the first interaction node stored in the knowledge base and user interaction information input for the first interaction node by the interactive user.

As described above, a multi-round questioning and answering flow module includes multiple layers of interaction nodes, each layer of interaction nodes includes one or more interaction nodes, and the root node belongs to the first layer of interaction nodes. When the multi-round questioning and answering flow module is proceeded to an interaction node, user interaction information input based on this interaction node by the interactive user is compared with one or more knowledge points corresponding to this node in the knowledge base, and a next proceeding trend for the multi-round questioning and answering flow module is determined according to the corresponding result of matching.

In the multi-round questioning and answering device applied to a multi-round questioning and answering system in this embodiment of the present invention, by acquiring initial request information and matching the initial request information with a knowledge point in a knowledge base, triggering a root node of a multi-round questioning and answering flow module corresponding to a thematic knowledge point if it is determined that the initial request information matches with a thematic question in the thematic knowledge point, and performing questioning and answering interaction with the interactive user according to a first interaction node to which the multi-round questioning and answering flow module is proceeded currently, one or more knowledge points corresponding to the first interaction node stored in the knowledge base and user interaction information input for the first interaction node by an interactive user, specific implementations of performing multiple rounds of questioning and answering interaction with a user based on the multi-round questioning and answering system are provided. Interactive users' demands for multiple rounds of questioning and answering interaction are greatly satisfied, and the efficiency and accuracy of the multiple rounds of questioning and answering interaction are improved.

Figure 3:
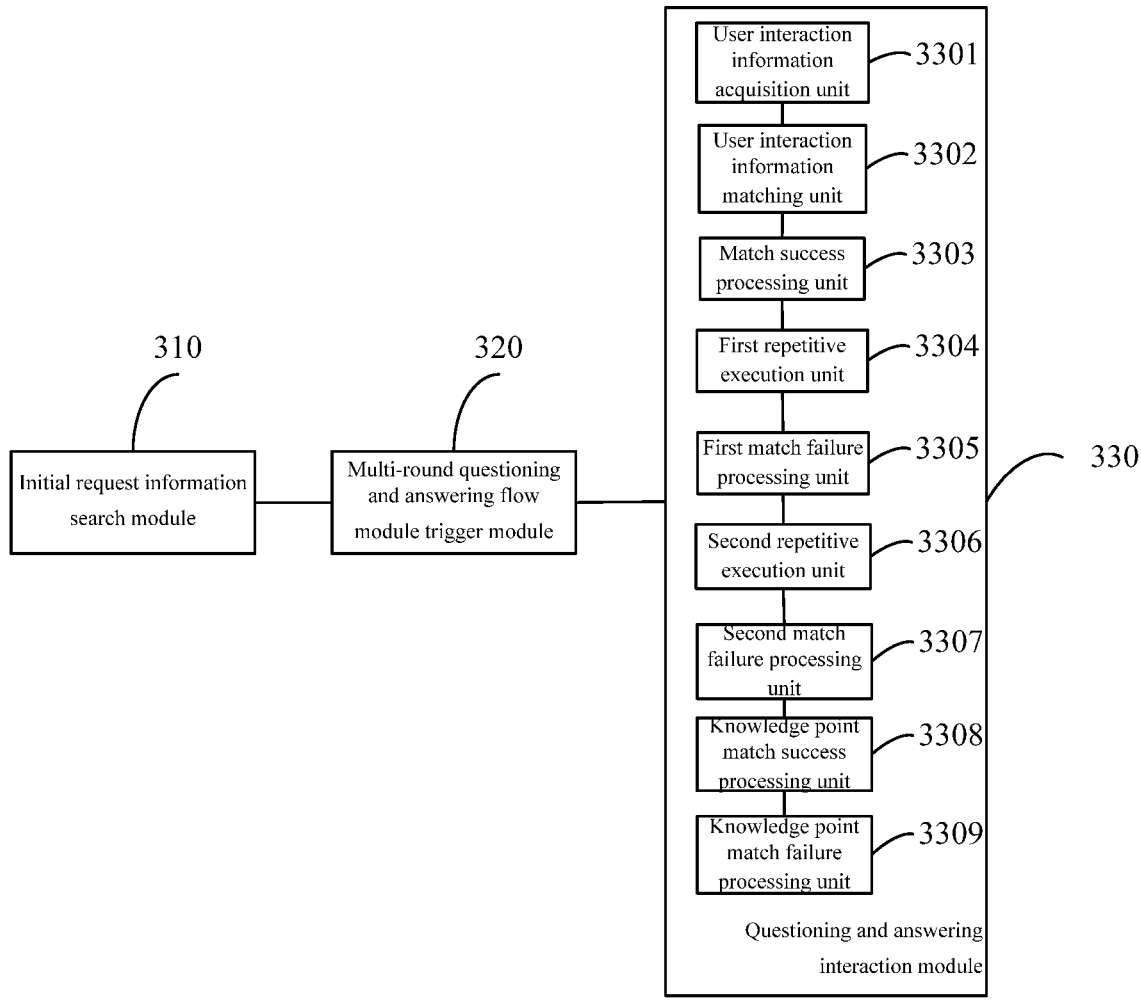
FIG. 3 is a schematic structure diagram of the multi-round questioning and answering device according to another embodiment of the present invention.

FIG. 3 is a schematic structure diagram of the multi-round questioning and answering device according to another embodiment of the present invention. As shown in FIG. 3, this embodiment is optimized based on the above embodiment. In this embodiment, the questioning and answering interaction module is further subdivided. Correspondingly, the device in this embodiment of the present invention includes:

an initial request information search module 310, a multi-round questioning and answering flow module trigger module 320 and questioning and answering interaction module 330, wherein the questioning and answering interaction module 330 specifically includes:

a user interaction information acquisition unit 3301 configured to acquire user interaction information input for the first interaction node by the user; a user interaction information matching unit 3302 configured to match the user interaction information with an interaction question in one or more knowledge points corresponding to the first interaction node; and, a match success processing unit 3303 configured to return the interaction answer corresponding to the successfully matched knowledge point to the multi-round questioning and answering flow module if the user interaction information successfully matches with an interaction question in one or more knowledge points corresponding to the first interaction node, so that the multi-round questioning and answering flow module determines a next proceeding trend.

In this embodiment, if the user interaction information input by the interactive user matches a knowledge point corresponding to the currently flowed interaction node, after the multi-round questioning and answering flow module acquires the interaction answer returned by the knowledge base, a next proceeding trend for the whole multi-round questioning and answering flow module can be determined according to the configured dynamic trigger condition and a connector matching with the interaction answer.

The questioning and answering interaction module 330 further includes a first repetitive execution unit 3304 configured to repeat a process of matching and determining a next proceeding trend until the multi-round questioning and answering flow module ends or the interaction ends.

In this embodiment, the first repetitive execution unit 3304 first determines whether to exit the multi-round questioning and answering flow module or end the interaction; if so, the interaction ends; and, if not, performs questioning and answering interaction with the interactive user according to a node corresponding to the next proceeding trend.

In this embodiment, for ease of statement, the process of determining whether to exit the multi-round questioning and answering flow module or end the interaction is performed after the match success processing unit 3303. Actually, the interactive user can exit the multi-round questioning and answering flow module when the multi-round questioning and answering flow module is proceeded to any node. Therefore, the decision process may be performed independently from and in parallel to the modules in this embodiment of the present invention. In this embodiment, the time when the decision process is performed is not limited.

In this embodiment, if the node corresponding to the next proceeding trend is an interaction node, an execution of the questioning and answering interaction module 330 will be triggered repetitively; if the node corresponding to the next proceeding trend is a broadcast node which is not a termination node, the corresponding broadcast content will be correspondingly broadcast, and the multi-round questioning and answering flow module is proceeded, according to a next proceeding trend uniquely determined by the broadcast node, to a next node determined by the broadcast node to perform questioning and answering interaction with the interactive user (for example, in FIG. 1a, both a node 104 for indicating that the condition for ¥200,000 loan is satisfied and a node 105 for indicating that the condition for ¥300,000 loan is satisfied uniquely point to a loan amount inquiry node 106); and, if the node corresponding to the next proceeding trend is a broadcast node which is a termination node, the corresponding broadcast content will be correspondingly broadcast, and the interaction with the interactive user ends.

In this embodiment, when it is determined that the user interaction information does not match with all of the one or more knowledge points corresponding to the first interaction node, the process may be performed by different flow processing methods according to the preconfigured custom configuration parameters of different types corresponding to the first interaction node.

Further, the questioning and answering interaction module 330 may also include:

a first match failure processing unit 3305 configured to provide a rejection response to the interactive user and request the interactive user to input user interaction information for the first interaction node again, if the user interaction information does not match with all of the one or more knowledge points corresponding to the first interaction node and a rejection-preferred function is activated on the first interaction node.

In this embodiment, if the rejection-preferred function is activated on the first interaction node, it is only necessary to match an interaction question in the preconfigured knowledge point corresponding to the first interaction node with the user interaction information; and, if the interaction question in the preconfigured knowledge point corresponding to the first interaction node does not match with the user interaction information, the recognition will be rejected, and the interactive user is requested to re-input the user interaction information for matching again.

The questioning and answering interaction module 330 further includes a second repetitive execution unit 3306 configured to trigger the user interaction information matching unit to perform an execution again upon acquiring new user interaction information.

Further, the questioning and answering interaction module 330 may also include:

a second match failure processing unit 3307 configured to globally search the received user interaction information in the knowledge base, if the user interaction information does not match with all of the one or more knowledge points corresponding to the first interaction node and a knowledge-preferred function is activated on the first interaction node.

In this embodiment, if a knowledge-preferred function is activated on the first interaction node, when an interaction question in a knowledge point corresponding to the first interaction node does not match with the user interaction information, other knowledge points contained in the knowledge base will be compared with the user interaction information, and the corresponding result of matching will be fed back.

The questioning and answering interaction module 330 further includes a knowledge point match success processing unit 3308 configured to provide the interactive user with an answer corresponding to the knowledge point searched if it is determined that the knowledge base includes a knowledge point in which a question matches with the user interaction information, wherein the knowledge point searched may be a general questioning and answering knowledge point. After the answer corresponding to the questioning and answering knowledge point is provided to the interactive user, the triggered state of the current interaction node (the first interaction node) in the multi-round questioning and answering system can be continuously maintained, and the user interaction information input for the first interaction node by the interactive user is continuously acquired for matching.

Further, the knowledge point match success processing unit 3308 specifically includes: a multi-round questioning and answering flow module trigger termination subunit configured to terminate the triggered state of the current multi-round questioning and answering flow module if it is determined that the knowledge point searched is another thematic knowledge point; and, an another multi-round questioning and answering flow module trigger subunit configured to trigger, according to a thematic answer in the another thematic knowledge point, a multi-round questioning and answering flow module corresponding to the another thematic knowledge point.

The questioning and answering interaction module 330 further includes a knowledge point match failure processing unit 3309 configured to: if it is determined that the questions in the knowledge points in the knowledge base are not matching with the user interaction information, provide a match failure response to the interactive user, request the interactive user to input user interaction information for the first interaction node again, and trigger the user interaction information matching unit to perform an execution again upon acquiring new user interaction information.

By the technical solutions in this embodiment of the present invention, a multi-round questioning and answering device for an interaction node configured with a rejection-preferred function or a knowledge-preferred function is provided. The scenarios to which the multi-round questioning and answering device is applicable are further enriched, and the interactive user's experience is greatly improved.

Figure 4:
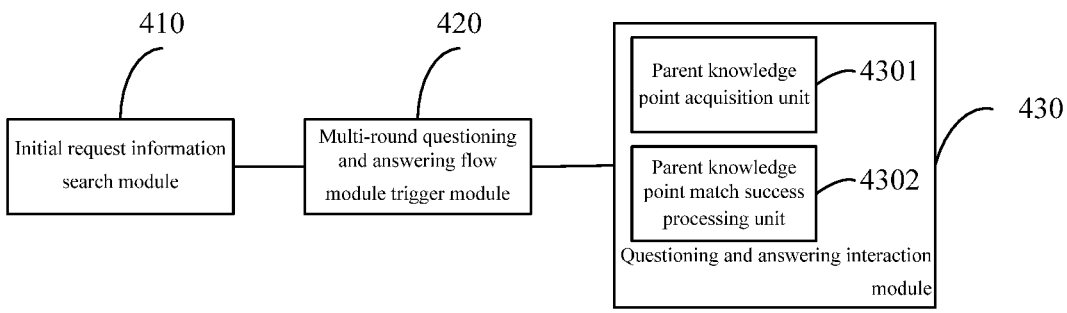
FIG. 4 is a schematic structure diagram of the multi-round questioning and answering device according to yet another embodiment of the present invention.

FIG. 4 is a schematic structure diagram of the multi-round questioning and answering device according to yet another embodiment of the present invention. As shown in FIG. 4, this embodiment is optimized based on the above embodiment. In this embodiment, the questioning and answering interaction module is further subdivided. Correspondingly, the device in this embodiment of the present invention includes:

an initial request information search module 410, a multi-round questioning and answering flow module trigger module 420 and questioning and answering interaction module 430, wherein the questioning and answering interaction module 430 specifically includes:

a parent knowledge point acquisition unit 4301 configured to acquire one or more knowledge points respectively corresponding to the first interaction node and upper-layer nodes of the first interaction node stored in the knowledge base if it is determined that a backtrack function is activated on the first interaction node; and, a parent knowledge point match success processing unit 4302 configured to: if it is determined that the received user interaction information matches with the interaction question of the upper-layer node of the first interaction node in the knowledge base, proceed the multi-round questioning and answering flow module to the upper-layer node matched, and return the interaction answer corresponding to the successfully matched knowledge point to the multi-round questioning and answering flow module so that the multi-round questioning and answering flow module determines a next proceeding trend.

In this embodiment, if it is determined that a backtrack function is activated on the first interaction node, when the multi-round questioning and answering flow module is proceeded to the first interaction node, another interaction node above the first interaction node in the multi-round questioning and answering flow module can be backtracked according to the actual needs of the interactive user; and, if it is determined that a backtrack function is not activated on the first interaction node, when the multi-round questioning and answering flow module is proceeded to the first interaction node, another interaction node above the first interaction node in the multi-round questioning and answering flow module cannot be backtracked.

For example, as shown in FIG. 1a, if the multi-round questioning and answering flow module has been proceeded to a loan amount inquiry node 106 and a backtrack function is activated on the loan amount inquiry node 106, when the interactive user inputs "already 20 years old", the multi-round questioning and answering flow module will be proceeded to an age inquiry node 101 again to perform questioning and answering interaction with the interactive user.

By the technical solutions in this embodiment of the present invention, a multi-round questioning and answering device for an interaction node configured with a backtrack function is provided. The scenarios to which the multi-round questioning and answering device is applicable are further enriched, and the interactive user's experience is greatly improved.

In a further embodiment, the device further includes:

a broadcast module configured to broadcast to the interactive user according to broadcast content configured on a second node when the multi-round questioning and answering flow module is proceeded to the second node, wherein the second node includes an interaction node or a broadcast node.

The broadcast module is specifically configured to: stop broadcasting of the broadcast content, if an interrupt function is activated on the second node and if the user interaction information is received before broadcasting of the broadcast content corresponding to the second node ends.

That is, in the process of broadcasting the corresponding broadcast content to the interactive user by a broadcast node or an interaction node in the multi-round questioning and answering flow module (the broadcasting of the broadcast content does not end), if the interactive user interrupts the broadcast content, the broadcasting of the broadcast content will be stopped.

In this way, a multi-round questioning and answering device for an interaction node or a broadcast node configured with an interrupt function is provided. The scenarios to which the multi-round questioning and answering device is applicable are further enriched, and the interactive user's experience is greatly improved.

Figure 5:
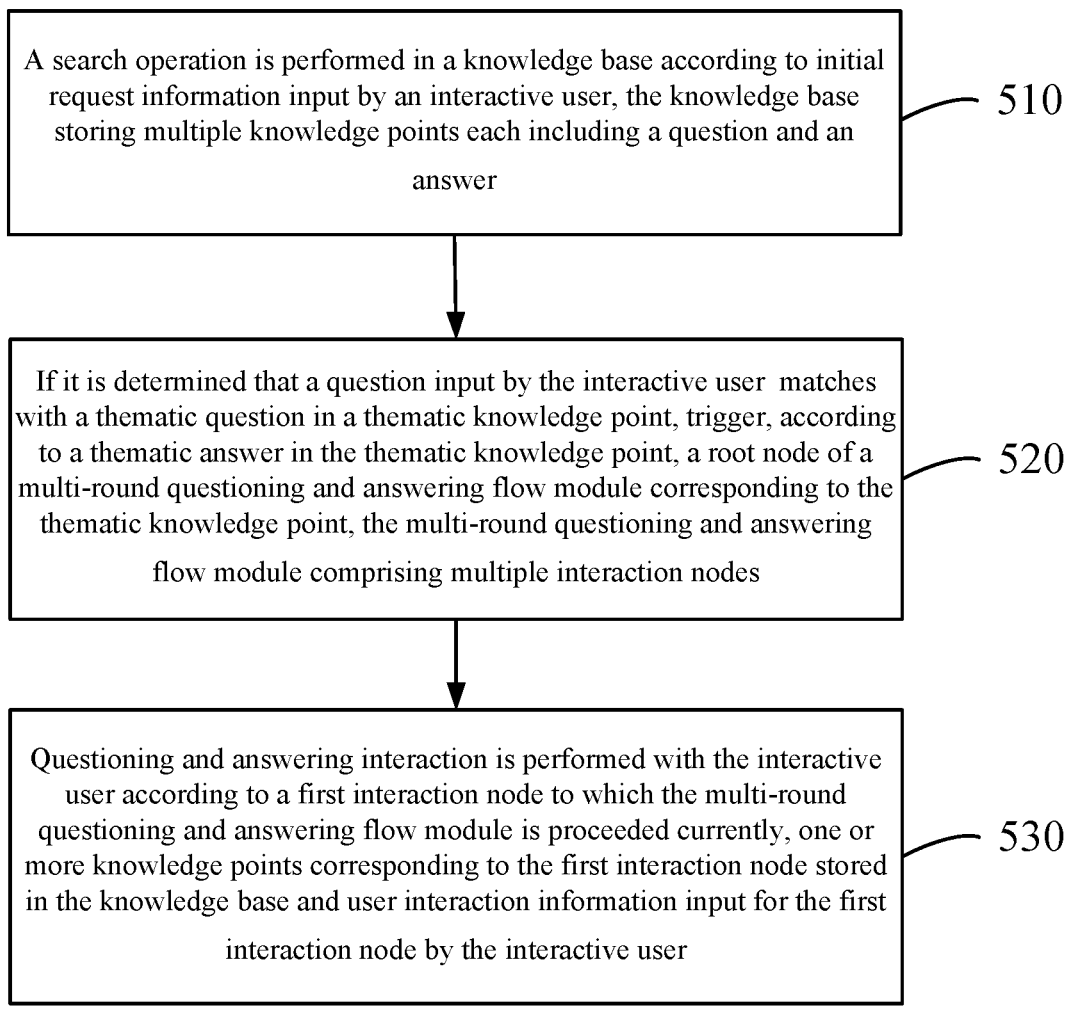
FIG. 5 is a flowchart of a multi-round questioning and answering method according to an embodiment of the present invention.

FIG. 5 is a flowchart of a multi-round questioning and answering method according to an embodiment of the present invention. As shown in FIG. 5, the multi-round questioning and answering method in this embodiment is based on the multi-round questioning and answering system described above. This embodiment is suitable for realizing multiple rounds of questioning and answering interaction with an interactive user. The method may be realized by a multi-round questioning and answering device based on the multi-round questioning and answering system. The device may be implemented by software and/or hardware, which may generally be integrated into a special interaction apparatus (e.g., an intelligent robot) with an interaction function or a general terminal apparatus (e.g., a mobile phone, a tablet computer, etc.) equipped with interactive software (e.g., voice assistant). The method specifically includes the following steps.

Step 510: A search operation is performed in a knowledge base according to initial request information input by an interactive user, the knowledge base storing multiple knowledge points each including a question and an answer.

In this embodiment, the knowledge points stored in the knowledge base include: questioning and answering knowledge points, thematic knowledge points, and knowledge points corresponding to interaction nodes (i.e., interaction knowledge points). The related concepts of the knowledge points have been described above in detail and will not be repeated here.

Step 520: If it is determined that the question input by the interactive user matches with a thematic question in a thematic knowledge point, a root node of a multi-round questioning and answering flow module corresponding to the thematic knowledge point is triggered according to a thematic answer in the thematic knowledge point, wherein the multi-round questioning and answering flow module includes multiple layers of interaction nodes.

In this embodiment, information capable of accurately positioning the corresponding multi-round questioning and answering flow module is stored in the thematic answer in the thematic knowledge point. After it is determined that the initial request information input by the interactive user matches with a thematic question in a thematic knowledge point, the multi-round questioning and answering flow module matched can be accurately positioned, and a root node of this multi-round questioning and answering flow module is correspondingly triggered, that is, the multi-round questioning and answering flow module is activated to perform questioning and answering interaction with the interactive user.

Step 530: Questioning and answering interaction is performed with the interactive user according to a first interaction node to which the multi-round questioning and answering flow module is proceeded currently, one or more knowledge points corresponding to the first interaction node stored in the knowledge base and user interaction information input for the first interaction node by the interactive user.

As described above, a multi-round questioning and answering flow module includes multiple layers of interaction nodes, each layer of interaction nodes includes one or more interaction nodes, and the root node belongs to the first layer of interaction nodes. When the multi-round questioning and answering flow module is proceeded to an interaction node, user interaction information input based on this interaction node by the interactive user is compared with one or more knowledge points corresponding to this interaction node in the knowledge base, and a next proceeding trend for the multi-round questioning and answering flow module is determined according to the corresponding result of matching.

In the multi-round questioning and answering method applied to a multi-round questioning and answering system in this embodiment of the present invention, by acquiring initial request information and matching the initial request information with a knowledge point in a knowledge base, triggering a root node of a multi-round questioning and answering flow module corresponding to a thematic knowledge point if it is determined that the initial request information matches with a thematic question in the thematic knowledge point, and performing questioning and answering interaction with the interactive user according to a first interaction node to which the multi-round questioning and answering flow module is proceeded currently, one or more knowledge points corresponding to the first interaction node stored in the knowledge base and user interaction information input for the first interaction node by an interactive user, specific implementations of performing multiple rounds of questioning and answering interaction with a user based on the multi-round questioning and answering system are provided. Interactive users' demands for multiple rounds of questioning and answering interaction are greatly satisfied, and the efficiency and accuracy of the multiple rounds of questioning and answering interaction are improved.

Figure 6:
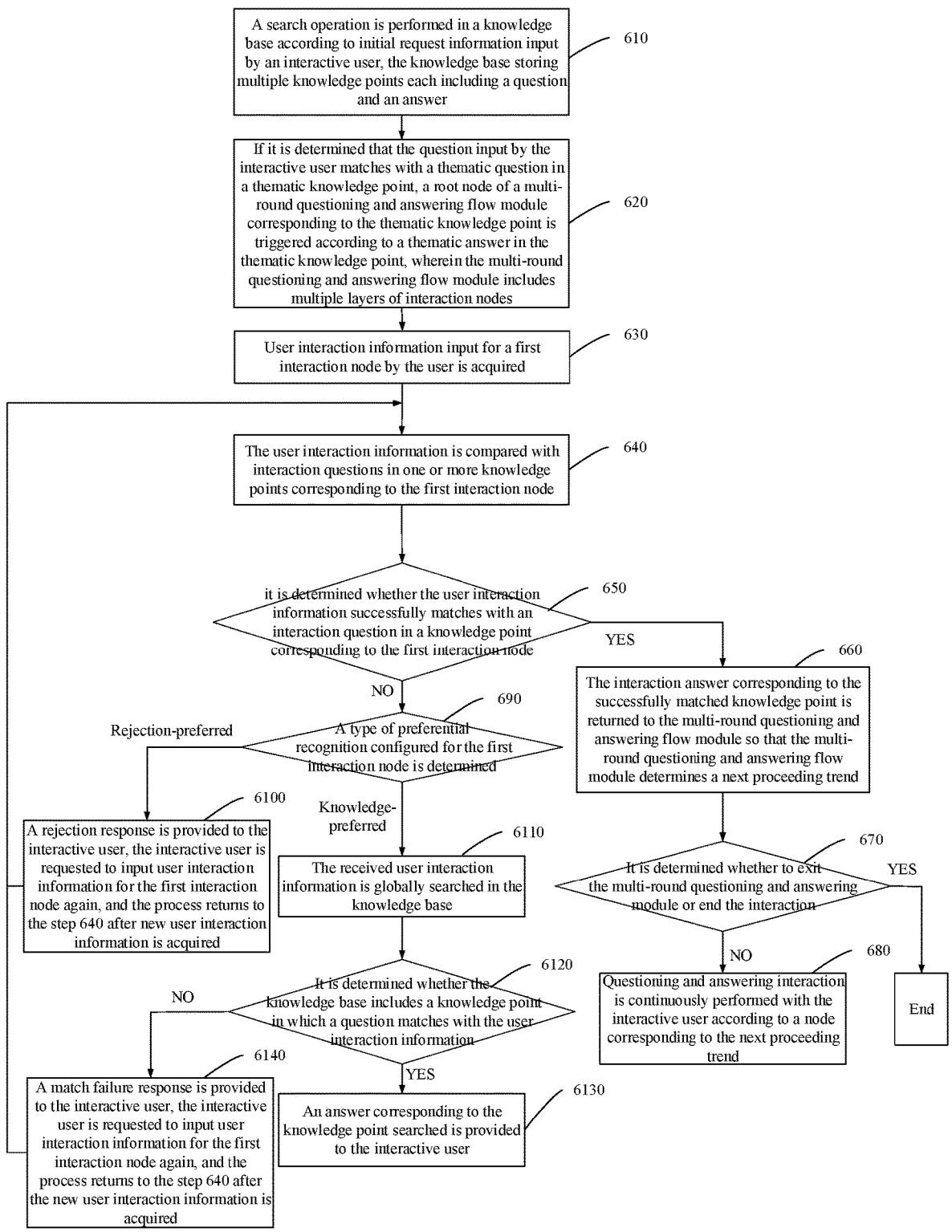
FIG. 6 is a flowchart of the multi-round questioning and answering method according to another embodiment of the present invention.

FIG. 6 is a flowchart of the multi-round questioning and answering method according to another embodiment of the present invention. As shown in FIG. 6, this embodiment is optimized based on the above embodiment. In this embodiment, the process of performing questioning and answering interaction with the interactive user according to an interaction node to which the multi-round questioning and answering flow module is proceeded currently is further subdivided. Correspondingly, the method in this embodiment of the present invention includes the following steps.

Step 610: A search operation is performed in a knowledge base according to initial request information input by an interactive user, the knowledge base storing multiple knowledge points each including a question and an answer.

Step 620: If it is determined that the question input by the interactive user matches with a thematic question in a thematic knowledge point, a root node of a multi-round questioning and answering flow module corresponding to the thematic knowledge point is triggered according to a thematic answer in the thematic knowledge point, wherein the multi-round questioning and answering flow module includes multiple layers of interaction nodes.

Step 630: User interaction information input for a first interaction node by the user is acquired.

Step 640: The user interaction information is compared with interaction questions in one or more knowledge points corresponding to the first interaction node.

Step 650: it is determined whether the user interaction information successfully matches with an interaction question in a knowledge point corresponding to the first interaction node; if so, a step 660 is executed; and, if not, a step 690 is executed.

Step 660: The interaction answer corresponding to the successfully matched knowledge point is returned to the multi-round questioning and answering flow module so that the multi-round questioning and answering flow module determines a next proceeding trend.

In this embodiment, if the user interaction information input by the interactive user matches with a knowledge point corresponding to the currently flowed interaction node, after the multi-round questioning and answering flow module acquires the interaction answer returned by the knowledge base, a next proceeding trend for the whole multi-round questioning and answering flow module can be determined according to the configured dynamic trigger condition and a connector matching with the interaction answer.

Step 670: It is determined whether to exit the multi-round questioning and answering module or end the interaction; if so, the flow ends; and, if not, a step 680 is executed.

In this embodiment, for ease of statement, the process of determining whether to exit the multi-round questioning and answering flow module or end the interaction is performed after the step 660. Actually, the interactive user can exit the multi-round questioning and answering flow module when the multi-round questioning and answering flow module is proceeded to any node. Therefore, the decision process may be performed independently from and in parallel to the steps in this embodiment of the present invention. In this embodiment, the time when the decision process is performed is not limited.

Step 680: Questioning and answering interaction is continuously performed with the interactive user according to a node corresponding to the next proceeding trend.

In this embodiment, if the node corresponding to the next proceeding trend is an interaction node, the operations in the steps 640 to 660 will be repetitively executed after the interaction node corresponding to the next proceeding trend is determined as a new first interaction node; if the node corresponding to the next proceeding trend is a broadcast node which is not a termination node, the corresponding broadcast content will be correspondingly broadcast, and the multi-round questioning and answering flow module is proceeded, according to a next proceeding trend uniquely determined by the broadcast node, to a next node determined by the broadcast node to perform questioning and answering interaction with the interactive user (for example, in FIG. 1a, both a node 104 for indicating that the condition for ¥200,000 loan is satisfied and a node 105 for indicating that the condition for ¥300,000 loan is satisfied uniquely point to a loan amount inquiry node 106); and, if the node corresponding to the next proceeding trend is a broadcast node which is a termination node, the corresponding broadcast content will be correspondingly broadcast, and the interaction with the interactive user ends.

Step 690: A type of preferential recognition configured for the first interaction node is determined: if it is determined that a rejection-preferred function is activated on the first interaction node, a step 6100 is executed; and, if it is determined that a knowledge-preferred function is activated on the first interaction node, a step 6110 is executed.

In this embodiment, when it is determined that the user interaction information does not match with all of the one or more knowledge points corresponding to the first interaction node, the process may be performed by different flow processing methods according to the preconfigured custom configuration parameters of different types corresponding to the first interaction node.

Step 6100: A rejection response is provided to the interactive user, the interactive user is requested to input user interaction information for the first interaction node again, and the process returns to the step 640 after new user interaction information is acquired.

In this embodiment, if the rejection-preferred function is activated on the first interaction node, it is only necessary to match an interaction question in the preconfigured knowledge point corresponding to the first interaction node with the user interaction information; and, if the interaction question in the preconfigured knowledge point corresponding to the first interaction node does not match with the user interaction information, the recognition will be rejected, and the interactive user is requested to input the user interaction information for matching again.

Step 6110: The received user interaction information is globally searched in the knowledge base.

In this embodiment, if a knowledge-preferred function is activated on the first interaction node, when an interaction question in a knowledge point corresponding to the first interaction node does not match with the user interaction information, other knowledge points contained in the knowledge base will be compared with the user interaction information, and the corresponding result of matching will be fed back.

Step 6120: It is determined whether the knowledge base includes a knowledge point in which a question matches with the user interaction information; if so, a step 6130 is executed; and, if not, a step 6140 is executed.

Step 6130: An answer corresponding to the knowledge point searched is provided to the interactive user.

The knowledge point searched may be a general questioning and answering knowledge point. After an answer corresponding to the questioning and answering knowledge point is provided to the interactive user, the triggered state of the current interaction node (the first interaction node) in the multi-round questioning and answering system can be continuously maintained, and the user interaction information input for the first interaction node by the interactive user is continuously acquired for matching.

Further, the knowledge point searched may also be another thematic knowledge point; and correspondingly, the process of providing an answer corresponding to the knowledge point searched may specifically include:

If it is determined that the knowledge point searched is another thematic knowledge point, the triggered state of the current multi-round questioning and answering flow module is terminated; and, a multi-round questioning and answering flow module corresponding to the another thematic knowledge point is triggered according to a thematic answer in the another thematic knowledge point.

Step 6140: A match failure response is provided to the interactive user, the interactive user is requested to input user interaction information for the first interaction node again, and the process returns to the step 640 after the new user interaction information is acquired.

By the technical solutions in this embodiment of the present invention, a multi-round questioning and answering method for an interaction node configured with a rejection-preferred function or a knowledge-preferred function is provided. The scenarios to which the multi-round questioning and answering method is applicable are further enriched, and the interactive user's experience is greatly improved.

Figure 7:
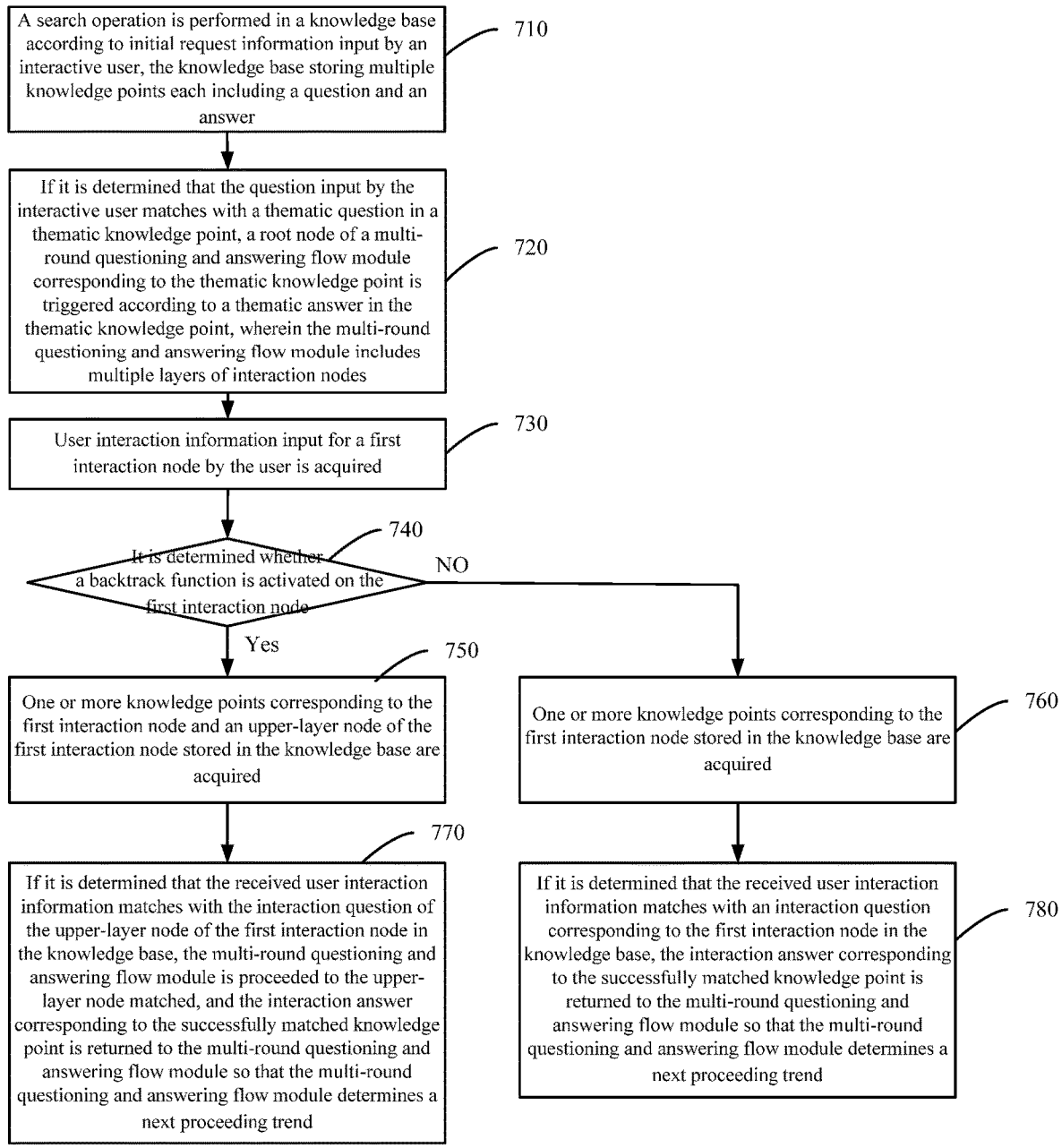
FIG. 7 is a flowchart of the multi-round questioning and answering method according to yet another embodiment of the present invention.

FIG. 7 is a flowchart of the multi-round questioning and answering method according to yet another embodiment of the present invention. As shown in FIG. 7, this embodiment is optimized based on the above embodiment. In this embodiment, the process of performing questioning and answering interaction with the interactive user according to an interaction node to which the multi-round questioning and answering flow module is proceeded currently is further subdivided. Correspondingly, the method in this embodiment of the present invention includes the following steps.

Step 710: A search operation is performed in a knowledge base according to initial request information input by an interactive user, the knowledge base storing multiple knowledge points each including a question and an answer.

Step 720: If it is determined that the question input by the interactive user matches with a thematic question in a thematic knowledge point, a root node of a multi-round questioning and answering flow module corresponding to the thematic knowledge point is triggered according to a thematic answer in the thematic knowledge point, wherein the multi-round questioning and answering flow module includes multiple layers of interaction nodes.

Step 730: User interaction information input for a first interaction node by the user is acquired.

Step 740: It is determined whether a backtrack function is activated on the first interaction node; if so, a step 750 is executed; and, if not, a step 760 is executed.

Step 750: One or more knowledge points corresponding to the first interaction node and an upper-layer node of the first interaction node stored in the knowledge base are acquired, and a step 770 is executed.

Step 760: One or more knowledge points corresponding to the first interaction node stored in the knowledge base are acquired, and a step 780 is executed.

Step 770: If it is determined that the received user interaction information matches with the interaction question of the upper-layer node of the first interaction node in the knowledge base, the multi-round questioning and answering flow module is proceeded to the upper-layer node matched, and the interaction answer corresponding to the successfully matched knowledge point is returned to the multi-round questioning and answering flow module so that the multi-round questioning and answering flow module determines a next proceeding trend.

Step 780: If it is determined that the received user interaction information matches with an interaction question corresponding to the first interaction node in the knowledge base, the interaction answer corresponding to the successfully matched knowledge point is returned to the multi-round questioning and answering flow module so that the multi-round questioning and answering flow module determines a next proceeding trend.

In this embodiment, if it is determined that a backtrack function is activated on the first interaction node, when the multi-round questioning and answering flow module is proceeded to the first interaction node, another interaction node above the first interaction node in the multi-round questioning and answering flow module can be backtracked according to the actual needs of the interactive user; and, if it is determined that a backtrack function is not activated on the first interaction node, when the multi-round questioning and answering flow module is proceeded to the first interaction node, another interaction node above the first interaction node in the multi-round questioning and answering flow module cannot be backtracked.

For example, as shown in FIG. 1a, if the multi-round questioning and answering flow module has been proceeded to a loan amount inquiry node 106 and a backtrack function is activated on the loan amount inquiry node 106, when the interactive user inputs "20 years old", the multi-round questioning and answering flow module will be proceeded to an age inquiry node 101 again to perform questioning and answering interaction with the interactive user.

By the technical solutions in this embodiment of the present invention, a multi-round questioning and answering method for an interaction node configured with a backtrack function is provided. The scenarios to which the multi-round questioning and answering method is applicable are further enriched, and the interactive user's experience is greatly improved.

Based on the above embodiments, the method may further include steps of: when the multi-round questioning and answering flow module is proceeded to a second node, broadcasting to the interactive user according to broadcast content configured on the second node, wherein the second node includes an interaction node or a broadcast node.

Based on the above embodiments, the step of broadcasting to the interactive user according to broadcast content configured on the second node includes:

if an interrupt function is activated on the second node and if the user interaction information is received before broadcasting of the broadcast content corresponding to the second node ends, stopping broadcasting of the broadcast content.

That is, in the process of broadcasting the corresponding broadcast content to the interactive user by a broadcast node or an interaction node in the multi-round questioning and answering flow module (the broadcasting of the broadcast content does not end), if the interactive user interrupts the broadcast content, the broadcasting of the broadcast content will be stopped.

In this way, a multi-round questioning and answering method for an interaction node or a broadcast node configured with an interrupt function is provided. The scenarios to which the multi-round questioning and answering method is applicable are further enriched, and the interactive user's experience is greatly improved.

Figure 8:
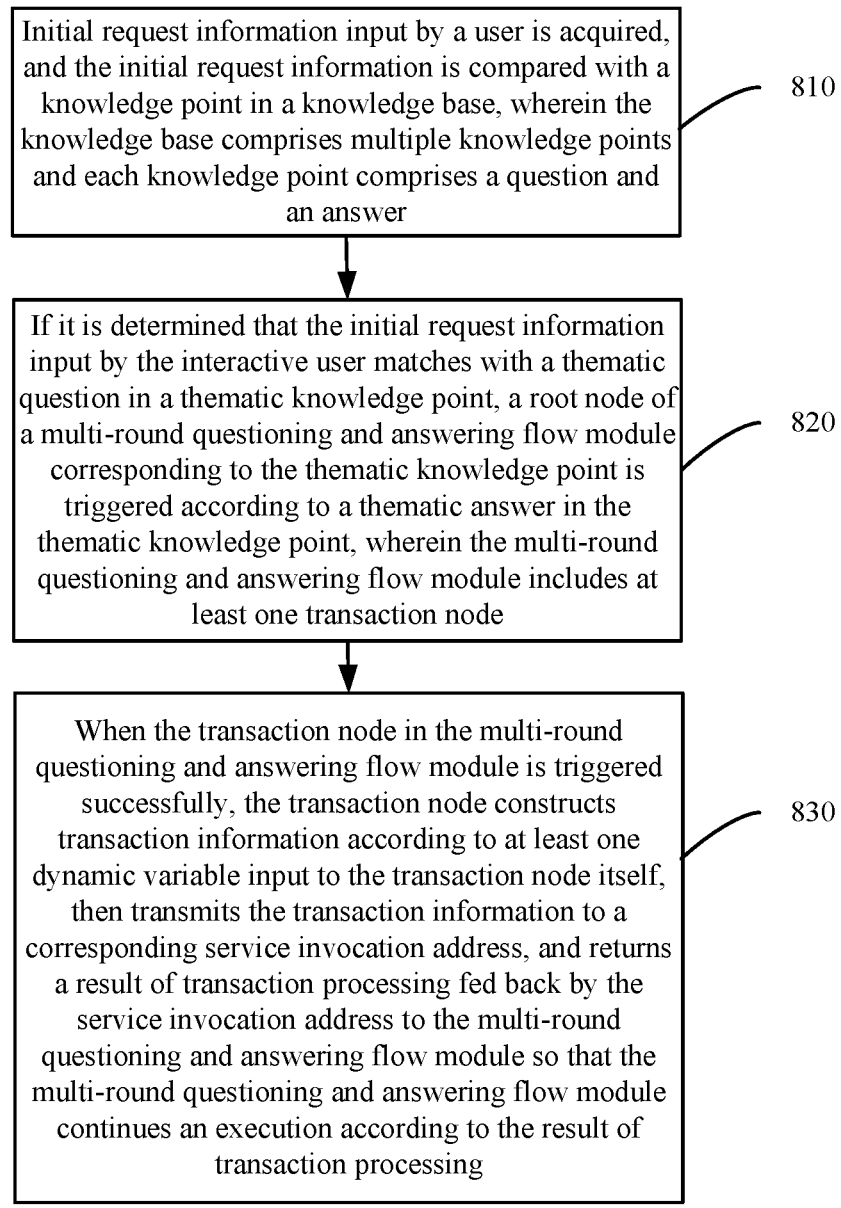
FIG. 8 is a flowchart of the multi-round questioning and answering method according to still another embodiment of the present invention.

FIG. 8 is a flowchart of the multi-round questioning and answering method according to still another embodiment of the present invention. As shown in FIG. 8, the multi-round questioning and answering method in this embodiment is based on the multi-round questioning and answering system described above. This embodiment is applicable to the questioning and answering interaction with a user. The method specifically includes the following steps.

Step 810: Initial request information input by a user is acquired, and the initial request information is compared with a knowledge point in a knowledge base, wherein the knowledge base comprises multiple knowledge points and each knowledge point comprises a question and an answer.

In this embodiment, the knowledge points stored in the knowledge base include: questioning and answering knowledge points, thematic knowledge points, knowledge points corresponding to transaction nodes (i.e., transaction knowledge points), and knowledge points corresponding to interaction nodes (i.e., interaction knowledge points). The related concepts of the knowledge points have been described above in detail and will not be repeated here.

Step 820: If it is determined that the initial request information input by the interactive user matches with a thematic question in a thematic knowledge point, a root node of a multi-round questioning and answering flow module corresponding to the thematic knowledge point is triggered according to a thematic answer in the thematic knowledge point, wherein the multi-round questioning and answering flow module includes at least one transaction node.

In this embodiment, information capable of accurately positioning the corresponding multi-round questioning and answering flow module is stored in the thematic answer in the thematic knowledge point. After it is determined that the initial request information input by the interactive user matches with a thematic question in a thematic knowledge point, the multi-round questioning and answering flow module matched can be accurately positioned, and a root node of this multi-round questioning and answering flow module is correspondingly triggered, that is, the multi-round questioning and answering flow module is activated to perform questioning and answering interaction with the interactive user.

It is to be emphasized that, for root nodes of different types (for example, a transaction node, an interaction node or a broadcast node), the concept of the trigger is different. For example, for a broadcast node, if the broadcast node is triggered, the preset broadcast content will be directly broadcast to the user, and the multi-round questioning and answering flow module will be proceeded to a next node which is connected to the broadcast node via a connector, to continue an execution; while for an interaction node, if this interaction node is triggered, the preset broadcast content will be directly broadcast to the user, and a search operation will be performed in the knowledge base according to the interaction information fed back by the user so as to determine a next proceeding trend for the multi-round questioning and answering flow module.

Unlike the above both, for a transaction node, if this transaction node is triggered, the process will stay on this transaction node to continuously acquire the user input information. Only when it is determined that all dynamic variables required to construct transaction information can be acquired from the user input information, the transaction node can be successfully triggered, the transaction information is transmitted to an associated service interface, and a result of transaction processing returned by the service interface is fed back to the multi-round questioning and answering flow module. In other words, there are two states for a transaction node, i.e., a triggered state and a successfully triggered state. In the triggered state, the user input information is acquired, and a result of transaction processing is constructed according to the user input information; and, in the successfully triggered state, the result of transaction processing is transmitted to an associated service interface.

Step 830: When the transaction node in the multi-round questioning and answering flow module is triggered successfully, the transaction node constructs transaction information according to at least one dynamic variable input to the transaction node itself, then transmits the transaction information to a corresponding service invocation address, and returns a result of transaction processing fed back by the service invocation address to the multi-round questioning and answering flow module so that the multi-round questioning and answering flow module continues an execution according to the result of transaction processing.

As described above, the multi-round questioning and answering flow module includes at least one transaction node. The transaction node is associated with a service interface for executing a set type of services. The service interface is configured to obtain the corresponding result of transaction processing according to one or more pieces of transaction information input to this interface. If it is intended to ensure that the service interface can normally return the desired result of transaction processing, it must be ensured that the number and type of transaction information input to the service interface are consistent with the input content defined by the service interface.

Correspondingly, the transaction node in the multi-round questioning and answering flow module being successfully triggered specifically means that, when the multi-round questioning and answering flow module is proceeded to a transaction node, and if the transaction node can construct the transaction information required by the service node according to the dynamic variables acquired from the user input information or the number and type of upstream nodes or dynamic variables, this transaction node is successfully triggered.

Figure 1B:
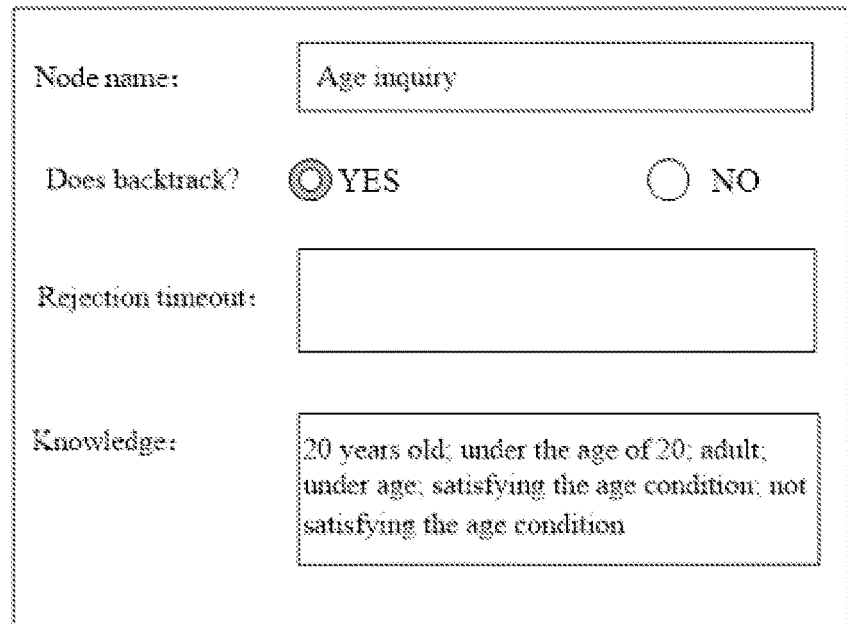
FIG. 1b is a schematic diagram of custom configuration information input to an interaction node according to an embodiment of the present invention.
Figure 1C:
FIG. 1c is a schematic diagram of custom configuration information input to a broadcast node according to an embodiment of the present invention.
Figure 1D:
FIG. 1d is a schematic diagram of custom configuration information input to a connector according to an embodiment of the present invention.
Figure 1E:
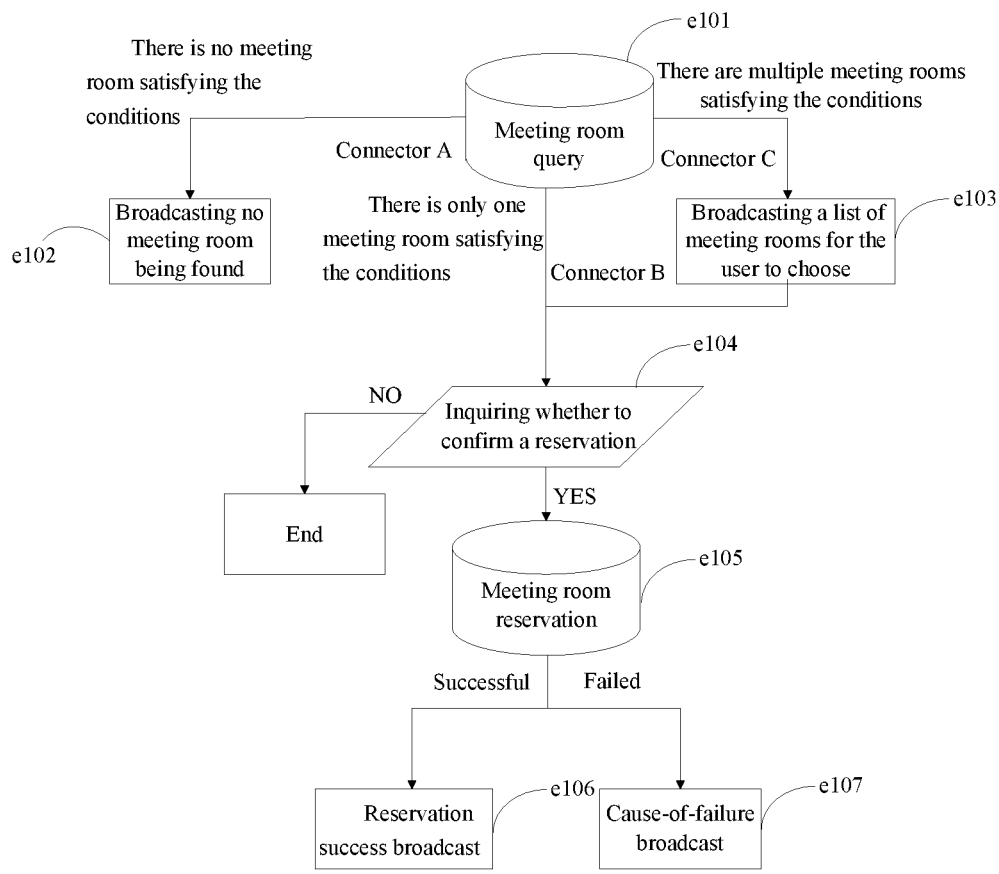
FIG. 1e is a schematic diagram of a graphic questioning and answering flowchart according to an embodiment of the present invention.

In a specific example, if it is assumed that the initial request information input by the user is "I want to inquire available meeting rooms", by comparing the initial request information with a knowledge base and determining to activate a multi-round questioning and answering flow module corresponding to the flowchart shown in FIG. 1e, a meeting room inquiry node 101 will be triggered first, and the meeting room inquiry node 101 will continue to extract the required dynamic variables according to the user input information, for example, the time XX, the number XX of participants and the meeting room of XX type. When it is determined that the transaction information required by the associated service interface can be constructed by the dynamic variables, the meeting room inquiry node 101 will be successfully activated, the transaction information will be transmitted to the associated service interface, and the number of meeting rooms satisfying the condition, which is returned by the service interface, is provided to the multi-round questioning and answering flow module so that a next proceeding trend for the multi-round questioning and answering flow module is determined.

In the multi-round questioning and answering method based on a multi-round questioning and answering system in this embodiment of the present invention, by acquiring initial request information input by a user and matching the initial request information with a knowledge point in a knowledge base, triggering a root node of a multi-round questioning and answering flow module corresponding to a thematic knowledge point if it is determined that the initial request information acquired by the user matches with a thematic question in the thematic knowledge point, and, when a transaction node in the multi-round questioning and answering flow module is triggered, constructing, by the transaction node, transaction information according to at least one dynamic variable input to the transaction node itself, then transmitting the transaction information to a corresponding service invocation address and returning a result of transaction processing fed back by the service invocation address to the multi-round questioning and answering flow module, specific implementations of performing multiple rounds of questioning and answering interaction with a user based on the multi-round questioning and answering system including transaction nodes are provided. Interactive users' demands for multiple rounds of questioning and answering interaction are greatly satisfied, and the efficiency and accuracy of the multiple rounds of questioning and answering interaction are improved.

Figure 9:
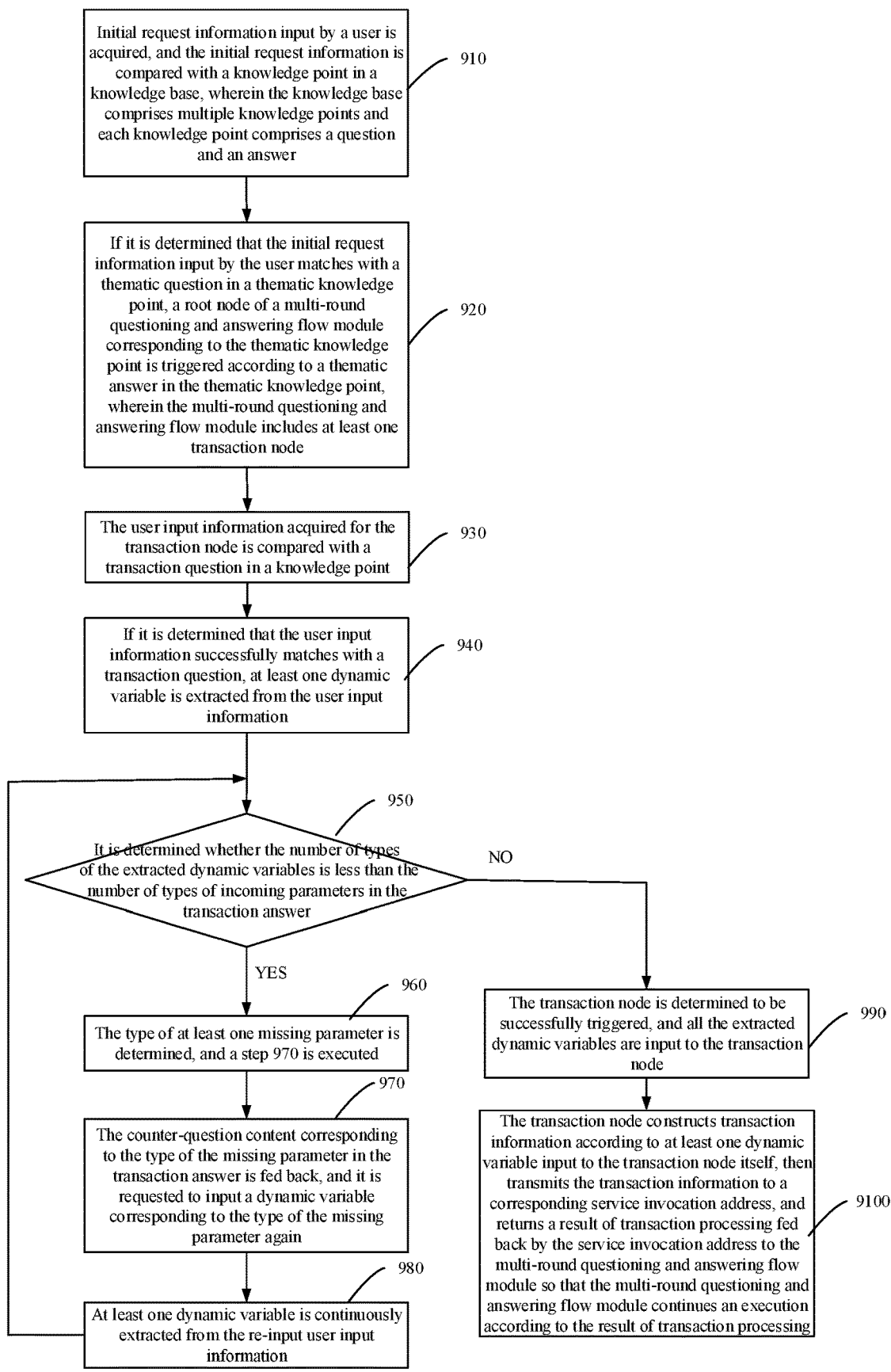
FIG. 9 is a flowchart of the multi-round questioning and answering method according to another embodiment of the present invention.

FIG. 9 is a flowchart of the multi-round questioning and answering method according to another embodiment of the present invention. As shown in FIG. 9, this embodiment is optimized based on the above embodiments. In this embodiment, the operation of successfully triggering a transaction node in the questioning and answering flow module is subdivided. Correspondingly, the method in this embodiment specifically includes the following steps.

Step 910: Initial request information input by a user is acquired, and the initial request information is compared with a knowledge point in a knowledge base, wherein the knowledge base comprises multiple knowledge points and each knowledge point comprises a question and an answer.

Step 920: If it is determined that the initial request information input by the user matches with a thematic question in a thematic knowledge point, a root node of a multi-round questioning and answering flow module corresponding to the thematic knowledge point is triggered according to a thematic answer in the thematic knowledge point, wherein the multi-round questioning and answering flow module includes at least one transaction node.

Step 930: The user input information acquired for the transaction node is compared with a transaction question in a knowledge point.

In this embodiment, when the multi-round questioning and answering flow module is proceeded to a transaction node, the transaction node is triggered.

The transaction node corresponds to a first knowledge point in the knowledge base, and this first knowledge point includes a transaction question and a transaction answer.

In this embodiment, the first knowledge point is a transaction knowledge point. The transaction answer includes an associated transaction node, a type of at least one incoming parameter, a type of at least one missing parameter, and counter-question content matching with the type of the missing parameter. The transaction question is used for being compared with the received user input information. The type of the incoming parameter is used for being compared with the type of a dynamic variable contained in the user input information. The type of the missing parameter and the counter-question content matching with the type of the missing parameter are used for determining the counter-question content corresponding to the type of the missing parameter in the user input information. The associated transaction node is used for determining a transaction node to which the dynamic variable contained in the user input information is input.

Step 940: If it is determined that the user input information successfully matches with a transaction question, at least one dynamic variable is extracted from the user input information.

In this embodiment, if it is determined that the user input information successfully matches with a transaction question, at least one dynamic variable can be extracted from the user input information; however, if it is determined that the user input information does not match with a transaction question, the user input information can be requested to be input again by feedback.

Step 950: It is determined whether the number of types of the extracted dynamic variables is less than the number of types of incoming parameters in the transaction answer; if so, a step 960 is executed; and, if not, a step 990 is executed.

The determining whether the number of types of the extracted dynamic variables is less than the number of types of incoming parameters in the transaction answer specifically means determining whether the type of the extracted dynamic variables is consistent with the type of incoming parameters in the transaction answer and whether the type of the acquired dynamic variables can cover all types of incoming parameters. For example, the type of the incoming parameters contained in the transaction answer is the meeting time, the number of meeting participants and the type of meeting.

Step 960: The type of at least one missing parameter is determined, and a step 970 is executed.

Step 970: The counter-question content corresponding to the type of the missing parameter in the transaction answer is fed back, and it is requested to input a dynamic variable corresponding to the type of the missing parameter again.

Step 980: At least one dynamic variable is continuously extracted from the re-input user input information, and the process returns to the step 950.

Step 990: The transaction node is determined to be successfully triggered, and all the extracted dynamic variables are input to the transaction node.

Step 9100: The transaction node constructs transaction information according to at least one dynamic variable input to the transaction node itself, then transmits the transaction information to a corresponding service invocation address, and returns a result of transaction processing fed back by the service invocation address to the multi-round questioning and answering flow module so that the multi-round questioning and answering flow module continues an execution according to the result of transaction processing.

In the technical solutions in this embodiment of the present invention, by establishing a correspondence between a transaction node and a transaction knowledge point in a knowledge base and defining, in this transaction knowledge point, counter-question content when the user input information does not include one or more dynamic variables required by the transaction node, different counter-question contents can be fed back according to different user input information when the finally constructed multi-round questioning and answering system is proceeded to a transaction node matching with the transaction knowledge point, so that the user can correct the content input by the user according to the counter-question content. Only the missing dynamic variables are offered again, and it is unnecessary to provide the dynamic variables that have already been offered. Accordingly, while ensuring that the transaction node can be triggered normally to operate normally, the requirements for the user input information are greatly reduced, and the efficiency of the multi-round questioning and answering system and the user's experience can be improved significantly.

Based on the above embodiments, the process of constructing, by the transaction node, transaction information according to at least one dynamic variable input to the transaction node itself and then transmitting the transaction information to a corresponding service invocation address may include:

constructing, by the transaction node, transaction information according to at least one dynamic variable input to the transaction node itself and an incoming parameter definition item corresponding to the transaction node, and transmitting the transaction information to a service invocation address matching with the transaction node, wherein the incoming parameter definition item includes a name of at least one incoming parameter and an incoming parameter variable matching with the name of the incoming parameter, the name of the incoming parameter is a parameter name that can be recognized by a service interface associated with the transaction node, and the incoming parameter variable matches with the dynamic variable input to the transaction node.

Figure 1F:
FIG. 1f is a schematic diagram of custom configuration information input to a transaction node according to an embodiment of the present invention.

Specifically, referring to FIGS. 1*e* and 1*f*, the user input information acquired by the transaction node (i.e., the meeting room inquiry node 101) is "the meeting is from 9:00 am to 11:00 am". By comparing the user input information with a transaction knowledge point corresponding to the meeting room inquiry node 101 in the knowledge base, the obtained dynamic variables are as follows: the startime of the meeting=9:00 am, and the overtime of the meeting=11:00 am; The transaction node constructs transaction information (i.e., startime=9:00 am and overtime=11:00 am, which are variable forms capable of being recognized by a service interface for meeting room inquiry) by using the dynamical variables (i.e., the startime of the meeting=9:00 am and the overtime of the meeting=11:00 am). Subsequently, the transaction node transmits the transaction information to a service invocation address (i.e., http://voadev.sh.xaioi.com) corresponding to the service interface and the transaction node can receive a result of meeting room inquiry returned by the service invocation address.

Figure 10:
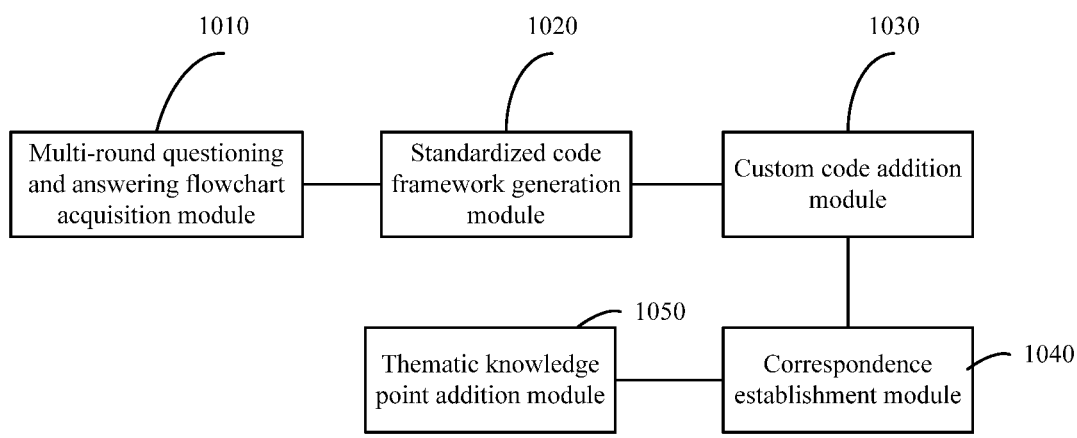
FIG. 10 is a schematic structure diagram of a device for generating a multi-round questioning and answering system according to an embodiment of the present invention.

FIG. 10 is a schematic structure diagram of a device for generating a multi-round questioning and answering system according to an embodiment of the present invention. As shown in FIG. 10, this embodiment is suitable for generating a multi-round questioning and answering system according to a multi-round questioning and answering flowchart. The multi-round questioning and answering system specifically refers to a system capable of realizing multiple rounds of questioning and answering interaction with an interactive user. The system may be implemented by software and/or hardware, which may generally be integrated into a terminal apparatus or server for generating the multi-round questioning and answering system. The terminal apparatus or server is directly or indirectly connected to a knowledge base.

The generation device in this embodiment specifically includes a multi-round questioning and answering flowchart acquisition module 1010, a standardized code framework generation module 1020, a custom code addition module 1030, a correspondence establishment module 1040 and a thematic knowledge point addition module 1050.

The multi-round questioning and answering flowchart acquisition module 1010 is configured to acquire one or more graphic multi-round questioning and answering flowcharts.

In this embodiment, the multi-round questioning and answering flowchart may specifically be a graphic flowchart obtained by selecting and combining graphic components in a set flow edition interface by a flow designer.

The graphic components may include nodes and connectors (typically connection lines) for connecting different nodes. The nodes include interaction nodes. The interaction nodes are specifically nodes capable of realizing questioning and answering (possibly one question corresponding to one answer, or one question corresponding to multiple answers) interaction with an interactive user. On the interaction nodes, a next proceeding trend for the multi-round questioning and answering flowchart can be determined according to the user interaction information input by the user.

In terms of the overall structure of the multi-round questioning and answering flowchart, one multi-round questioning and answering flowchart may include a root node representing the start of the flow, and one or more termination node representing the end of the flow. In addition, the multi-round questioning and answering flowchart may further include multiple layers of interaction nodes, and each layer of interaction nodes includes one or more interaction nodes. One layer of interaction nodes corresponds to one questioning and answering stage.

Of course, it should be understood that, in addition to the interaction nodes, the nodes may further include broadcast nodes, variable setup nodes, recording nodes, etc. This will not be limited in this embodiment. Generally, in one multi-round questioning and answering flowchart, the root node is an interaction node, and the termination node is a broadcast node. To facilitate the understanding, FIG. 1a shows a graphic multi-round questioning and answering flowchart. As shown in FIG. 1a, in the multi-round questioning and answering flowchart, rhombic graphic components are interaction nodes (for example, an age inquiry node 101), and the square graphic components are broadcast nodes (for example, a node 102 for indicating that the age does not satisfy the conditions for loans).

The nodes are connected by node-to-node connection lines. The multi-round questioning and answering flowchart shown in FIG. 1a includes four layers of interaction nodes. There is one interaction node in each layer. That is, the first layer includes an age inquiry node 101 (a root node), representing an age inquiry stage; the second layer includes a car/house inquiry node 103, representing a car/house inquiry stage; the third layer includes a loan amount inquiry node 106, representing a loan amount inquiry stage; and, the fourth layer includes a node 107 for inquiring the number of installments, representing an installment inquiry stage. According to the different input interaction content, each interaction node will correspondingly determine a different proceeding trend for the multi-round questioning and answering flowchart. In addition, the multi-round questioning and answering flowchart includes multiple termination nodes, i.e., a node 102 for indicating that the age does not satisfy the conditions for loans, a node 109 prompting that the quota is exceeded, a node 108 prompting that the number of installments is exceeded, and a node 10A broadcasting the result of loan installment.

The standardized code framework generation module 1020 is configured to generate, according to graphic components contained in each of the multi-round questioning and answering flowcharts, a standardized code framework matching with the multi-round questioning and answering flowchart, wherein each of the graphic components includes multiple interaction nodes.

In this embodiment, a multi-round questioning and answering flow module which can be generated automatically is provided. Correspondingly, standard implementation codes matching with different types of graphic components are provided in advance. For example, standard implementation codes respectively corresponding to the interaction nodes and broadcast nodes are established and packaged in different library files, and correspondences between the standard implementation codes and the corresponding graphic components are established in advance. Typically, storage addresses (or reference addresses) for the standard implementation codes matching with the graphic components are written in a flow edition interface in advance. Correspondingly, a matched standardized code framework can be automatically generated based on the graphic components contained in the multi-round questioning and answering flowchart drawn in the flow edition interface.

It is to be noted that, since the device for generating a multi-round questioning and answering system is what this embodiment of the present invention mainly focuses on, multiple interaction nodes are included in a multi-round questioning and answering flowchart. However, theoretically, by the technical solutions in this embodiment of the present invention, any type of questioning and answering systems can be generated, and the corresponding standardized code framework can be obtained just by drawing the corresponding flowchart according to actual requirements, and the corresponding flow modules can be thus obtained.

The custom code addition module 1030 is configured to generate, according to custom configuration information matching with the graphic components in the multi-round questioning and answering flowcharts, custom codes corresponding to the graphic components, and add the custom codes at positions associated with the graphic components in the standardized code frameworks to generate multi-round questioning and answering flow modules corresponding to the multi-round questioning and answering flowcharts.

It should be understood that the standard implementation codes matching with the graphic components include only general functions which can be realized by the corresponding graphic components. For example, for an interaction node, the corresponding standard implementation code includes a decision logic; or, for a broadcast node, the corresponding standard implementation code includes a broadcast logic; and the like. To enable a graphic component to realize its function in the multi-round questioning and answering flowchart, corresponding custom configuration parameters are to be input.

In a simple example, for the node 102 for indicating that the age does not satisfy the conditions for loans in FIG. 1a, the content "the age does not satisfy the conditions for loans" can be broadcast after the node 102 for indicating that the age does not satisfy the conditions for loans is triggered. Correspondingly, broadcasting "the age does not satisfy the conditions for loans" is a function given to the node 102 for indicating that the age does not satisfy the conditions for loans. In order to enable the node 102 for indicating that the age does not satisfy the conditions for loans to realize this function, the broadcast content needs to be added in the standardized code framework as custom configuration information.

Typically, it is possible to reserve a blank code segment at a set position in the standard implementation code matching with each graphic component. When a custom configuration parameter input for a graphic component in the multi-round questioning and answering flowchart is acquired (for example, input through a parameter configuration interface provided by the flow edition interface), a custom code matching with the custom configuration parameter is added in the corresponding blank code segment to realize the custom function of the graphic component.

Optionally, it is possible to directly add the custom configuration information (e.g., the age does not satisfy the conditions for loans) in the standardized code framework as a custom code; or, it is also possible to compare the custom configuration information (e.g., a rejection-preferred activation option or a knowledge-preferred activation option) with prewritten custom codes matching with different custom configuration information and add the matching prewritten custom code in the standardized code framework. This will not be limited in this embodiment.

Correspondingly, if all graphic components in one multi-round questioning and answering flowchart are customized, implementation codes capable of realizing the functions of the multi-round questioning and answering flowchart can be generated, that is, multi-round questioning and answering flow modules in this embodiment of the present invention are generated.

The correspondence establishment module 1040 is configured to establish a correspondence between each of the interaction nodes and one or more knowledge points in a knowledge base. A knowledge point corresponding to the interaction node includes an interaction question used for being compared with the received user interaction information and an interaction answer used for determining a next proceeding trend for the multi-round questioning and answering flow modules.

In this embodiment, an interaction node needs to determine, according to the user interaction information, a next proceeding trend for the established multi-round questioning and answering flow module. That is, an interaction node includes at least two branches, and different branches correspond to different proceeding trends for the multi-round questioning and answering flow module. Therefore, different branching conditions are to be set for different branches in the multi-round questioning and answering flow module. For example, as shown in FIG. 1a, on the age inquiry node 101, if it is determined that the user interaction information is "already 20 years old", the multi-round questioning and answering module is proceeded to the proceeding trend (i.e., the car/house inquiry node 103) along the branch A; however, if it is determined that the user interaction module is "under the age of 20", the multi-round questioning and answering flow module will be proceeded to the proceeding trend (i.e., the node 102 for indicating that the age does not satisfy the conditions for loans) along the branch B.

Actually, the expression form of the user interaction information input on an interaction node by the interactive user (i.e., a user who performs questioning and answering interaction with the multi-round questioning and answering system) may be not unique. In other words, multiple different pieces of user interaction information may correspond to a same branching condition. In the previous example, for example, it may be predefined that the multi-round questioning and answering module will be proceeded along the branch A when the user interaction information is "already 20 years old", "adult" or "satisfying the age condition". Thus, in addition to the setting of the dynamic trigger condition for the branch A (connector) as "already 20 years old", it is also necessary to establish interaction knowledge points matching with the interaction node in the knowledge base: (already 20 years old, already 20 years old), (adult, already 20 years old) and (satisfying the age condition, already 20 years old). Meanwhile, a correspondence between the interaction knowledge points and the age inquiry node 101 is established. Similarly, for the branch "under the age of 20", it is also necessary to establish interaction knowledge points matching with the interaction node in the knowledge base: (under the age of 20, under the age of 20), (under age, under the age of 20) and (not satisfying the age condition, under the age of 20). Therefore, it is necessary to establish a correspondence between the age inquiry node 101 and total six knowledge points. It should be understood that the knowledge points corresponding to interaction nodes are different from questioning and answering knowledge points in the prior art. Therefore, for ease of distinguishing, the knowledge points corresponding to interaction nodes are referred to as interaction knowledge points hereinafter.

The first half part in each bracket represents an interaction question in an interaction knowledge point and is used for being compared with the received user interaction information, and the second half part in each bracket represents an interaction answer in the interaction knowledge point and is used for determining a next proceeding trend for the multi-round questioning and answering flow module.

By the above operations, when the multi-round questioning and answering flow module is proceeded to the age inquiry node 101, no matter whether the interactive user inputs "already 20 years old" or "adult", the user interaction information can match with the interaction answer "already 20 years old" in the knowledge base. Upon acquiring the interaction answer "already 20 years old", the multi-round questioning and answering system can determine that the interaction answer matches with the dynamic trigger condition set for the branch A, and the multi-round questioning and answering flow module is proceeded downward along the branch A.

It is to be emphasized again that the interaction knowledge points corresponding to the interaction nodes stored in the knowledge base are different from the questioning and answering knowledge points stored in the knowledge base. As described above, the questioning and answering knowledge points generally include questions and corresponding answers (also referred to as "question-answer" pairs). The questioning and answering knowledge points are mainly applicable to a scenario where questioning and answering interaction is performed with an interactive user. A question in a questioning and answering knowledge point is used for being compared with the user interaction information of the interactive user. If the question successfully matches with the user interaction information of the interactive user, the answer in this questioning and answering knowledge point is fed back to the interactive user, or a control program matching with the answer content is invoked.

In other words, the questioning and answering knowledge points can directly determine the result of interaction processing corresponding to the user interaction information (for example, the answer content is fed back or a set control program is invoked), while the interaction knowledge points are used for determining the branching conditions for the multi-round questioning and answering system. They are used for different purposes. To easily distinguish the two kinds of knowledge points in different application scenarios, the interaction knowledge points and the questioning and answering knowledge points are stored at different storage locations in the knowledge base, or the interaction knowledge points are labeled with knowledge point tags different from the questioning and answering knowledge points.

Actually, the main purpose of setting the interaction knowledge points is as follows: for a same interaction node, the content of the received user interaction information may be varied, for example, "already 20 years old" or "adult" in the previous example; however, in order to ensure the conciseness of the multi-round questioning and answering system, single condition content is generally used during the configuration of one branching condition for the interaction node, for example, "already 20 years old". Therefore, the concept of the interaction knowledge node is introduced. By setting multiple interaction knowledge points in the knowledge base under a same branching condition for a same interaction node, i.e., by corresponding multiple different interaction questions for a same branch to a same interaction answer, multiple similar expression contents may correspond to one branching condition.

In other embodiments of the present invention, when the questioning and answering knowledge points and the interaction knowledge points are different, it is also possible to not distinguish the both, which shall also fall into the protection scope of the present invention.

As described above, one multi-round questioning and answering flow module may include multiple connectors for connecting different nodes. Therefore, by configuring custom configuration information of a connector for connecting an upper-layer interaction node and a lower-layer node, a next proceeding trend for the multi-round questioning and answering flow module can be determined.

Correspondingly, the custom configuration information may include dynamic condition configuration information matching with the connector. The connector is used for connecting an associated upper-layer node and an associated lower-layer node. The associated upper-layer node is an interaction node. The dynamic condition configuration information is a condition for controlling the proceeding of the multi-round questioning and answering flow module from the associated upper-layer node to the associated lower-layer node. The dynamic condition configuration information matches with an interaction answer in a knowledge point corresponding to the associated upper-layer node in the knowledge base.

The thematic knowledge point addition module 1050 is configured to add, in the knowledge base, a thematic knowledge point corresponding to each of the multi-round questioning and answering flow modules, wherein the thematic knowledge point includes a thematic question used for representing a trigger condition for the multi-round questioning and answering flow module and a thematic answer used for establishing a trigger relationship between the thematic knowledge point and the multi-round questioning and answering flow module.

In this embodiment, after the multi-round questioning and answering flow modules (codes for implementing the multi-round questioning and answering flowcharts) are generated and the correspondence between each of the interaction nodes and one or more knowledge points is established in the knowledge base, in order to realize the normal operation of the multi-round questioning and answering flow modules, a thematic knowledge point corresponding to each of the multi-round questioning and answering flow modules needs to be further added in the knowledge base.

It is to be noted that, in this embodiment, an implementation of generating multi-round questioning and answering flow modules and then establishing thematic knowledge points is provided. However, it should be understood by those skilled in the art that the process of establishing thematic knowledge points may not be limited to being executed after the generation of the multi-round questioning and answering flow modules. This will not be limited here. For example, it is possible to first establish thematic knowledge points and then establish corresponding multi-round questioning and answering flow modules.

Actually, the difference between the thematic knowledge points and the questioning and answering knowledge points in the knowledge base lies in that: when the user interaction information input by the interactive user matches with a question in a questioning and answering knowledge point, an answer in this questioning and answering knowledge point will be directly output, or a control program matching with the answer content will be invoked; however, when the user interaction information (collectively referred to as initial request information hereinafter) input by the interactive user matches with a thematic question in a thematic knowledge point, the multi-round questioning and answering flow module will be correspondingly triggered (for example, a root node of the multi-round questioning and answering flow module is directly triggered).

Typically, a thematic answer in a thematic knowledge point may be a storage address or an invocation address of a multi-round questioning and answering flow module corresponding to the thematic knowledge point or other information capable of accurately positioning the multi-round questioning and answering flow module.

This embodiment of the present invention provides a device for generating a multi-round questioning and answering system. Based on graphic multi-round questioning and answering flowcharts and custom configuration information set for graphic components in the multi-round questioning and answering flowcharts, multi-round questioning and answering flow modules for realizing functions of the multi-round questioning and answering flowcharts can be generated automatically. Subsequently, by establishing, in the knowledge base, a correspondence between multiple interaction nodes in the multi-round questioning and answering flowcharts and one or more knowledge points and adding, in the knowledge base, a thematic knowledge point corresponding to each of the multi-round questioning and answering flow modules, the multi-round questioning and answering systems generated based on the multi-round questioning and answering flow modules can be used flexibly. By the technical solutions in this embodiment of the present invention, a device for generating a multi-round questioning and answering system in a WYSIWYG manner is provided. The existing implementations of the multi-round questioning and answering system are optimized, and the multi-round questioning and answering system is quickly constructed and updated. Moreover, the introduction of developers during the generation of the multi-round questioning and answering system is avoided, the workload of the developers is greatly decreased, the cost is reduced, and the accuracy and efficiency are improved.

Figure 11:
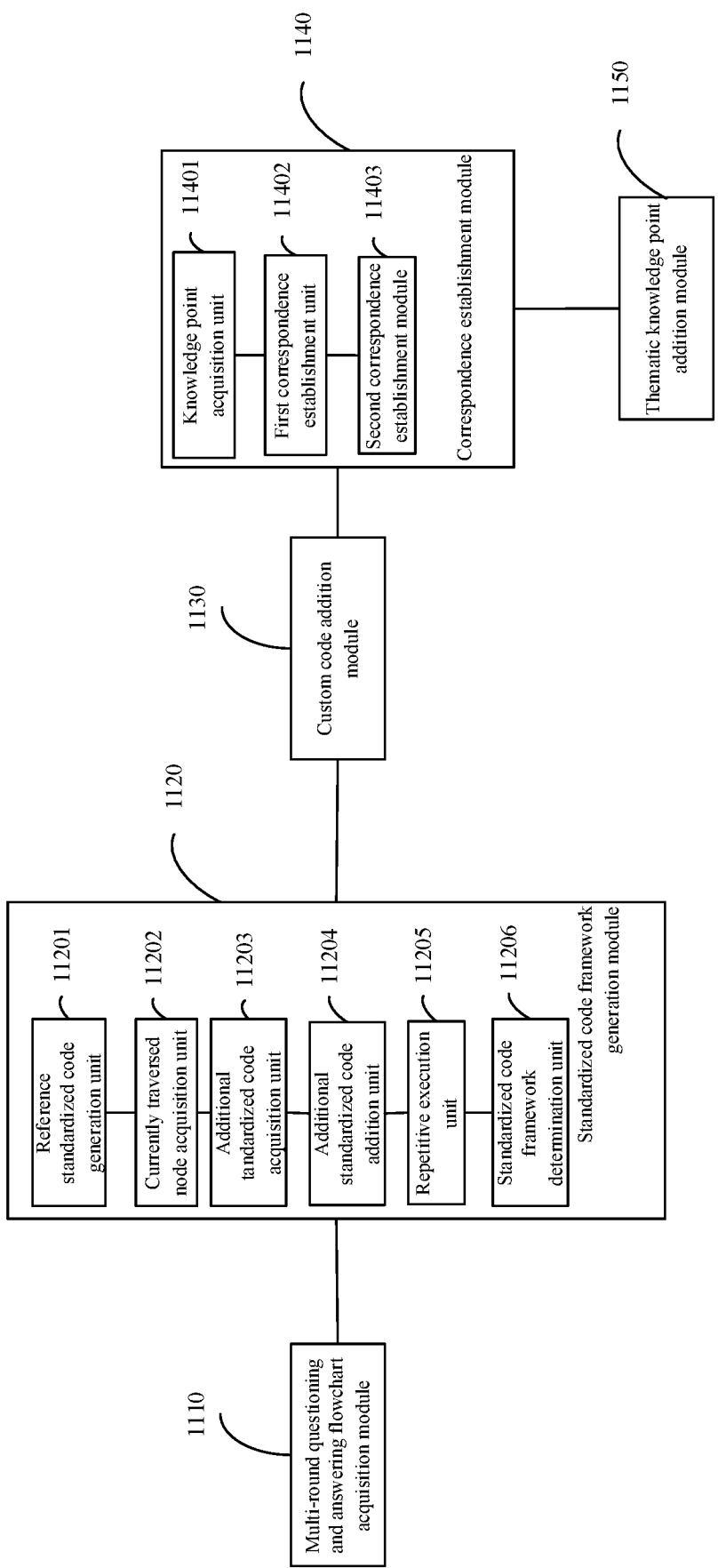
FIG. 11 is a schematic structure diagram of the device for generating a multi-round questioning and answering system according to another embodiment of the present invention.

FIG. 11 is a schematic structure diagram of the device for generating a multi-round questioning and answering system according to another embodiment of the present invention. As shown in FIG. 11, this embodiment is optimized based on the above embodiments. In this embodiment, the standardized code framework generation module and the correspondence establishment module are subdivided.

Correspondingly, the system in this embodiment specifically includes a multi-round questioning and answering flowchart acquisition module 1110, a standardized code framework generation module 1120, a custom code addition module 1130, a correspondence establishment module 1140 and a thematic knowledge point addition module 1150, wherein the standardized code framework generation module 1120 includes:

a reference standardized code generation unit 11201 configured to acquire a root node in the multi-round questioning and answering flowchart, generate a reference standardized code corresponding to the root node according to the type of the root node, and add the reference standardized code in an original code framework; and a currently traversed node acquisition unit 11202 configured to successively acquire, starting from a next layer of the root node, one node in the multi-round questioning and answering flowchart as the currently traversed node. Typically, if there are multiple nodes in the next layer of the root node, in a certain traversal order, for example, from left to right or from right to left, all nodes in this layer are traversed, and nodes in the next layer are continuously traversed.

The standardized code framework generation module 1120 also includes an additional standardized code acquisition unit 11203 configured to acquire, according to the type of the currently traversed node, an additional standardized code corresponding to the currently traversed node; an additional standardized code addition unit 11204 configured to correspondingly add, according to a position of a standardized code of an upper-layer node connected to the currently traversed node via a connector in the original code framework, the additional standardized code in the original code framework; an repetitive execution unit 11205 configured to trigger the currently traversed node code acquisition unit to continue an execution until all nodes in the multi-round questioning and answering flowchart are processed; and, a standardized code framework determination unit 11206 configured to use the original code framework obtained after this processing as a standardized code framework matching with the multi-round questioning and answering flowchart.

It is to be noted that, in this embodiment of the present invention, a case in which a standardized code framework is generated according to the already drawn multi-round questioning and answering flowchart is described. Actually, the standardized code framework can be updated and generated in real time during the drawing of the multi-round questioning and answering flowchart. In this embodiment, the time for generating the standardized code framework will not be limited.

In addition, the correspondence establishment module 1140 includes:

a knowledge point acquisition unit 11401 configured to acquire one or more knowledge points input for each interaction node in each multi-round questioning and answering system; and a first correspondence establishment unit 11402 configured to establish a new knowledge point in the knowledge base if it is determined that the knowledge base does not include the input knowledge point, and establish, in the knowledge base, a correspondence between the established new knowledge point and the interaction nodes in the corresponding multi-round questioning and answering system. In this embodiment, an application scenario where multiple multi-round questioning and answering flow modules may correspond to one knowledge point in the knowledge base is taken into consideration. For example, the age inquiry interaction node needs to be used in the multi-round questioning and answering system for installment loan consultation shown in FIG. 1a, and the age inquiry interaction node also needs to be used in a multi-round questioning and answering system for credit card transaction consultation. Therefore, it is unnecessary to set, in the knowledge base, multiple repeated knowledge points for a same interactive node.

Correspondingly, when one or more multiple knowledge points input for an interaction node in a multi-round questioning and answering flowchart by a flow designer are acquired, different operations is executed according to the absence or presence of the knowledge point in the knowledge base; if the knowledge point is stored in the knowledge base, a correspondence between the knowledge point and the interaction node is directly established; and, if the knowledge point is not stored in the knowledge base, the knowledge point is first established in the knowledge base, and a correspondence between the knowledge point and the interaction node is then established. In this way, on the basis of ensuring the normal information inquiry, the total amount of information stored in the knowledge base is greatly reduced.

The correspondence establishment module 1140 further includes a second correspondence establishment module 11403 configured to directly establish, in the knowledge base, a correspondence between the existing knowledge nodes and the interaction nodes in the corresponding multi-round questioning and answering system if it is determined that the input knowledge point is included in the knowledge base.

In the technical solutions in this embodiment of the present invention, by generating a corresponding standardized code framework based on the already drawn multi-round questioning and answering flowchart, the defect that the standardized code framework is correspondingly updated in response to the modification to the multi-round questioning and answering flowchart when the standardized code framework is generated during the drawing of the flowchart is avoided, and the efficiency of generating the multi-round questioning and answering flow module is improved. In addition, in this embodiment of the present invention, the knowledge points corresponding to the interaction nodes are not repetitively stored, the total amount of information in the knowledge base can be greatly reduced.

Figure 12:
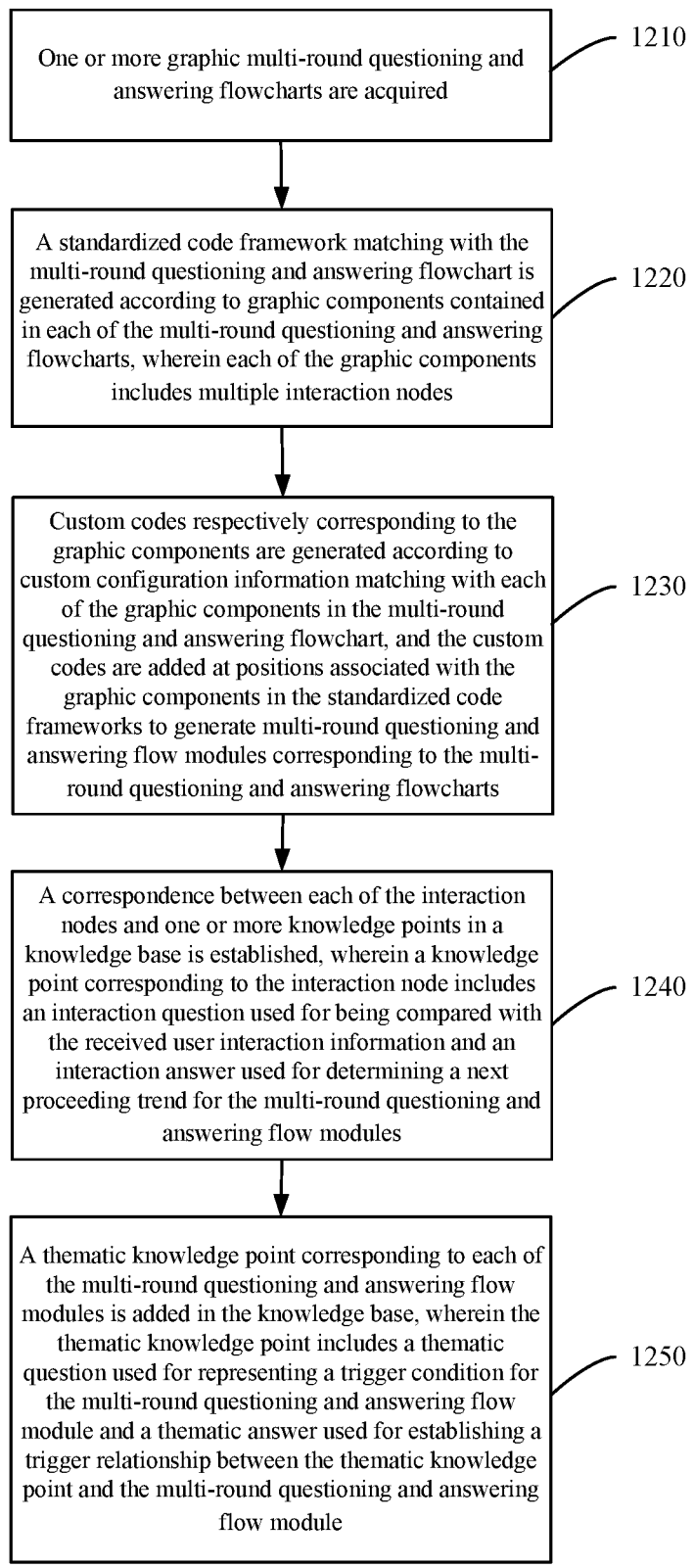
FIG. 12 is a flowchart of a method for generating a multi-round questioning and answering system according to an embodiment of the present invention.

FIG. 12 is a flowchart of a method for generating a multi-round questioning and answering system according to an embodiment of the present invention. As shown in FIG. 12, this embodiment is suitable for generating a multi-round questioning and answering system according to a multi-round questioning and answering flowchart. The multi-round questioning and answering system may be specifically a system capable of realizing multiple rounds of questioning and answering interaction with an interactive user. The method may be executed by a device for generating a multi-round questioning and answering system provided in the embodiments of the present invention. The device may be implemented by software and/or hardware, which may generally be integrated into a terminal apparatus or server for generating the multi-round questioning and answering system. The terminal apparatus or server is directly or indirectly connected to a knowledge base. The method in this embodiment specifically includes the following steps.

Step 1210: One or more graphic multi-round questioning and answering flowcharts are acquired.

In this embodiment, the multi-round questioning and answering flowchart may specifically be graphic flowcharts obtained by selecting and combining graphic components in a set flow edition interface by a flow designer.

The graphic components may include nodes and connectors (typically connection lines) for connecting different nodes. The nodes include interaction nodes. The interaction nodes are specifically nodes capable of realizing a questioning and answering (possibly one question corresponding to one answer, or one question corresponding to multiple answers) interaction with an interactive user. On the interaction nodes, a next proceeding trend for the multi-round questioning and answering flowchart can be determined according to the user interaction information input by the user.

In terms of the overall structure of the multi-round questioning and answering flowchart, one multi-round questioning and answering flowchart may include a root node representing the start of the flow, and one or more termination node representing the end of the flow. In addition, the multi-round questioning and answering flowchart may further include multiple layers of interaction nodes, and each layer of interaction nodes includes one or more interaction nodes. One layer of interaction nodes corresponds to one questioning and answering stage.

Of course, it should be understood that, in addition to the interaction nodes, the nodes may further include broadcast nodes, variable setup nodes, recording nodes, etc. This will not be limited in this embodiment. Generally, in one multi-round questioning and answering flowchart, the root node is an interaction node, and the termination node is a broadcast node.

As shown in FIG. 1a, in the multi-round questioning and answering flowchart, rhombic graphic components are interaction nodes (for example, an age inquiry node 101), and the square graphic components are broadcast nodes (for example, a node 102 for indicating that the age does not satisfy the conditions for loans). The nodes are connected by node-to-node connection lines. The multi-round questioning and answering flowchart shown in FIG. 1a includes four layers of interaction nodes. There is one interaction node in each layer. That is, the first layer includes an age inquiry node 101 (a root node), representing an age inquiry stage; the second layer includes a car/house inquiry node 103, representing a car/house inquiry stage; the third layer includes a loan amount inquiry node 106, representing a loan amount inquiry stage; and, the fourth layer includes an installment inquiry node 107, representing an installment inquiry stage. According to the different input interaction content, each interaction node will correspondingly determine a different proceeding trend for the multi-round questioning and answering flowchart. In addition, the multi-round questioning and answering flowchart includes multiple termination nodes, i.e., a node 102 for indicating that the age does not satisfy the conditions for loans, a node 109 prompting that the quota is exceeded, a node 108 prompting that the number of installments is exceeded, and a node 10A broadcasting the result of loan installment.

Step 1220: A standardized code framework matching with the multi-round questioning and answering flowchart is generated according to graphic components contained in each of the multi-round questioning and answering flowcharts, wherein each of the graphic components includes multiple interaction nodes.

In this embodiment, a multi-round questioning and answering flow module which can be generated automatically is provided. Correspondingly, standard implementation codes matching with different types of graphic components are provided in advance. For example, standard implementation codes respectively corresponding to the interaction nodes and broadcast nodes are established and packaged in different library files, and correspondences between the standard implementation codes and the corresponding graphic components are established in advance. Typically, storage addresses (or reference addresses) for the standard implementation codes matching with the graphic components are written in a flow edition interface in advance. Correspondingly, a matched standardized code framework can be automatically generated based on the graphic components contained in the multi-round questioning and answering flowchart drawn in the flow edition interface.

It is to be noted that, since the method for generating a multi-round questioning and answering system is what this embodiment of the present invention mainly focuses on, multiple interaction nodes are included in a multi-round questioning and answering flowchart. However, theoretically, by the technical solutions in this embodiment of the present invention, any type of questioning and answering systems can be generated, and the corresponding standardized code framework can be obtained just by drawing the corresponding flowchart according to actual requirements, and the corresponding flow modules can be thus obtained.

Step 1230: Custom codes respectively corresponding to the graphic components are generated according to custom configuration information matching with each of the graphic components in the multi-round questioning and answering flowchart, and the custom codes are added at positions associated with the graphic components in the standardized code frameworks to generate multi-round questioning and answering flow modules corresponding to the multi-round questioning and answering flowcharts.

It should be understood that, the standard implementation codes matching with the graphic components include only general functions which can be realized by the corresponding graphic components. For example, for an interaction node, the corresponding standard implementation code includes a decision logic; or, for a broadcast node, the corresponding standard implementation code includes a broadcast logic, and the like. To enable a graphic component to realize its function in the multi-round questioning and answering flowchart, corresponding custom configuration parameters are to be input.

In a simple example, for the node 102 for indicating that the age does not satisfy the conditions for loans in FIG. 1a, the content "the age does not satisfy the conditions for loans" can be broadcast after the node 102 for indicating that the age does not satisfy the conditions for loans is triggered. Correspondingly, the "the age does not satisfy the conditions for loans" is a function given to the node 102 for indicating that the age does not satisfy the conditions for loans. In order to enable the node 102 for indicating that the age does not satisfy the conditions for loans to realize this function, the broadcast content needs to be added in the standardized code framework as custom configuration information.

Typically, it is possible to reserve a blank code segment at a set position in the standard implementation code matching with each graphic component. When a custom configuration parameter input for a graphic component in the multi-round questioning and answering flowchart is acquired (for example, input through a parameter configuration interface provided by the flow edition interface), a custom code matching with the custom configuration parameter is added in the corresponding blank code segment to realize the custom function of the graphic component.

Optionally, it is possible to directly add the custom configuration information (e.g., the age does not satisfy the conditions for loans) in the standardized code framework as a custom code; or, it is also possible to compare the custom configuration information (e.g., a rejection-preferred activation option or a knowledge-preferred activation option) with prewritten custom codes matching with different custom configuration information and add the matching prewritten custom code in the standardized code framework. This will not be limited in this embodiment.

Correspondingly, if all graphic components in one multi-round questioning and answering flowchart are customized, implementation codes capable of realizing the functions of the multi-round questioning and answering flowchart can be generated, that is, a multi-round questioning and answering flow module in this embodiment of the present invention is generated.

Step 1240: A correspondence between each of the interaction nodes and one or more knowledge points in a knowledge base is established, wherein a knowledge point corresponding to the interaction node includes an interaction question used for being compared with the received user interaction information and an interaction answer used for determining a next proceeding trend for the multi-round questioning and answering flow modules.

In this embodiment, an interaction node needs to determine, according to the user interaction information, a next proceeding trend for the established multi-round questioning and answering flow module. That is, an interaction node includes at least two branches, and different branches correspond to different proceeding trends for the multi-round questioning and answering flow module. Therefore, different branching conditions are to be set for different branches in the multi-round questioning and answering flow module. For example, as shown in FIG. 1a, on the age inquiry node 101, if it is determined that the user interaction information is "already 20 years old", the multi-round questioning and answering answering module will be proceeded to the proceeding trend (i.e., the car/house inquiry node 103) along the branch A; however, if it is determined that the user interaction module is "under the age of 20", the multi-round questioning and answering flow module will be proceeded to the proceeding trend (i.e., the node 102 for indicating that the age does not satisfy the conditions for loans) along the branch B.

Actually, the expression form of the user interaction information input on an interaction node by the interactive user (i.e., a user who performs questioning and answering interaction with the multi-round questioning and answering system) may be not unique. In other words, multiple different pieces of user interaction information may correspond to a same branching condition. In the previous example, for example, it may be predefined that the multi-round questioning and answering module will be proceeded along the branch A when the user interaction information is "already 20 years old", "adult" or "satisfying the age condition". Thus, in addition to the setting of the dynamic trigger condition for the branch A (connector) as "already 20 years old", it is also necessary to establish, in the knowledge base, interaction knowledge points matching with the interaction nodes: (already 20 years old, already 20 years old), (adult, already 20 years old) and (satisfying the age condition, already 20 years old). Meanwhile, a correspondence between the interaction knowledge points and the age inquiry node 101 is established. Similarly, for the branch "under the age of 20", it also necessary to establish, in the knowledge base, interaction knowledge points matching with the interaction node in the knowledge base: (under the age of 20, under the age of 20), (under age, under the age of 20) and (not satisfying the age condition, under the age of 20). Therefore, it is necessary to establish a correspondence between the age inquiry node 101 and total six knowledge points. It should be understood that, the knowledge points corresponding to interaction nodes are different from questioning and answering knowledge points in the prior art. Therefore, for ease of distinguishing, the knowledge points corresponding to interaction nodes are referred to as interaction knowledge points hereinafter.

The first half part in each bracket represents an interaction question in an interaction knowledge point and is used for being compared with the received user interaction information, and the second half part in each bracket represents an interaction answer in the interaction knowledge point and is used for determining a next proceeding trend for the multi-round questioning and answering flow module.

By the above operations, when the multi-round questioning and answering flow module is proceeded to the age inquiry node 101, no matter whether the interactive user inputs "already 20 years old" or "adult", the user interaction information can match with the interaction answer "already 20 years old" in the knowledge base. Upon acquiring the interaction answer "already 20 years old", the multi-round questioning and answering system can determine that the interaction answer matches with the dynamic trigger condition set for the branch A, and the multi-round questioning and answering flow module is proceeded downward along the branch A.

It is to be emphasized again that the interaction knowledge points corresponding to the interaction nodes stored in the knowledge base are different from the questioning and answering knowledge points stored in the knowledge base. As described above, the questioning and answering knowledge points generally include questions and corresponding answers (also referred to as "question-answer" pairs). The questioning and answering knowledge points are mainly applicable to a scenario where questioning and answering interaction is performed with an interactive user. A question in a questioning and answering knowledge point is used for being compared with the user interaction information of the interactive user. If the question successfully matches with the user interaction information of the interactive user, the answer in this questioning and answering knowledge point is fed back to the interactive user, or a control program matching with the answer content is invoked.

In other words, the questioning and answering knowledge points can directly determine the result of interaction processing corresponding to the user interaction information (for example, the answer content is fed back or a set control program is invoked), while the interaction knowledge points are used for determining the branching conditions for the multi-round questioning and answering system. They are used for different purposes. To easily distinguish the two kinds of knowledge points in different application scenarios, the interaction knowledge points and the questioning and answering knowledge points are stored at different storage locations in the knowledge base, or the interaction knowledge points are labeled with knowledge point tags different from the questioning and answering knowledge points.

Actually, the main purpose of setting the interaction knowledge points is as follows: for a same interaction node, the content of the received user interaction information may be varied, for example, "already 20 years old" or "adult" in the previous example; however, in order to ensure the design conciseness of the multi-round questioning and answering system, single condition content is generally used during the configuration of one branching condition for the interaction node, for example, "already 20 years old". Therefore, the concept of the interaction knowledge node is introduced. By setting multiple interaction knowledge points in the knowledge base under a same branching condition for a same interaction node, i.e., by corresponding multiple different interaction questions for a same branch to a same interaction answer, multiple similar expression contents may correspond to one branching condition.

In other embodiments of the present invention, when the questioning and answering knowledge points and the interaction knowledge points are different, it is also possible to not distinguish the both, which shall also fall into the protection scope of the present invention.

As described above, one multi-round questioning and answering flow module may include multiple connectors for connecting different nodes. Therefore, by configuring custom configuration information of a connector for connecting an upper-layer interaction node and a lower-layer node, a next proceeding trend for the multi-round questioning and answering flow module can be determined.

Correspondingly, the custom configuration information may include dynamic condition configuration information matching with the connector. The connector is used for connecting an associated upper-layer node and an associated lower-layer node, and the associated upper-layer node is an interaction node. The dynamic condition configuration information is a condition for controlling the proceeding of the multi-round questioning and answering flow module from the associated upper-layer node to the associated lower-layer node. The dynamic condition configuration information matches with an interaction answer in a knowledge point corresponding to the associated upper-layer node in the knowledge base.

Step 1250: A thematic knowledge point corresponding to each of the multi-round questioning and answering flow modules is added in the knowledge base, wherein the thematic knowledge point includes a thematic question used for representing a trigger condition for the multi-round questioning and answering flow module and a thematic answer used for establishing a trigger relationship between the thematic knowledge point and the multi-round questioning and answering flow module.

In this embodiment, after the multi-round questioning and answering flow modules (codes for implementing the multi-round questioning and answering flowcharts) are generated and the correspondence between each of the interaction nodes and one or more knowledge points is established in the knowledge base, in order to realize the normal operation of the multi-round questioning and answering flow modules, a thematic knowledge point corresponding to each of the multi-round questioning and answering flow modules needs to be further added in the knowledge base.

It is to be noted that, in this embodiment, an implementation of generating multi-round questioning and answering flow modules and then establishing thematic knowledge points is provided. However, it should be understood by those skilled in the art that the process of establishing thematic knowledge points may not be limited to being executed after the generation of the multi-round questioning and answering flow modules. This will not be limited here. For example, it is possible to first establish thematic knowledge points and then establish corresponding multi-round questioning and answering flow modules.

Actually, the difference between the thematic knowledge points and the questioning and answering knowledge points in the knowledge base lies in that: when the user interaction information input by the interactive user matches with a question in a questioning and answering knowledge point, an answer in this questioning and answering knowledge point will be directly output, or a control program matching with the answer content will be invoked; however, when the user interaction information (collectively referred to as initial request information hereinafter) input by the interactive user matches with a thematic question in a thematic knowledge point, the multi-round questioning and answering flow module will be correspondingly triggered (for example, a root node of the multi-round questioning and answering flow module is directly triggered).

Typically, a thematic answer in a thematic knowledge point may be a storage address or an invocation address of a multi-round questioning and answering flow module corresponding to the thematic knowledge point or other information capable of accurately positioning the multi-round questioning and answering flow module.

This embodiment of the present invention provides a method for generating a multi-round questioning and answering system. Based on graphic multi-round questioning and answering flowcharts and custom configuration information set for graphic components in the multi-round questioning and answering flowcharts, multi-round questioning and answering flow modules for realizing functions of the multi-round questioning and answering flowcharts can be generated automatically. Subsequently, by establishing, in the knowledge base, a correspondence between multiple interaction nodes in the multi-round questioning and answering flowcharts and one or more knowledge points and adding, in the knowledge base, a thematic knowledge point corresponding to each of the multi-round questioning and answering flow modules, the multi-round questioning and answering systems generated based on the multi-round questioning and answering flow modules can be used flexibly. By the technical solutions in this embodiment of the present invention, a method for generating a multi-round questioning and answering system in a WYSIWYG manner is provided. The existing implementations of the multi-round questioning and answering system are optimized, and the multi-round questioning and answering system is quickly constructed and updated. Moreover, the introduction of developers during the generation of the multi-round questioning and answering system is avoided, the workload of the developers is greatly decreased, the cost is reduced, and the accuracy and efficiency are improved.

Based on the above embodiments, the custom configuration information may further include a rejection-preferred option corresponding to the interaction node.

When the multi-round questioning and answering flow module is proceeded to a first interaction node at which a rejection-preferred function is activated, and if it is determined that the received user interaction information does not match with an interaction question in at least one knowledge point corresponding to the first interaction node in the knowledge base, a rejection response is provided, and the user is requested to input the user interaction information again.

In other words, if a rejection-preferred function is activated on an interaction node, only an interaction question based on this interaction node can be recognized in the interaction node. Typically, if the rejection-preferred option is set for an interaction node in the multi-round questioning and answering flowchart, a prewritten custom code matching with the rejection-preferred function is acquired, and the custom code is added at a position associated with the interaction node in the standardized code framework.

By providing the rejection-preferred option, it is ensured that the multi-round questioning and answering system can execute in the predesigned flow order, and any skipping or feedback due to some user-input problems that cannot be recognized by the multi-round questioning and answering system will not occur, so that the whole multi-round questioning and answering system has better regularity and orderness.

In addition to the rejection-preferred option, the custom configuration information may further include a knowledge-preferred option corresponding to the interaction node.

When the multi-round questioning and answering flow module is proceeded to a second interaction node at which a knowledge-preferred function is activated, and if it is determined that the received user interaction information does not match with all of the interaction questions in the at least one knowledge point corresponding to the second interaction node in the knowledge base, the user interaction information is globally searched in the knowledge base, and a corresponding interaction operation is executed according to the result of the global search.

In other words, if an interaction node is configured with a knowledge-preferred option, an interaction question based on this interaction node will be first recognized in the interaction node; and, if the interaction question is recognized unsuccessfully, questions in other knowledge points will be continuously recognized in the knowledge base. Typically, if the knowledge-preferred option is set for an interaction node in the multi-round questioning and answering flowchart, a prewritten custom code matching with the knowledge-preferred function is acquired, and the custom code is added at a position associated with the interaction node in the standardized code framework.

By providing the knowledge-preferred option, the flexibility in execution of the multi-round questioning and answering system is ensured, and the questioning and answering interaction with the user can be well performed even when it is determined that the user interaction information does not match with the node to which the multi-round questioning and answering flow module is proceeded currently, so that the user's degree of satisfaction is further improved.

In a specific example, for a multi-round interaction system corresponding to the flowchart shown in FIG. 1a, the interaction node (i.e., the age inquiry node 101) corresponds to six interaction knowledge points, and the interaction questions in the six interaction knowledge points are "already 20 years old", "adult", "satisfying the age condition", "under the age of 20", "under age" and "not satisfying the age condition", respectively. When the input user interaction information does not match with all the six interaction questions, for example, "How's the weather today", and if the age inquiry node 101 is configured with a rejection-preferred option, the multi-round questioning and answering system will not give any corresponding feedback for the user interaction information, and will stay on the age inquiry node 101 to wait for new interaction information re-input by the user; and, if the age inquiry node 101 is configured with a knowledge-preferred option, the multi-round questioning and answering system will search, in the knowledge base, a questioning and answering knowledge point corresponding to the question on the weather, and then will feed back an answer in the questioning and answering knowledge point, for example, "Today is a sunny day, 25° C.".

Based on the above embodiments, the custom configuration information may further include a backtrack option corresponding to the interaction node.

When the multi-round questioning and answering flow module is proceeded to a third interaction node at which a backtrack function is activated, and if it is determined that the received user interaction information matches with an interaction question in an upper-layer node of the third interaction node in the knowledge base, the multi-round questioning and answering flow module is proceeded to the upper-layer node of the third interaction node.

By providing the backtrack function, the multi-round questioning and answering system can have higher universality. During the questioning and answering interaction of the multi-round questioning and answering system with a user, the proceeding trend for the whole multi-round questioning and answering system can be readjusted at any time according to the content input by the user. Particularly, the process can be returned to an interaction node that has already been executed, and a next proceeding trend based on the interaction node can be determined again, so that the user's actual demands for multiple rounds of questioning and answering interaction can be better satisfied.

In a specific example, for a multi-round interaction system corresponding to the flowchart shown in FIG. 1a, the user inputs the user interaction information "under the age of 20" for the age inquiry node 101; and correspondingly, the multi-round questioning and answering system is proceeded, along the branch B, to the node 102 indicating the age does not satisfy the conditions for loans, and then broadcasts the corresponding broadcast content to the user. In this case, if the user inputs the user interaction information "already 20 year" again, the multi-round questioning and answering system will be proceeded (backtracked) to the age inquiry node 101; and, according to the content input by the user, the multi-round questioning and answering system is proceeded to the car/house inquiry node 103 along the branch A to continue the questioning and answering interaction with the user.

Specifically, the graphic components may further include broadcast nodes. Correspondingly, the custom configuration information may include broadcast content corresponding a node, and the node includes an interaction node and a broadcast node.

If the multi-round questioning and answering flow module is proceeded to a fourth node configured with broadcast content, the broadcast content corresponding to the fourth node is correspondingly broadcast.

In a specific example, as shown in FIG. 1a, when the multi-round questioning and answering system is proceeded to an interaction node (i.e., car/house inquiry node 103), the interaction node will first broadcast the preset broadcast content, for example, "Do you have any car or house", and a next proceeding trend for the multi-round questioning and answering system will be determined based on the subsequently received user interaction information; and when the multi-round questioning and answering system is proceeded to the broadcast node for indicating that the condition for ¥200,000 loan is satisfied, the broadcast node will directly broadcast the preset broadcast content, for example, "The condition for ¥200,000 loan is satisfied".

By providing the broadcast content, effective questioning and answering interaction with the user can be performed, and the interaction content to be input by the user next can be effectively prompted.

Based on the above embodiments, the custom configuration information may further include an interrupt option corresponding to a node.

When the multi-round questioning and answering flow module is proceeded to a fifth node at which an interrupt function is activated, and if the user interaction information is received before the broadcasting of the broadcast content corresponding to the fifth node ends, the broadcasting of the broadcast content is stopped.

The advantages of providing the interrupt option, lie in that: if a user is familiar with the interaction process of the whole multi-round questioning and answering system, the user can quickly input the required interaction information without waiting for the end of broadcasting of a node in the multi-round questioning and answering system. The efficiency of the human-machine interaction is further improved.

In a specific example, as shown in FIG. 1a, when the multi-round questioning and answering system is proceeded to an interaction node (i.e., the car/house inquiry node 103), if "I have a car, no house" input by the user is received during the broadcasting of "Do you have any car or house" by the interaction node, the broadcasting of the broadcast content will be stopped. Instead, the multi-round questioning and answering system quickly is proceeded to the node 104 for indicating that the condition for ¥200,000 loan is satisfied, so as to realize interaction with the user. The time for the whole questioning and answering interaction is reduced.

In the technical solutions in this embodiment of the present invention, for various functions to be possibly used by the multi-round questioning and answering system, corresponding implementation codes are written and packaged, so that a flow designer can conveniently select or input the required custom configuration according to the actual design requirements. Accordingly, the universality and the user's degree of satisfaction about the method for generating a multi-round questioning and answering system in this embodiment of the present invention are further improved.

To facilitate the understanding, FIG. 1b shows a schematic diagram of custom configuration information input to an interaction node. As shown in FIG. 1b, a schematic diagram of custom configuration information for the age inquiry node 101 in FIG. 1a is given. In an input box corresponding to "knowledge", all interaction questions corresponding to the age inquiry node 101 can be input.

FIG. 1c shows a schematic diagram of custom configuration information input to a broadcast node. As shown in FIG. 1c, a schematic diagram of custom configuration information for the node 109 prompting that the quota is exceeded in FIG. 1a is given. In an answer box, broadcast content corresponding to the node 109 prompting that the quota is exceeded can be input.

FIG. 1d shows a schematic diagram of custom configuration information input to a connector. As shown in FIG. 1c, a schematic diagram of custom configuration information for a connector corresponding to the branch A in FIG. 1a is given, wherein, in an input box corresponding to "condition", a condition for selectively executing the branch can be input.

Typically, when the user double-clicks or clicks a graphic component in the multi-round questioning and answering flowchart, an input template for the custom configuration information is correspondingly popped up, and a flow designer can input different custom configuration information for different graphic components by simple selection and input operations.

Figure 13:
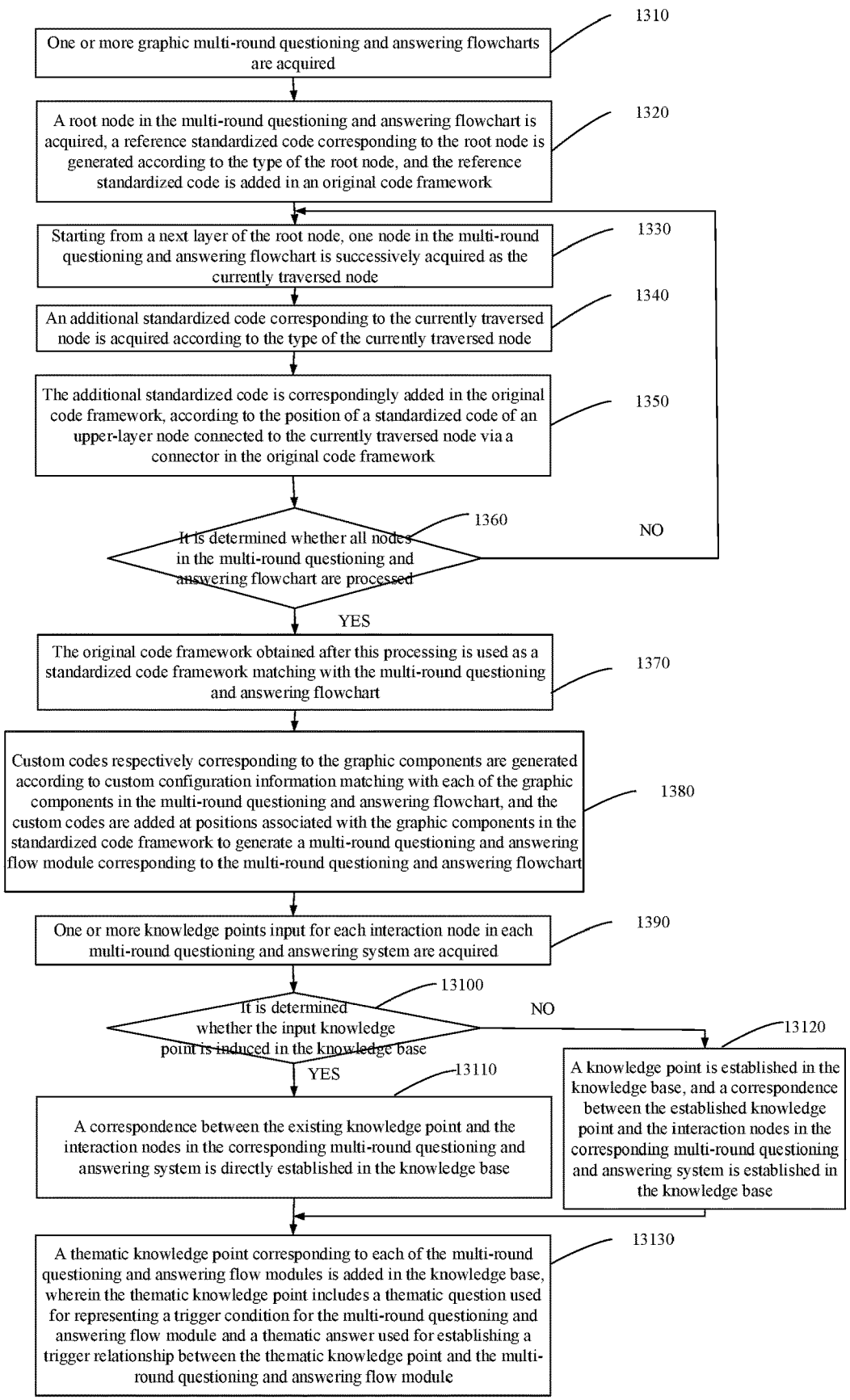
FIG. 13 is a flowchart of the method for generating a multi-round questioning and answering system according to another embodiment of the present invention.

FIG. 13 is a flowchart of the method for generating a multi-round questioning and answering system according to another embodiment of the present invention. As shown in FIG. 13, this embodiment is optimized based on the above embodiments. In this embodiment, the operation of generating, according to graphic components contained in each of the multi-round questioning and answering flowcharts, a standardized code framework matching with the multi-round questioning and answering flowchart and the operation of establishing a correspondence between each of the interaction nodes and one or more knowledge points in a knowledge base are subdivided. Correspondingly, the method in this embodiment of the present invention includes the following steps.

Step 1310: One or more graphic multi-round questioning and answering flowcharts are acquired.

Step 1320: A root node in the multi-round questioning and answering flowchart is acquired, a reference standardized code corresponding to the root node is generated according to the type of the root node, and the reference standardized code is added in an original code framework.

Step 1330: Starting from a next layer of the root node, one node in the multi-round questioning and answering flowchart is successively acquired as the currently traversed node.

Typically, if there are multiple nodes in the next layer of the root node, in a certain traversal order, for example, from left to right or from right to left, all nodes in this layer are traversed, and nodes in the next layer are then traversed.

Step 1340: An additional standardized code corresponding to the currently traversed node is acquired according to the type of the currently traversed node.

Step 1350: The additional standardized code is correspondingly added in the original code framework, according to the position of a standardized code of an upper-layer node connected to the currently traversed node via a connector in the original code framework.

Step 1360: It is determined whether all nodes in the multi-round questioning and answering flowchart are processed; if so, a step 1370 is executed; and if not, the process is returned to the step 1330.

Step 1370: The original code framework obtained after this processing is used as a standardized code framework matching with the multi-round questioning and answering flowchart.

It is to be noted that, in this embodiment of the present invention, a method for generating a standardized code framework according to the already drawn multi-round questioning and answering flowchart is provided. Actually, the standardized code framework can be updated and generated in real time during the drawing of the multi-round questioning and answering flowchart. In this embodiment, the time for generating the standardized code framework will not be limited.

Step 1380: Custom codes corresponding to the graphic components are generated according to custom configuration information matching with the graphic components in each of the multi-round questioning and answering flowchart, and the custom codes are added at positions associated with the graphic components in the standardized code framework to generate a multi-round questioning and answering flow module corresponding to the multi-round questioning and answering flowchart.

Step 1390: One or more knowledge points input for each interaction node in each multi-round questioning and answering system are acquired.

Step 13100: It is determined whether the input knowledge point is induced in the knowledge base; if so, a step 13110 is executed; and if not, a step 13120 is executed.

In this embodiment, an application scenario where multiple multi-round questioning and answering flow modules may correspond to one knowledge point in the knowledge base is taken into consideration. For example, the age inquiry interaction node needs to be used in the multi-round questioning and answering system for installment loan consultation shown in FIG. 1a, and the age inquiry interaction node also needs to be used in a multi-round questioning and answering system for credit card transaction consultation. Therefore, it is unnecessary to set, in the knowledge base, multiple repeated knowledge points for a same interaction node.

Correspondingly, when one or more multiple knowledge points input for an interaction node in a multi-round questioning and answering flowchart by a flow designer are acquired, different operations is executed according to the absence or presence of the knowledge point in the knowledge base; if the knowledge point is stored in the knowledge base, a correspondence between the knowledge point and the interaction node is directly established; and, if the knowledge point is not stored in the knowledge base, the knowledge point is first established in the knowledge base, and a correspondence between the knowledge point and the interaction node is then established. In this way, on the basis of ensuring the normal information inquiry, the total amount of information stored in the knowledge base is greatly reduced.

Step 13110: A correspondence between the existing knowledge point and the interaction nodes in the corresponding multi-round questioning and answering system is directly established in the knowledge base, and a step 13130 is executed.

Step 13120: A knowledge point is established in the knowledge base, and a correspondence between the established knowledge point and the interaction nodes in the corresponding multi-round questioning and answering system is established in the knowledge base, and a step 13130 is executed.

Step 13130: A thematic knowledge point corresponding to each of the multi-round questioning and answering flow modules is added in the knowledge base, wherein the thematic knowledge point includes a thematic question used for representing a trigger condition for the multi-round questioning and answering flow module and a thematic answer used for establishing a trigger relationship between the thematic knowledge point and the multi-round questioning and answering flow module.

In the technical solutions in this embodiment of the present invention, by generating a corresponding standardized code framework based on the already drawn multi-round questioning and answering flowchart, the defect of correspondingly updating the standardized code framework in response to the modification to the multi-round questioning and answering flowchart when the standardized code framework is generated during the drawing of the flowchart is avoided, and the efficiency of generating the multi-round questioning and answering flow module is improved. In addition, in this embodiment of the present invention, the knowledge points corresponding to the interaction nodes are not repetitively stored, the total amount of information in the knowledge base can be greatly reduced.

Figure 14:
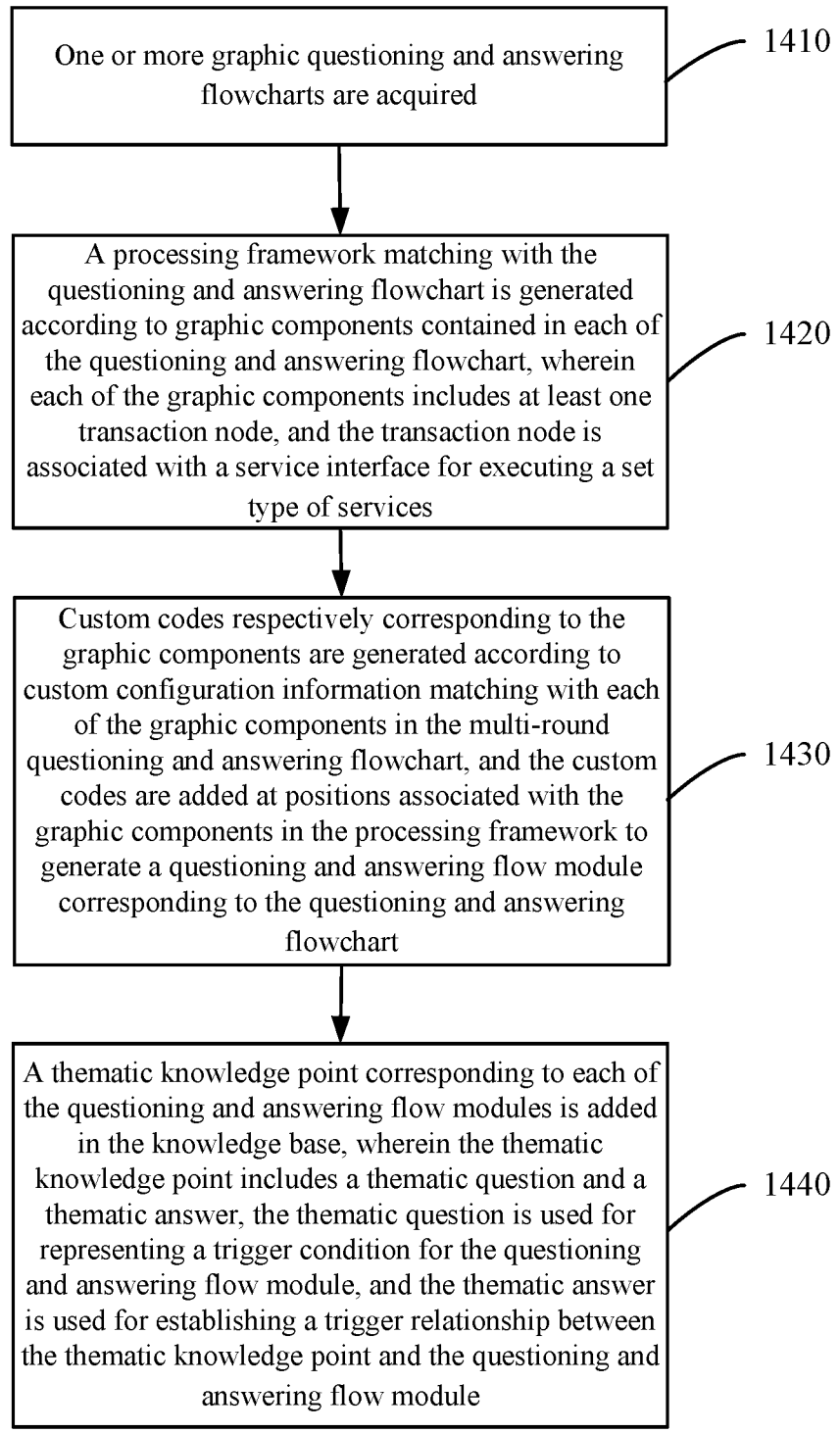
FIG. 14 is a flowchart of the method for generating a multi-round questioning and answering system according to yet another embodiment of the present invention.

FIG. 14 is a flowchart of the method for generating a multi-round questioning and answering system according to another embodiment of the present invention. As shown in FIG. 14, the method in this embodiment specifically includes the following steps.

Step 1410: One or more graphic questioning and answering flowcharts are acquired.

In this embodiment, the questioning and answering flowchart may specifically be a graphic flowchart obtained by selecting and combining graphic components in a set flow edition interface.

The graphic components may include nodes and connectors (typically connection lines) for connecting different nodes. The nodes include one or more transaction nodes.

The transaction node is associated with a service interface for executing a set type of services, and used for constructing transaction information according to dynamic variables input to this transaction node, then transmitting the transaction information to the associated service interface and receiving a result of transaction processing fed back by the service interface.

The service interface is used for obtaining the corresponding result of transaction processing according to the input transaction information by its own processing logic. For example, a service interface for reserving a meeting room can complete a meeting room reservation operation according to the input meeting room reservation parameters (e.g., the time XX and XX meeting room) as the transaction information by its own processing logic, and then return a result of meeting room reservation, for example, successful reservation or failed reservation, as the result of transaction processing; or, a service interface for inquiring a meeting room can complete an operation of inquiring available meeting rooms according to the input meeting room inquiry parameters (e.g., the time XX, the number XX of participants, and meeting rooms with or without a projector) as the transaction information by its own processing logic, and return the information about meeting rooms satisfying the inquiry condition as the result of transaction processing.

It may be known from the above analysis that, if one or more service functions that have already been implemented (e.g., meeting room reservation, online train ticket or plane ticket reservation, hospital registration, etc.) are to be used in a multi-round questioning and answering system, a service interface matching with the service function can be invoked by introducing a transaction node, and it is unnecessary to write or transplant a program code corresponding to the required service function in the multi-round questioning and answering system. Therefore, under the premise of greatly simplifying program codes, the workload required to implement the multi-round questioning and answering system is reduced.

In addition, it is to be noted that, a service interface that can be invoked by a transaction node can also be implemented on the basis of flow codes automatically generated from a service flowchart containing multiple nodes. The difference between the service flowchart and the multi-round questioning and answering flowchart in this embodiment of the present invention mainly lies in that: during the flow execution of the multi-round questioning and answering flowchart in this embodiment of the present invention, different proceeding trends for nodes in the multi-round questioning and answering flowchart are controlled according to the questioning and answering interaction with the user and the content input by the user; while for a service flowchart, simply by receiving one or more pieces of transaction information at the beginning of the flow, the service flowchart is executed in an given execution order, and the user is not required to input any content.

In terms of the overall structure of the questioning and answering flowchart, one questioning and answering flowchart may include a root node representing the start of the flow and one or more termination nodes representing the end of the flow. Of course, it should be understood that, in addition to one or more transaction nodes, the nodes may further include one or more of interaction nodes, broadcast nodes, variable setup nodes, recording nodes. This will not be limited in this embodiment. Generally, in one questioning and answering flowchart, the root node is a transaction node or an interaction node, and the termination node is a broadcast node.

To facilitate the understanding, FIG. 1e shows a graphic questioning and answering flowchart. As shown in FIG. 1e, elliptic graphic components in the questioning and answering flowchart are transaction nodes (e.g., a meeting room inquiry node 101 and a meeting room reservation node 105), square graphic components are broadcast codes (e.g., a reservation success broadcast node 106), and rhombic graphic components are interaction nodes (e.g., a node 104 for inquiring whether confirm a reservation).

The nodes are connected by node-to-node connection lines (e.g., a connection line A and a connection line B).

The related concepts of the interaction nodes and the broadcast nodes will be described hereinafter.

Step 1420: A processing framework matching with the questioning and answering flowchart is generated according to graphic components contained in each of the questioning and answering flowchart, wherein each of the graphic components includes at least one transaction node, and the transaction node is associated with a service interface for executing a set type of services.

In this embodiment, a questioning and answering flow module which can be generated automatically is provided. Correspondingly, standard implementation codes matching with different types of graphic components are provided in advance. For example, standard implementation codes respectively corresponding to the transaction nodes and the broadcast nodes are established and packaged in different library files, and correspondences between the standard implementation codes and the corresponding graphic components are established in advance. Typically, storage addresses (or reference addresses) for the standard implementation codes matching with the graphic components are written in a flow edition interface in advance. Correspondingly, a matched processing framework can be automatically generated based on the graphic components contained in the questioning and answering flowchart drawn in the flow edition interface.

It is to be noted that, since the method for generating a multi-round questioning and answering system with transaction nodes is what this embodiment of the present invention mainly focuses on, one or more transaction nodes are included in a questioning and answering flowchart. However, theoretically, by the technical solutions in this embodiment of the present invention, any type of multi-round questioning and answering systems can be generated, and the corresponding processing framework can be obtained just by drawing the corresponding flowchart according to actual requirements, and the corresponding flow modules can be thus obtained.

Step 1430: Custom codes respectively corresponding to the graphic components are generated according to custom configuration information matching with each of the graphic components in the multi-round questioning and answering flowchart, and the custom codes are added at positions associated with the graphic components in the processing framework to generate a questioning and answering flow module corresponding to the questioning and answering flowchart.

It should be understood that the standard implementation codes matching with the graphic components include only general functions which can be realized by the corresponding graphic components. For example, for a transaction node, the corresponding standard implementation code includes a parameter transfer logic; for an interaction node, the corresponding standard implementation code includes a decision logic; or, for a broadcast node, the corresponding standard implementation code includes a broadcast logic; and the like.

To enable a graphic component to realize different functions in different questioning and answering flowcharts, corresponding custom configuration parameters are required to be input.

In a simple example, for a node 102 broadcasting that no meeting room is found in FIG. 1e, the content "no meeting room is found" can be broadcast after the node 102 broadcasting that no meeting room is found is triggered; and correspondingly, the broadcast content "no meeting room is found" is a function given to the node 102 broadcasting that no meeting room is found. In order to enable the node 102 broadcasting that no meeting room to realize this function, the broadcast content needs to be used as the custom configuration information which is then added, in the processing framework, at a position of a code corresponding to the node 102 broadcasting that no meeting room is found.

Typically, it is possible to reserve a blank code segment at a set position in the standard implementation code matching with each graphic component. When a custom configuration parameter input for a graphic component in the questioning and answering flowchart is acquired (for example, input through a parameter configuration interface provided by the flow edition interface), a custom code matching with the custom configuration parameter is added in the corresponding blank code segment to realize the custom function of the graphic component.

Optionally, it is possible to directly add the custom configuration information (e.g., no meeting room is found) in the processing framework as a custom code; or, it is also possible to compare the set content selected in the custom configuration information input template by the user (e.g., an interface invocation mode selected for the transaction node) with prewritten custom codes matching with different custom configuration information and add the matching prewritten custom code in the processing framework. This will not be limited in this embodiment.

Correspondingly, if all graphic components in a questioning and answering flowchart are customized, implementation codes capable of realizing the functions of the questioning and answering flowchart can be generated, that is, a questioning and answering flow module in this embodiment of the present invention is generated.

In this embodiment, since the transaction node is associated with a service interface for executing a set type of services, the custom configuration information matching with the transaction node includes: a service invocation address corresponding to the transaction node. The service invocation address points to the service interface associated with the transaction node.

When the transaction node in the questioning and answering flow module is triggered, the transaction node constructs transaction information according to at least one dynamic variable input to the transaction node itself, then transmits the transaction information to a corresponding service invocation address, and returns a result of transaction processing fed back by the service invocation address to the questioning and answering flow module so that the questioning and answering flow module continues an execution according to the result of transaction processing.

It is to be noted that, when a transaction node is triggered, one or more dynamic variables input to the transaction node itself and acquired by the transaction node can be extracted from the user interaction information (for example, the meeting room inquiry node 101 in FIG. 1e), or can also be transmitted by an upstream node in the questioning and answering flow module (e.g., the meeting room reservation node 105 in FIG. 1e).

Discriminatively, if a transaction node in the questioning and answering flow module needs to extract one or more dynamic variables from the user interaction information, a correspondence between this transaction node and a knowledge point needs to be established in the knowledge base, wherein the knowledge point corresponding to the transaction node (referred to as a transaction knowledge point hereinafter) includes a transaction question and a transaction answer.

By comparing the user input information with the transaction question, in combination with the transaction answer, one or more corresponding dynamic variables are provided to the transaction node as the transaction information when the user input information successfully matches with the transaction question. If a transaction node in the questioning and answering flow module needs to extract one or more dynamic variables from an upstream node in the questioning and answering module, it is unnecessary to establish, in the knowledge base, a correspondence between this transaction node and a transaction knowledge point, as long as flow codes are rationally designed in the questioning and answering flow module.

Therefore, in practical applications, it can be determined, according to the actual requirements, whether a correspondence between a transaction node and a knowledge point in the knowledge base is to be established.

Further, considering that the transaction information that can be received by a service interface is required in a predetermined format, the user can be required to input user input information including dynamic variables in a data format that can be recognized by the service interface, and the transaction node can directly transmit the input dynamic variables as the transaction information to a service invocation address corresponding to the service interface. In addition, in order to further satisfy the user's experience, the questioning and answering flow module needs to reduce the requirements for the user's input as far as possible. Therefore, the dynamic variables, which are received on the transaction node and do not satisfy the requirements of the service interface, can be converted into transaction information satisfying the requirements of the service interface, and the transaction information is then transmitted to a service invocation address corresponding to the service interface.

Correspondingly, the custom configuration information may further include an incoming parameter definition item corresponding to a first transaction node. The incoming parameter definition item includes a name of at least one incoming parameter and an incoming parameter variable matching with the name of the incoming parameter. The name of the incoming parameter is a parameter name that can be recognized by a service interface associated with the first transaction node, and the incoming parameter variable matches with the dynamic variable input to the first transaction node. The transaction information includes a name of the incoming parameter and the incoming parameter variable.

FIG. 1f shows a schematic diagram of custom configuration information input to a transaction node. As shown in FIG. 1f, a service invocation address pointing to a service interface associated with the transaction node can be input in an invocation address item of a meeting room inquiry node (i.e., the meeting room inquiry node 101 in FIG. 1e); and, the name of the corresponding incoming parameter (e.g., startime and overtime) can be input in the incoming parameter definition item, and a corresponding incoming parameter variable (e.g., "${the startime of the meeting}" and ${the overtime of the meeting} is input in the incoming parameter definition item, wherein the name of the incoming parameter is a parameter name that can be recognized by the service interface. The incoming parameter variable matches with the dynamic variable input to the meeting room inquiry node.

Specifically, referring to FIG. 1e, the user input information acquired by the transaction node (i.e., the meeting room inquiry node 101) is "the meeting is from 9:00 am to 11:00 am". By comparing the user input information with a transaction knowledge point corresponding to the meeting room inquiry node 101 in the knowledge base, the obtained dynamic variables are as follows: the startime of the meeting=9:00 am, and the overtime of the meeting=11:00 am. The transaction node constructs transaction information (i.e., startime=9:00 am and overtime=11:00 am, which are variable forms capable of being recognized by a service interface for meeting room inquiry) by using the dynamic variables (i.e., the startime of the meeting=9:00 am and the overtime of the meeting=11:00 am). Subsequently, the transaction node transmits the transaction information to a service invocation address (i.e., http://voadev.sh.xaioi.com) corresponding to the service interface, and the transaction node can receive a result of meeting room inquiry returned by the service invocation address.

Step 1440: A thematic knowledge point corresponding to each of the questioning and answering flow modules is added in the knowledge base, wherein the thematic knowledge point includes a thematic question and a thematic answer, the thematic question is used for representing a trigger condition for the questioning and answering flow module, and the thematic answer is used for establishing a trigger relationship between the thematic knowledge point and the questioning and answering flow module.

In this embodiment, after the questioning and answering flow modules (codes for implementing the questioning and answering flowcharts) are generated, in order to realize the normal operation of the questioning and answering flow modules, a thematic knowledge point corresponding to each of the questioning and answering flow modules needs to be further added in the knowledge base.

It is to be noted that, in this embodiment, an implementation of generating questioning and answering flow modules and then establishing thematic knowledge points is provided. However, it should be understood by those skilled in the art that the process of establishing thematic knowledge points may be not limited to being executed after the generation of the questioning and answering flow modules. This will not be limited here. For example, it is possible to first establish thematic knowledge points and then establish corresponding questioning and answering flow modules.

Actually, the difference between the thematic knowledge points and the questioning and answering knowledge points in the knowledge base lies in that: when the user input information matches with a question in a questioning and answering knowledge point, an answer in this questioning and answering knowledge point will be directly output, or a control program matching with the answer content will be invoked; however, when the user input information matches with a thematic question in a thematic knowledge point, the questioning and answering flow module will be correspondingly triggered (for example, a root node of the questioning and answering flow module is directly triggered).

Typically, a thematic answer in a thematic knowledge point may be a storage address or an invocation address of a questioning and answering flow module corresponding to the thematic knowledge point or other information capable of accurately positioning the questioning and answering flow module.

This embodiment of the present invention provides a method for generating a multi-round questioning and answering system. Based on graphic questioning and answering flowcharts and custom configuration information set for graphic components in the questioning and answering flowcharts, questioning and answering flow modules for realizing functions of the questioning and answering flowcharts can be generated automatically. Subsequently, by adding, in the knowledge base, a thematic knowledge point corresponding to each of the questioning and answering flow modules, the multi-round questioning and answering systems generated based on the questioning and answering flow modules can be used flexibly. A method for generating a multi-round questioning and answering system in a WYSIWYG manner is provided, and the existing implementations of the multi-round questioning and answering system are optimized. In addition, by introducing transaction nodes in the graphic components, an existing function or service can be quickly invoked to obtain the service attribute required in the service flow. Accordingly, the repeated writing or transplantation of codes having a same function is avoided, the conciseness of implementation codes for the multi-round questioning and answering system is ensured, the workload and error probability of the developers are reduced, and the multi-round questioning and answering system is quickly constructed and updated. Moreover, the introduction of developers during the generation of the multi-round questioning and answering system is avoided, the workload of the developers is greatly decreased, the cost is reduced, and the accuracy and efficiency are improved.

Further, as described above, if a transaction node in a questioning and answering flow module needs to extract one or more dynamic variables from the user interaction information, the method for generating a multi-round questioning and answering system further includes a step of establishing, in the knowledge base, a transaction knowledge point corresponding to the transaction node. The transaction knowledge point includes a transaction question and a transaction answer.

The transaction question is used for being compared with transaction information input to the transaction node, and the transaction answer is used for combining with at least one transaction parameter extracted from the successfully fuzzy-matched transaction information to generate a dynamic variable.

When a transaction node (e.g., the meeting room inquiry node 101 in FIG. 1e) needing to extract one or more dynamic variables from the user interaction information is triggered, the user input information is compared (typically, fuzzy-matched) with a transaction question corresponding to the transaction node. If the user input information successfully matches with the transaction question, the specific content (the actual content of the dynamic variables contained in the transaction question), such as the time, the number of participants and the type of the meeting, is determined according to the transaction question, the specific content is combined with the transaction answer to obtain complete dynamic variables, and the complete dynamic variables are fed back to the corresponding meeting room inquiry node 101 (i.e., the name of the meeting room inquiry node in the corresponding transaction answer).

More specifically, if the user input information acquired by the meeting room inquiry node 101 in FIG. 1e is:

"I want to inquire a meeting room with a projector from 9:00 am to 12:00 am tomorrow, and there are three participants", by comparing the user input information with a transaction knowledge point in Table 1, it is determined that there are three participants, the time is from 9:00 am to 12:00 am, and the type of the meeting is projector. Subsequently, the information is compared with the transaction answer to obtain complete dynamic variables (i.e., "the number of meeting participants=3", "the meeting time=9:00 am to 12:00 am" and "the type of the meeting=projector"), and the complete dynamic variables are input to the meeting room inquiry node 101. The meeting room inquiry node 101 constructs, by the dynamic variables, transaction information that can be recognized by a service interface, and then transmits the transaction information to the corresponding service interface.

In this way, the universality of the transaction node can be further improved, and the transaction node can be used in combination with the existing knowledge base.

Figure 15:
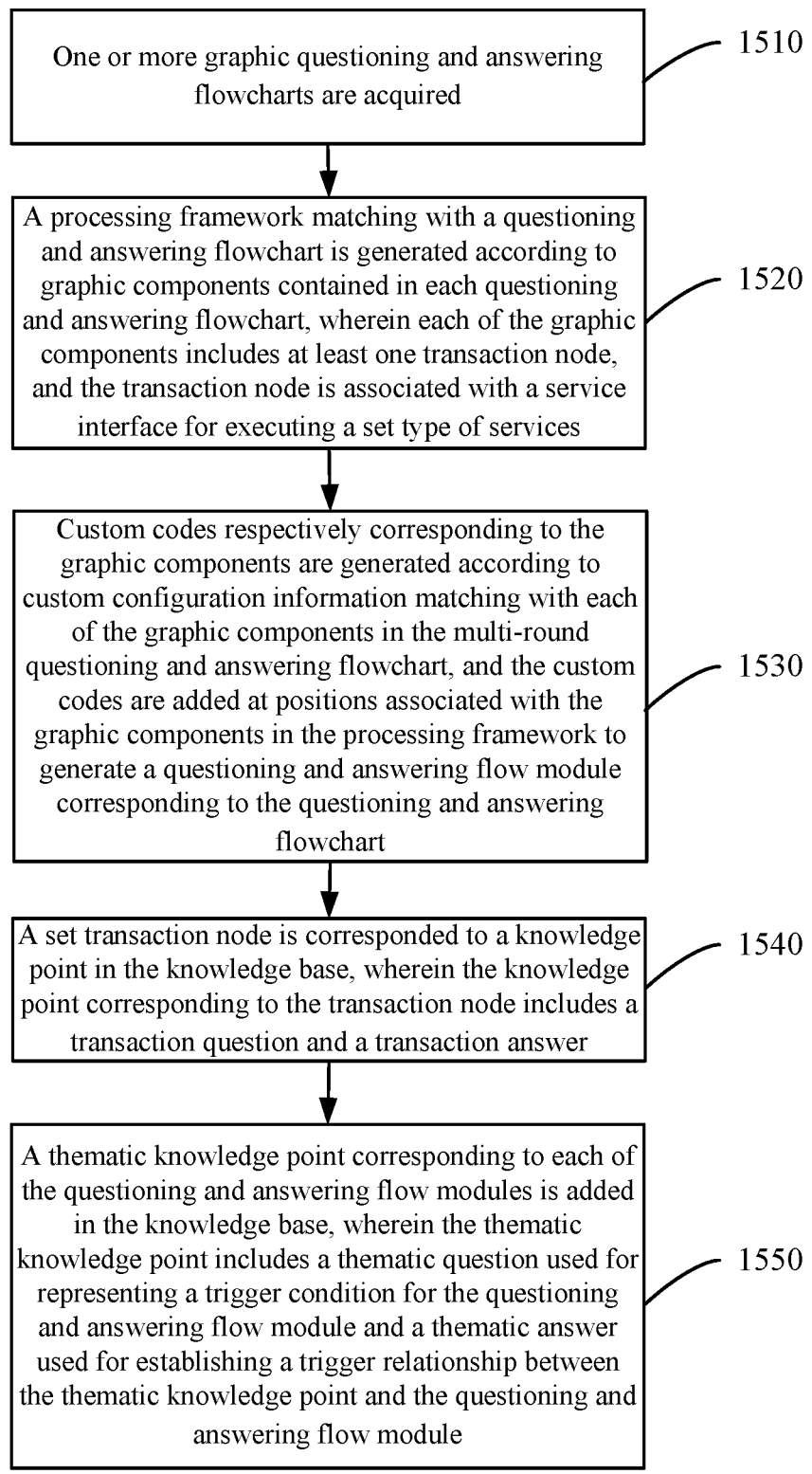
FIG. 15 is a flowchart of the method for generating a multi-round questioning and answering system according to still another embodiment of the present invention.

FIG. 15 is a flowchart of the method for generating a multi-round questioning and answering system according to still another embodiment of the present invention. As shown in FIG. 15, this embodiment is optimized based on the above embodiments. In this embodiment, for a transaction node needing to extract one or more dynamic variables from the user interaction information, another data structure of a corresponding transaction knowledge point is provided. Correspondingly, the method in this embodiment of the present invention includes the following steps:

Step 1510: One or more graphic questioning and answering flowcharts are acquired.

Step 1520: A processing framework matching with a questioning and answering flowchart is generated according to graphic components contained in each questioning and answering flowchart, wherein each of the graphic components includes at least one transaction node, and the transaction node is associated with a service interface for executing a set type of services.

Step 1530: Custom codes respectively corresponding to the graphic components are generated according to custom configuration information matching with each of the graphic components in the multi-round questioning and answering flowchart, and the custom codes are added at positions associated with the graphic components in the processing framework to generate a questioning and answering flow module corresponding to the questioning and answering flowchart.

The custom configuration information matching with the transaction node includes a service invocation address corresponding to the transaction node. The service invocation address points to a service interface associated with the transaction node. When a transaction node in a questioning and answering flow module is triggered, the transaction node constructs transaction information according to at least one dynamic variable input to the transaction node itself, then transmits the transaction information to a corresponding service invocation address, and returns a result of transaction processing fed back by the service invocation address to the questioning and answering flow module, so that the questioning and answering flow module continues an execution according to the result of transaction processing.

Step 1540: A set transaction node is corresponded to a knowledge point in the knowledge base, wherein the knowledge point corresponding to the transaction node includes a transaction question and a transaction answer.

As described above, if one or more transaction nodes in a questioning and answering flow module need to extract one or more dynamic variables from the user interaction information, a correspondence between the transaction node and a knowledge point (i.e., a transaction knowledge point) in the knowledge base needs to be established.

The transaction answer includes an associated transaction node, a type of at least one incoming parameter, a type of at least one missing parameter, and counter-question content matching with the type of the missing parameter. The transaction question is used for being compared with the received user's input information. The type of the incoming parameter is used for being compared with the type of a dynamic variable contained in the user's input information. The type of the missing parameter and the counter-question content matching with the type of the missing parameter are used for determining the counter-question content corresponding to the type of the missing parameter in the user's input information. The associated transaction node is used for determining a transaction node to which the dynamic variable contained in the user's input information is input.

In the transaction knowledge point, the transaction answer is used for being compared with the received user input information to acquire the specific content of one or more of the time, the number of participants and the type of the meeting contained in the user input information; and the type of at least one incoming parameter contained in the transaction answer specifically includes the meeting time, the number of meeting participants and the type of the meeting and used for being compared with the type of the dynamic variable contained in the user input information.

If it is determined that the user input information includes the type of all incoming parameters defined in the transaction answer, the specific content may be directly combined with the type of the incoming parameters contained in the transaction answer to construct dynamic variables, and the dynamic variables are transmitted to the associated transaction node (i.e., the transaction node "meeting room inquiry") in the transaction answer.

In addition, in the transaction knowledge point, the type of at least one missing parameter and the counter-question content corresponding to the type of the missing parameter are further defined. For example, in "[@time]=What time do you want a meeting room", "[@time]" corresponds to the type of the missing parameter, and "What time do you want a meeting room" corresponds to the corresponding counter-question content. In other words, if the user input information does not include the specific content of the meeting time, the corresponding counter-question content "What time do you want a meeting room" can be provided to the user on the basis of the transaction knowledge point, so as to request the user to input the specific content including the meeting time again. For another example, in "[@the number of participants][@the type of the meeting]=the number of meeting participants and the required apparatus", the "[@the number of participants][@the type of the meeting]" corresponds to the type of the missing parameters, and "the number of meeting participants and the required apparatus" corresponds to the corresponding counter-question content. In other words, if the user input information does not include the specific content of the number of meeting participants and the type of the meeting, the corresponding counter-question content "the number of meeting participants and the required apparatus" can be provided to the user on the basis of the transaction knowledge point, so as to request the user to input the specific content including the number of meeting participants and the type of the meeting again.

Based on the transaction knowledge point, the corresponding counter-question content can be returned to the user according to the type of missing dynamic variables in the user input information, so that the user corrects the content input by the user according to the counter-question content. Only the missing dynamic variables are offered again, and it is unnecessary to provide the dynamic variables that have already been offered. Accordingly, while ensuring that the transaction node can be triggered normally to operate normally, the requirements for the user input information are greatly reduced, and the efficiency of the multi-round questioning and answering system and the user's experience can be improved significantly.

Correspondingly, the step of corresponding a set transaction node to a knowledge point in the knowledge base may include the following steps: if it is determined that the knowledge base includes a transaction knowledge point matching with the transaction node, a correspondence between the transaction node and the transaction knowledge point can be directly established in the knowledge base; and, if it is determined that the knowledge base does not include a transaction knowledge point matching with the transaction node, the transaction knowledge point may be first established in the knowledge base, and a correspondence between the transaction node and the transaction knowledge point is then established.

In addition, it is to be noted that the transaction node is distinctly different from the questioning and answering knowledge point mentioned above. As described above, the questioning and answering knowledge points generally include questions and corresponding answers (also referred to as "question-answer" pairs). The questioning and answering knowledge points are mainly applicable to a scenario where questioning and answering interaction is performed with an interactive user. A question in a questioning and answering knowledge point is used for being compared with the user input information. If the question successfully matches with the user input information, the answer in this questioning and answering knowledge point is fed back, or a control program matching with the answer content is invoked.

In other words, the questioning and answering knowledge points can directly determine the result of processing corresponding to the user input information (for example, the answer content is fed back or a set control program is invoked), while the transaction knowledge points are used for being compared with dynamic variables input to the corresponding transaction node. They are used for different purposes. To easily distinguish the two kinds of knowledge points in different application scenarios, the transaction knowledge points and the questioning and answering knowledge points are stored at different storage locations in the knowledge base, or the interaction knowledge points are labeled with knowledge point tags different from the questioning and answering knowledge points.

In other embodiments of the present invention, when the questioning and answering knowledge points and the interaction knowledge points are different, it is also possible to not distinguish the both, which shall also fall into the protection scope of the present invention.

Step 1550: A thematic knowledge point corresponding to each of the questioning and answering flow modules is added in the knowledge base, wherein the thematic knowledge point includes a thematic question used for representing a trigger condition for the questioning and answering flow module and a thematic answer used for establishing a trigger relationship between the thematic knowledge point and the questioning and answering flow module.

In the technical solutions in this embodiment of the present invention, by establishing a correspondence between a transaction node and a transaction knowledge point in a knowledge base and defining, in this transaction knowledge point, counter-question content when the user input information does not include one or more dynamic variables required by the transaction node, different counter-question contents can be fed back according to different user input information when the finally constructed multi-round questioning and answering system is proceeded to a transaction node matching with the transaction knowledge point, so that the user can correct the content input by the user according to the counter-question content. Only the missing dynamic variables are offered again, and it is unnecessary to provide the dynamic variables that have already been offered. Accordingly, while ensuring that the transaction node can be triggered normally to operate normally, the requirements for the user input information are greatly reduced, and the efficiency of the multi-round questioning and answering system and the user's experience can be improved significantly.

Based on the above embodiments, the graphic components may further include connectors for connecting different nodes, for example, as shown in FIG. 1*e*, a connector A for connecting the meeting room inquiry node 101 with the node 102 broadcasting that no meeting room is found, a connector B for connecting the meeting room inquiry node 101 with the node inquiring whether to confirm a reservation, and a connector C for connecting the meeting room inquiry node 101 and the node 103 broadcasting a list of meeting rooms for the user to choose.

Correspondingly, the custom configuration information may include dynamic condition configuration information matching with a first connector. The first connector is used for connecting an associated upper-layer node and an associated lower-layer node. The associated upper-layer node is a second transaction node.

The dynamic condition configuration information is a condition for controlling the proceeding of the questioning and answering flow module from the associated upper-layer node to the associated lower-layer node. The dynamic condition configuration information includes an outputting parameter definition item and a condition setup value. The outputting parameter definition item corresponds to at least one result of transaction processing received by the transaction node, and the condition setup value is used for realizing condition comparison with the result of transaction processing in the outputting parameter definition item.

In a specific example, the dynamic condition configuration information corresponding to the first connector may be set in form of "${transaction node name}.variable name+relational operator+variable value".

The ${transaction node name}.variable name is an outputting parameter definition item representing at least one result of transaction processing received by the transaction node, and the variable value corresponds to a condition setup value for realizing condition comparison with the result of transaction processing in the outputting parameter definition item.

More specifically, as shown in FIG. 1*e*, all the connector A, the connector B and the connector C are connectors for connecting the transaction node (the meeting room inquiry node 101) with other nodes. If it is assumed that the result of transaction processing returned by the corresponding service interface and received by the meeting room inquiry node 101 is the number of meeting rooms satisfying the condition (the transaction information constructed according to the user input information), correspondingly, the dynamic condition configuration information corresponding to the connector A may be constructed as "${transaction node name}.code=0", the dynamic condition configuration information corresponding to the connector B may be constructed as "${transaction node name}.code=1", and the dynamic condition configuration information corresponding to the connector C may be constructed as "${transaction node name}.code>1". The ${transaction node name}.code represents the result of transaction processing received by the transaction node, and "=" and ">" are relational operators indicative of the relation between the result of transaction processing and the corresponding condition setup value.

In other words, if the result of transaction processing returned by the corresponding service interface and received by the meeting room inquiry node 101 is 1, the dynamic condition configuration information satisfied by the result of transaction processing is "${transaction node name}.code=1", and correspondingly, the multi-round questioning and answering system will be proceeded from the meeting room inquiry node 101 to the node 104 inquiring whether to confirm a reservation to continue an execution.

Based on the above embodiments, the graphic components may further include interaction nodes. Correspondingly, the method further includes a step of establishing a correspondence between each of the interaction nodes and one or more knowledge points in the knowledge base, wherein a knowledge point corresponding to the interaction node includes an interaction question used for being compared with the received user interaction information and an interaction answer used for determining a next proceeding trend for the questioning and answering flow module.

The interaction nodes are specifically nodes capable of realizing questioning and answering (possibly one question corresponding to one answer, or one question corresponding to multiple answers) interaction with an interactive user. On the interaction nodes, a next proceeding trend for the multi-round questioning and answering system can be determined according to the user interaction information input by the user.

For example, as shown in FIG. 1*e*, the node 104 inquiring whether to confirm a reservation is an interaction node. If it is determined that the user inputs "NO" with respect to the node 104 inquiring whether to confirm a reservation, a next proceeding trend for the multi-round questioning and answering system is determined as END; and, if it is determined the user inputs "YES" with respect to the node 104 inquiring whether to confirm a reservation, a next proceeding trend for the multi-round questioning and answering system is determined as the meeting room reservation node 105.

Further, an interaction node needs to determine, according to the user interaction information, a next proceeding trend for the established questioning and answering flow module. That is, an interaction node includes at least two branches, and different branches correspond to different proceeding trends for the questioning and answering flow module. Therefore, different branching conditions are to be set for different branches in the questioning and answering flow module.

Actually, the expression form of the user interaction information input on an interaction node by the user may be not unique. In other words, multiple different pieces of user interaction information may correspond to a same branching condition. As shown in FIG. 1*e*, for example, it may be predefined that the multi-round questioning and answering system will be proceeded to END when the user interaction information is "NO" or "NOT SURE". Thus, it is necessary to establish, in the knowledge base, interaction knowledge points matching with the interaction nodes: (NO, NO) and (NOT SURE, NO). Meanwhile, a correspondence between the interaction knowledge points and the node 104 inquiring whether to confirm a reservation is established. Similarly, it may also be predefined that the multi-round questioning and answering system will be proceeded to END when the user interaction information is "YES" or "OK". Thus, it is also necessary to establish, in the knowledge base, interaction knowledge points matching with the interaction nodes: (YES, YES) and (OK, YES). Therefore, the correspondences between the node 104 inquiring whether to confirm a reservation and total four knowledge points needs to be established.

It should be understood that the knowledge points corresponding to interaction nodes are different from questioning and answering knowledge points in the prior art. Therefore, for ease of distinguishing, the knowledge points corresponding to interaction nodes are referred to as interaction knowledge points hereinafter.

The first half part in each bracket represents an interaction question in an interaction knowledge point and is used for being compared with the received user interaction information, and the second half part in each bracket represents an interaction answer in the interaction knowledge point and is used for determining a next proceeding trend for the questioning and answering flow module.

Based on the above embodiments, the graphic components may further include broadcast nodes. The broadcast nodes are used for broadcasting the broadcast content preset by custom configuration information. For example, as shown in FIG. 1e, there are a node 102 broadcasting that no meeting room is found, a node 103 broadcasting a list of meeting rooms for the user to choose, a reservation success broadcast node 106 and a cause-of-failure broadcast node 107. For example, when the multi-round questioning and answering system is proceeded to the node 102 broadcasting that no meeting room is found, this broadcast node will correspondingly broadcast "Sorry, no meeting room satisfying the conditions is found".

Further, in addition to the broadcast nodes, the broadcast content may also be set for other types of nodes, so that the nodes in the multi-round questioning and answering system can better perform the questioning and answering interaction with the user.

Correspondingly, the custom configuration information includes: broadcast content corresponding to a first node. The first node is connected to a third transaction node via a connector and is in the downstream of the third transaction node. The first node includes an interaction node, a broadcast node or other transaction nodes.

The broadcast content includes a result of transaction processing received by the third transaction node, a combination of the result of transaction processing received by the third transaction node and preset information, or a combination of the result of transaction processing received by the third transaction node and a dynamic variable input to the third transaction node.

Specifically, as shown in FIG. 1e, the node 104 inquiring whether to confirm a reservation is an interaction node connected to a transaction node (i.e., the meeting room inquiry node 101) via a connector. Therefore, for this interaction node, it is possible to set different types of broadcast content matching with the result of transaction processing received by the meeting room inquiry node 101. For example, the broadcast content containing only the result of transaction process is "There is a meeting room satisfying the conditions"; or, the broadcast content containing the combination of the result of transaction processing and the preset information is "In accordance with your input meeting room inquiry conditions, there is only one meeting room satisfying the conditions"; or, the broadcast content containing the combination of the result of transaction processing and the dynamic variable input to this transaction node is "There is only one meeting room satisfying the meeting time XX, XX meeting participants and the XX type of the meeting".

It should be understood that the embodiment merely shows several methods of setting the broadcast content. Actually, those skilled in the art can set the desired broadcast content corresponding to a code according to the actual situation, and this will not be limited in the embodiment.

Further, the broadcast content may be list data. For example, for the node 103 broadcasting a list of meeting rooms for the user to choose shown in FIG. 1e, it may be known from the above analysis that, when it is determined there is more than one meeting room satisfying the conditions, the multi-round questioning and answering flow module will be proceeded to this node. Therefore, the broadcast content of the node 103 broadcasting a list of meeting rooms for the user to choose may be correspondingly set as list data, so that the node can broadcast multiple meeting rooms satisfying the conditions, for example, broadcasting "the meeting rooms satisfying the meeting time XX, XX meeting participants and the XX type of the meeting are as follows: meeting room A1, meeting room B2 . . . ".

Typically, when the user double-clicks or clicks a graphic component in a questioning and answering flowchart, an input template for the custom configuration information is correspondingly popped up, and a flow designer can input different custom configuration information for different graphic components by simple selection and input operations.

Figure 16:
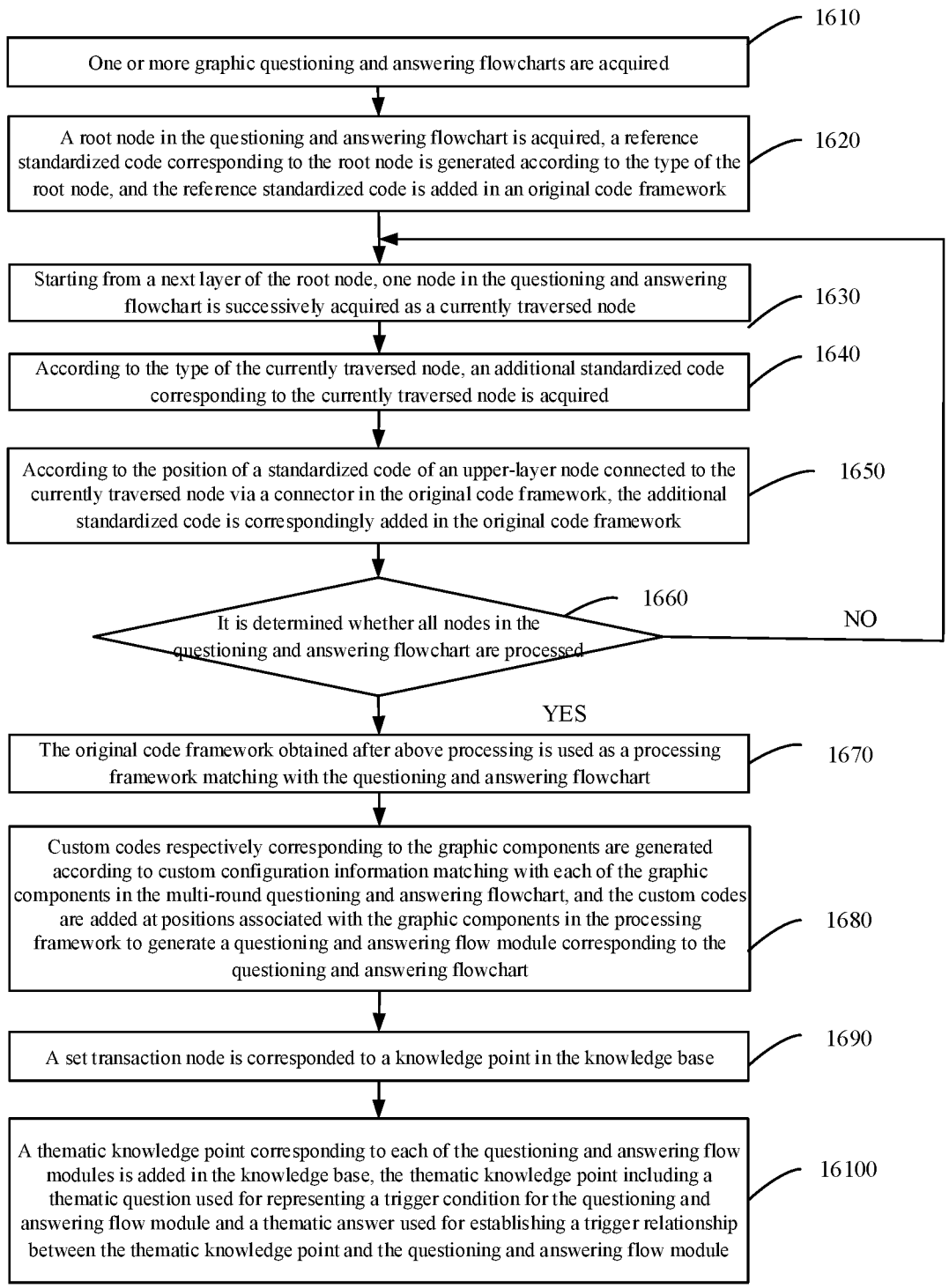
FIG. 16 is a flowchart of the method for generating a multi-round questioning and answering system according to another embodiment of the present invention.

FIG. 16 is a flowchart of the method for generating a multi-round questioning and answering system according to another embodiment of the present invention. As shown in FIG. 16, this embodiment is optimized based on the above embodiment. In this embodiment, the operation of generating a processing framework matching with a questioning and answering flowchart according to graphic components included in each questioning and answering flowchart is subdivided. Correspondingly, the method in this embodiment of the present invention includes the following steps:

Step 1610: One or more graphic questioning and answering flowcharts are acquired.

Step 1620: A root node in the questioning and answering flowchart is acquired, a reference standardized code corresponding to the root node is generated according to the type of the root node, and the reference standardized code is added in an original code framework.

Step 1630: Starting from a next layer of the root node, one node in the questioning and answering flowchart is successively acquired as a currently traversed node.

Typically, if there are multiple nodes in the next layer of the root node, in a certain traversal order, for example, from left to right or from right to left. After all nodes in this layer are traversed, nodes in the next layer are traversed.

Step 1640: According to the type of the currently traversed node, an additional standardized code corresponding to the currently traversed node is acquired.

Step 1650: According to the position of a standardized code of an upper-layer node connected to the currently traversed node via a connector in the original code framework, the additional standardized code is correspondingly added in the original code framework.

Step 1660: It is determined whether all nodes in the questioning and answering flowchart are processed; if so, a step 1670 is executed; and if not, a step 1630 is executed.

Step 1670: The original code framework obtained after above processing is used as a processing framework matching with the questioning and answering flowchart.

It is to be noted that, in this embodiment of the present invention, a method for generating a processing framework according to the already drawn questioning and answering flowchart is provided. Actually, the processing framework can be updated and generated in real time during the drawing of the questioning and answering flowchart. In this embodiment, the time for generating the processing framework will not be limited.

Step 1680: Custom codes respectively corresponding to the graphic components are generated according to custom configuration information matching with each of the graphic components in the multi-round questioning and answering flowchart, and the custom codes are added at positions associated with the graphic components in the processing framework to generate a questioning and answering flow module corresponding to the questioning and answering flowchart.

Step 1690: A set transaction node is corresponded to a knowledge point in the knowledge base.

Step 16100: A thematic knowledge point corresponding to each of the questioning and answering flow modules is added in the knowledge base, the thematic knowledge point including a thematic question used for representing a trigger condition for the questioning and answering flow module and a thematic answer used for establishing a trigger relationship between the thematic knowledge point and the questioning and answering flow module.

In the technical solutions in this embodiment of the present invention, by generating a corresponding processing framework based on the already drawn questioning and answering flowchart, the defect of correspondingly updating the processing framework in response to the modification to the questioning and answering flowchart when the processing framework is generated during the drawing of the flowchart is avoided, and the efficiency of generating the questioning and answering flow module is improved.

Figure 17:
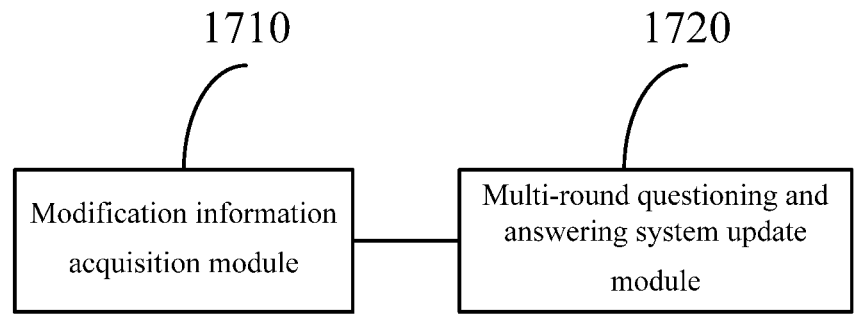
FIG. 17 is a schematic structure diagram of a device for modifying a multi-round questioning and answering system according to an embodiment of the present invention.

FIG. 17 is a schematic structure diagram of a device for modifying a multi-round questioning and answering system according to an embodiment of the present invention. As shown in FIG. 17, the device for modifying the multi-round questioning and answering system in this embodiment is based on the multi-round questioning and answering system described above. This embodiment is suitable for modifying the already successfully generated multi-round questioning and answering system. The method can be realized by a device for modifying the multi-round questioning and answering system. The device may be implemented by software and/or hardware, which may generally be integrated into a terminal apparatus or server for modifying the multi-round questioning and answering system. The terminal apparatus or server is directly or indirectly connected to a knowledge base.

The multi-round questioning and answering system includes: the multi-round questioning and answering flow module corresponding to a multi-round questioning and answering flowchart, the multi-round questioning and answering flowchart including multiple graphic components, each of the graphic components including multiple interaction nodes; one or more knowledge points stored in the knowledge base and corresponding to each of the interaction nodes in the multi-round questioning and answering flowchart, the knowledge point corresponding to the interaction node including an interaction question used for being compared with the received user interaction information and an interaction answer used for determining a next proceeding trend for the multi-round questioning and answering flow module; and a thematic knowledge point stored in the knowledge base, the thematic knowledge point including a thematic question and a thematic answer, wherein the thematic question is used for representing a trigger condition for the multi-round questioning and answering flow module matching with the multi-round questioning and answering system and the thematic answer is used for establishing a trigger relationship between the thematic knowledge point and the multi-round questioning and answering flow module. The device for modifying the multi-round questioning and answering system specifically includes a modification information acquisition module 1710 and a multi-round questioning and answering system update module 1720.

The modification information acquisition module 1710 is configured to acquire modification information for set system components in the multi-round questioning and answering system.

In this embodiment, the system components may include a thematic knowledge point corresponding to the multi-round questioning and answering system, a multi-round questioning and answering flow module corresponding to the multi-round questioning and answering system, or one or more knowledge points corresponding to an interaction node in the multi-round questioning and answering flow module.

The modification information includes any one or any combination of the following: modifying a thematic knowledge point corresponding to the multi-round questioning and answering system, modifying a multi-round questioning and answering flow module corresponding to the multi-round questioning and answering system, and modifying a knowledge point corresponding to a set interaction node in the multi-round questioning and answering flow module.

The multi-round questioning and answering system update module 1720 is configured to correspondingly update the multi-round questioning and answering system according to the modification information.

In this embodiment, the multi-round questioning and answering system is correspondingly updated in different ways according to different modification information for different system components.

For example, if the modification information is to adjust a thematic knowledge point corresponding to the multi-round questioning and answering system, the thematic knowledge point in the knowledge base can be correspondingly updated directly according to the modified thematic question and/or thematic answer; and if the modification information is to delete a thematic knowledge point corresponding to the multi-round questioning and answering system, the thematic knowledge point can be deleted from the knowledge base.

This embodiment provides a device for modifying the multi-round questioning and answering system. By using the modification information acquisition module to acquire modification information for set system components in the multi-round questioning and answering system, the modification information including any one or any combination of the following: modifying a thematic knowledge point corresponding to the multi-round questioning and answering system, modifying a multi-round questioning and answering flow module corresponding to the multi-round questioning and answering system, and modifying knowledge points corresponding to a set interaction node in the multi-round questioning and answering flow module, and using the multi-round questioning and answering update module to correspondingly update the multi-round questioning and answering system according to the modification information, a specific way of modifying the multi-round questioning and answering system is provided. The user's demands for modification to the multi-round questioning and answering system are greatly satisfied, the existing methods for modifying the multi-round questioning and answering system are optimized, the accuracy and convenience of modifying the multi-round questioning and answering system are improved, the quick modification and update to the multi-round questioning and answering system is realized, the introduction of developers during the modification to the multi-round questioning and answering system is avoided, and the workload of the developers is greatly decreased.

Figure 18:
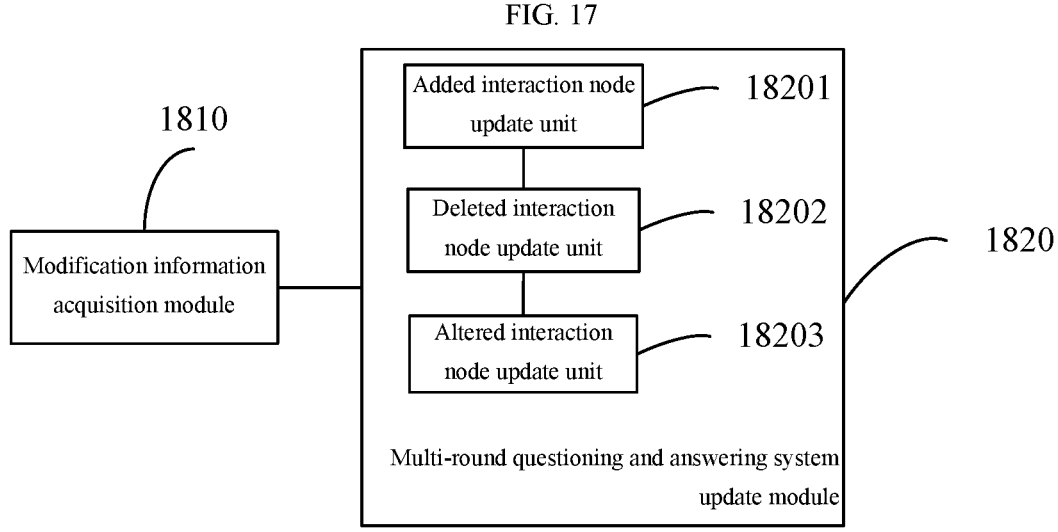
FIG. 18 is a schematic structure diagram of the device for modifying a multi-round questioning and answering system according to another embodiment of the present invention.

FIG. 18 is a schematic structure diagram of the device for modifying a multi-round questioning and answering system according to another embodiment of the present invention. As shown in FIG. 18, the device in this embodiment of the present invention includes:

a modification information acquisition module 1810 and a multi-round questioning and answering update module 1820.

The multi-round questioning and answering system update module 1820 includes:

an added interaction node update unit 18201 configured to correspondingly update, according to the addition position of at least one added interaction node in a multi-round questioning and answering flowchart corresponding to the multi-round questioning and answering system and custom configuration information matching with the added interaction node, the multi-round questioning and answering flow module corresponding to the multi-round questioning and answering system, and establish a correspondence between the added interaction node and one or more knowledge points in a knowledge base;

a deleted interaction node update unit 18202 configured to correspondingly update, according to the deletion position of at least one deleted interaction node in the multi-round questioning and answering flowchart corresponding to the multi-round questioning and answering system, the multi-round questioning and answering flow module corresponding to the multi-round questioning and answering system, and delete a correspondence between the deleted interaction node and one or more knowledge points in the knowledge base; and An altered interaction node update unit 18203 configured to correspondingly update, according to the original position and the adjusted position of at least one adjusted interaction node in the multi-round questioning and answering flowchart corresponding to the multi-round questioning and answering system, the multi-round questioning and answering flow module corresponding to the multi-round questioning and answering system.

The modification information specifically includes modification to the multi-round questioning and answering flow module corresponding to the multi-round questioning and answering system. Specifically, modification to the multi-round questioning and answering flow module corresponding to the multi-round questioning and answering system may include: adding, deleting and/or adjusting interaction nodes in the multi-round questioning and answering flow module.

Generally, the flow designer is not a developer, so he/she is unable to directly complete the modification to a multi-round questioning and answering flow module (i.e., implementation codes). Correspondingly, a correspondence between a multi-round questioning and answering flowchart and a multi-round questioning and answering flow module may be established in advance, and the modification to the multi-round questioning and answering flow module is correspondingly acquired by acquiring the modification to the multi-round questioning and answering flowchart.

In one optional implementation of this embodiment, the deleted interaction node update unit 18202 further includes:

a to-be-deleted knowledge point search subunit configured to search, in the knowledge base, one or more knowledge points corresponding to the deleted node as a to-be-deleted knowledge point;

a first to-be-deleted knowledge point processing unit configured to, if it is determined that the to-be-deleted knowledge point corresponds to only the deleted interaction node, delete the to-be-deleted knowledge point from the knowledge base, and delete the correspondence between the deleted interaction node and the to-be-deleted knowledge point; and a second to-be-deleted knowledge point processing unit configured to, if it is determined that the to-be-deleted knowledge point also corresponds to other interaction nodes in addition to the deleted interaction node, reserve the to-be-deleted knowledge point in the knowledge base, and delete only the correspondence between the deleted interaction node and the to-be-deleted knowledge point.

By the technical solutions in this embodiment of the present invention, a method for updating a multi-round questioning and answering system when a multi-round questioning and answering flow module corresponding to the multi-round questioning and answering system is modified is provided, so that the flow designer can conveniently realize the modification to the multi-round questioning and answering flow module, even he/she is not good at code writing. The workload of the developers is minimized.

Based on the above embodiments, the modifying the multi-round questioning and answering flow module corresponding to the multi-round questioning and answering system includes: adding, deleting and/or adjusting broadcast nodes and/or connectors of the multi-round questioning and answering flow module.

The multi-round questioning and answering system update module may include:

an added broadcast node and connector update unit configured to correspondingly update the multi-round questioning and answering flow module corresponding to the multi-round questioning and answering system, according to the addition position of at least one added broadcast node and/or added connector in the multi-round questioning and answering flowchart corresponding to the multi-round questioning and answering system and custom configuration information matching with the added broadcast node and/or the added connector;

a deleted broadcast node and connector update unit configured to correspondingly update the multi-round questioning and answering flow module corresponding to the multi-round questioning and answering system, according to the deletion position of at least one deleted broadcast node and/or deleted connector in the multi-round questioning and answering flowchart corresponding to the multi-round questioning and answering system; and an adjusted broadcast node and connector update unit configured to correspondingly update the multi-round questioning and answering flow module corresponding to the multi-round questioning and answering system, according to the original position and the adjusted position of at least one adjusted broadcast node and/or adjusted connector in the multi-round questioning and answering flowchart corresponding to the multi-round questioning and answering system.

In this way, a multi-round questioning and answering system update module used for updating the multi-round questioning and answering system when the multi-round questioning and answering flow module corresponding to the multi-round questioning and answering system is modified is provided, so that the flow designer can conveniently realize the modification to the multi-round questioning and answering flow module, even he/she is not good at code writing. The workload of the developers is minimized.

Figure 19:
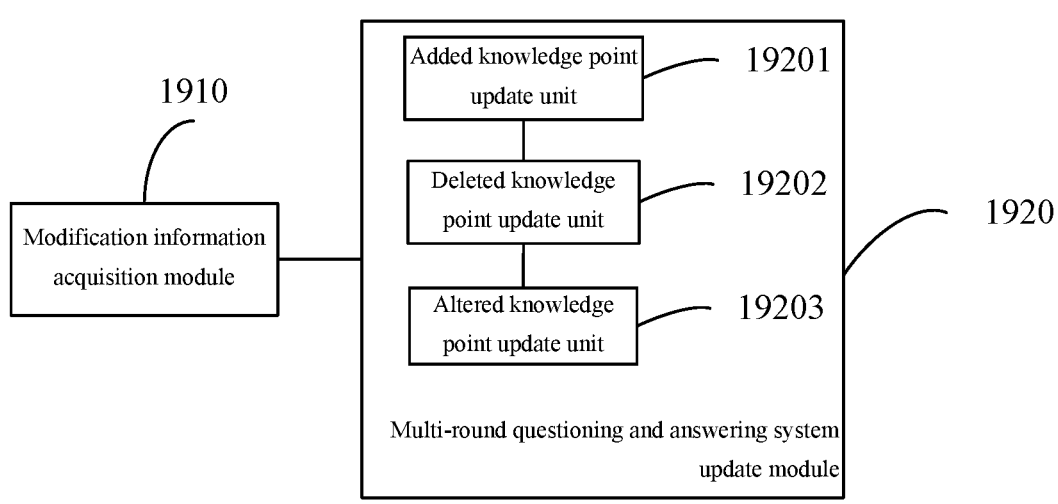
FIG. 19 is a schematic structure diagram of the device for modifying a multi-round questioning and answering system according to yet another embodiment of the present invention.

FIG. 19 is a schematic structure diagram of the device for modifying a multi-round questioning and answering system according to yet another embodiment of the present invention. As shown in FIG. 19, this embodiment is optimized based on the above embodiment. In this embodiment, functions of a multi-round questioning and answering system update module when the modification content is modification to a knowledge point corresponding to a set interaction node in the multi-round questioning and answering flow module are further subdivided. Correspondingly, the device in this embodiment of the present invention includes a modification information acquisition module 1910 and a multi-round questioning and answering system update module 1920.

The multi-round questioning and answering system update module 1920 specifically includes:

an added knowledge point update unit 19201 configured to: acquire at least one added knowledge point for a set interaction node; if it is determined that the added knowledge point is included in the knowledge base, establish a correspondence between the added knowledge point and the set interaction node in the knowledge base; and, if it is determined that the added knowledge point is not included in the knowledge base, add the added knowledge point in the knowledge base, and establish a correspondence between the added knowledge point and the set interaction node;

a deleted knowledge point update unit 19202 configured to: acquire at least one deleted knowledge point for the set interaction node; if it is determined that the deleted knowledge point in the knowledge base corresponds to only the set interaction node, delete the deleted knowledge point from the knowledge base, and delete a correspondence between the set interaction node and the deleted knowledge point; and, if it is determined that the deleted knowledge point also corresponds to other interaction nodes in addition to the set interaction node, reserve the deleted knowledge point in the knowledge base, and delete only the correspondence between the set interaction node and the deleted knowledge point; and an altered knowledge point update unit 19203 configured to: acquire at least one altered knowledge point for the set interaction node and an original knowledge point corresponding to the altered knowledge point in the knowledge base; if it is determined that the original knowledge point corresponds to only the set interaction node, replace the original knowledge point in the knowledge base with the altered knowledge point; and, if it is determined that the original knowledge point also corresponds to other interaction nodes in addition to the set interaction node, delete only the correspondence between the original knowledge point and the set interaction node, add the altered knowledge point in the knowledge base, and establish a correspondence between the altered knowledge point and the set interaction node.

In this embodiment, modification information for set system components in the multi-round questioning and answering system specifically includes modification to a knowledge point corresponding to a set interaction node in the multi-round questioning and answering flow module. Specifically, the modification information includes: adding, deleting and/or adjusting a knowledge point corresponding to the interaction node.

Figure 20:
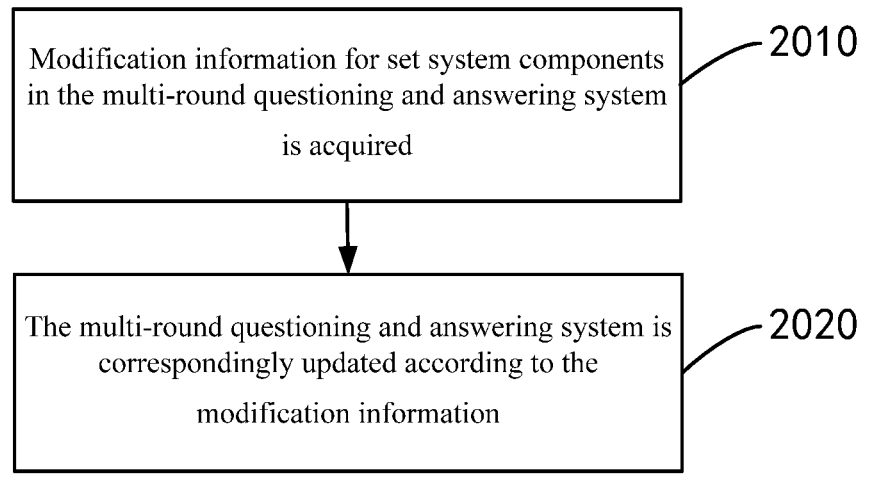
FIG. 20 is a flowchart of a method for modifying a multi-round questioning and answering system according to an embodiment of the present invention.

By the technical solutions in this embodiment of the present invention, a multi-round questioning and answering system update module used for updating a multi-round questioning and answering system when a knowledge point corresponding to a set interaction node in the multi-round questioning and answering flow module is modified is provided, so that the flow designer can conveniently realize the modification to a knowledge point corresponding to a set interaction node, even he/she is not good at code writing. The workload of the developers is minimized FIG. 20 is a flowchart of the method for modifying a multi-round questioning and answering system according to another embodiment of the present invention. As shown in FIG. 20, the modification method in this embodiment is based on the multi-round questioning and answering system described above. This embodiment is suitable for modifying the already successfully generated multi-round questioning and answering system. The method may be realized by a device for modifying the multi-round questioning and answering system. The device may be implemented by software and/or hardware, which may generally be integrated into a terminal apparatus or server for modifying the multi-round questioning and answering system. The terminal apparatus or server is directly or indirectly connected to a knowledge base.

The multi-round questioning and answering system includes: the multi-round questioning and answering flow module corresponding to a multi-round questioning and answering flowchart, the multi-round questioning and answering flowchart including multiple graphic components, each of the graphic components including multiple interaction nodes; one or more knowledge points stored in the knowledge base and corresponding to each of the interaction nodes in the multi-round questioning and answering flowchart, a knowledge point corresponding to the interaction node including an interaction question used for being compared with the received user interaction information and an interaction answer used for determining a next proceeding trend for the multi-round questioning and answering flow module;

and a thematic knowledge point stored in the knowledge base, the thematic knowledge point including a thematic question and a thematic answer, wherein the thematic question is used for representing a trigger condition for the multi-round questioning and answering flow module matching with the multi-round questioning and answering system and the thematic answer is used for establishing a trigger relationship between the thematic knowledge point and the multi-round questioning and answering flow module. The method for modifying the multi-round questioning and answering system specifically includes the following steps.

Step 2010: Modification information for set system components in the multi-round questioning and answering system is acquired.

In this embodiment, the system components may include a thematic knowledge point corresponding to the multi-round questioning and answering system, a multi-round questioning and answering flow module corresponding to the multi-round questioning and answering system, or one or more knowledge points corresponding to an interaction node in the multi-round questioning and answering flow module.

The modification information includes any one or any combination of the following: modifying a thematic knowledge point corresponding to the multi-round questioning and answering system, modifying a multi-round questioning and answering flow module corresponding to the multi-round questioning and answering system, and modifying knowledge points corresponding to a set interaction node in the multi-round questioning and answering flow module.

Step 2020: The multi-round questioning and answering system is correspondingly updated according to the modification information.

In this embodiment, the multi-round questioning and answering system is correspondingly updated in different ways according to different modification information for different system components.

For example, if the modification information is to adjust a thematic knowledge point corresponding to the multi-round questioning and answering system, the thematic knowledge point in the knowledge base can be correspondingly updated directly according to the modified thematic question and/or thematic answer; and if the modification information is to delete a thematic knowledge point corresponding to the multi-round questioning and answering system, the thematic knowledge point can be deleted from the knowledge base.

This embodiment of the present invention provides a method for modifying the multi-round questioning and answering system. By acquiring modification information for set system components in the multi-round questioning and answering system, the modification information including any one or any combination of the following: modifying a thematic knowledge point corresponding to the multi-round questioning and answering system, modifying a multi-round questioning and answering flow module corresponding to the multi-round questioning and answering system, and modifying knowledge points corresponding to a set interaction node in the multi-round questioning and answering flow module, and correspondingly updating the multi-round questioning and answering system according to the modification information, a specific way of modifying the multi-round questioning and answering system is provided. The user's demands for modification to the multi-round questioning and answering system are greatly satisfied, the existing methods for modifying the multi-round questioning and answering system are optimized, the accuracy and convenience of modifying the multi-round questioning and answering system are improved, the quick modification and update to the multi-round questioning and answering system is realized, the introduction of developers during the modification to the multi-round questioning and answering system is avoided, and the workload of the developers is greatly decreased.

Figure 21:
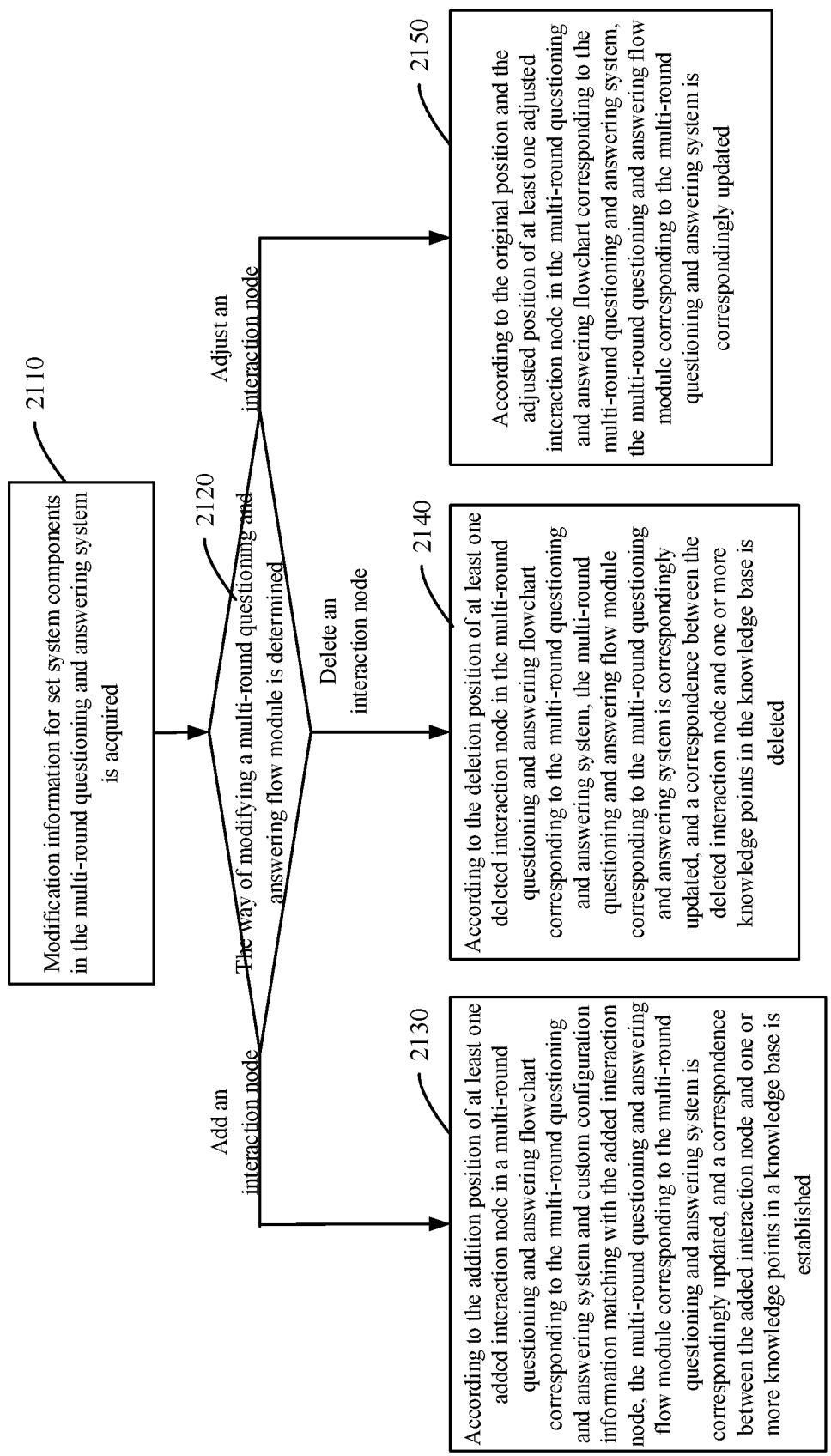
FIG. 21 is a flowchart of the method for modifying a multi-round questioning and answering system according to another embodiment of the present invention.

FIG. 21 is a flowchart of the method for modifying a multi-round questioning and answering system according to yet another embodiment of the present invention. As shown in FIG. 21, this embodiment is optimized based on the above embodiment. In this embodiment, the operation of updating the multi-round questioning and answering system when the modification content is modification to a multi-round questioning and answering flow module corresponding to a multi-round questioning and answering system is further subdivided. Correspondingly, the method in this embodiment of the present invention includes the following steps.

Step 2110: Modification information for set system components in the multi-round questioning and answering system is acquired.

The modification information specifically includes modification to a multi-round questioning and answering flow module corresponding to a multi-round questioning and answering system. Specifically, modification to a multi-round questioning and answering flow module corresponding to a multi-round questioning and answering system may include: adding, deleting and/or adjusting interaction nodes in the multi-round questioning and answering flow module.

Generally, the flow designer is not a developer, so he/she is unable to directly complete the modification to a multi-round questioning and answering flow module (i.e., implementation codes). Correspondingly, a correspondence between a multi-round questioning and answering flowchart and a multi-round questioning and answering flow module may be established in advance, and the modification to the multi-round questioning and answering flow module is correspondingly acquired by acquiring the modification to the multi-round questioning and answering flowchart.

Step 2120: The way of modifying a multi-round questioning and answering flow module is determined: if it is to add an interaction node, a step 2130 is executed; if it is to delete an interaction node, a step 2140 is executed; and if it is to adjust an interaction node, a step 2150 is executed.

Step 2130: According to the addition position of at least one added interaction node in a multi-round questioning and answering flowchart corresponding to the multi-round questioning and answering system and custom configuration information matching with the added interaction node, the multi-round questioning and answering flow module corresponding to the multi-round questioning and answering system is correspondingly updated, and a correspondence between the added interaction node and one or more knowledge points in a knowledge base is established.

Step 2140: According to the deletion position of at least one deleted interaction node in the multi-round questioning and answering flowchart corresponding to the multi-round questioning and answering system, the multi-round questioning and answering flow module corresponding to the multi-round questioning and answering system is correspondingly updated, and a correspondence between the deleted interaction node and one or more knowledge points in the knowledge base is deleted.

In one optional implementation of this embodiment, the step of deleting a correspondence between the deleted interaction node and one or more knowledge points in the knowledge base may include:

searching, in the knowledge base, one or more knowledge points corresponding to the deleted node as a to-be-deleted knowledge point; if it is determined that the to-be-deleted knowledge point corresponds to only the deleted interaction node, deleting the to-be-deleted knowledge point from the knowledge base, and deleting the correspondence between the deleted interaction node and the to-be-deleted knowledge point; and if it is determined that the to-be-deleted knowledge point also corresponds to other interaction nodes in addition to the deleted interaction node, reserving the to-be-deleted knowledge point in the knowledge base, and deleting only the correspondence between the deleted interaction node and the to-be-deleted knowledge point.

Step 2150: According to the original position and the adjusted position of at least one adjusted interaction node in the multi-round questioning and answering flowchart corresponding to the multi-round questioning and answering system, the multi-round questioning and answering flow module corresponding to the multi-round questioning and answering system is correspondingly updated.

By the technical solutions in this embodiment of the present invention, a method for updating the multi-round questioning and answering system when the multi-round questioning and answering flow module corresponding to the multi-round questioning and answering system is modified is provided, so that the flow designer can conveniently realize the modification to the multi-round questioning and answering flow module, even he/she is not good at code writing. The workload of the developers is minimized.

Based on the above embodiments, the modifying the multi-round questioning and answering flow module corresponding to the multi-round questioning and answering system may include: adding, deleting and/or adjusting broadcast nodes and/or connectors of the multi-round questioning and answering flow module. Accordingly, correspondingly updating the multi-round questioning and answering system according to the modification information may include:

correspondingly updating, according to the addition position of at least one added broadcast node and/or added connector in the multi-round questioning and answering flowchart corresponding to the multi-round questioning and answering system and custom configuration information matching with the added broadcast node and/or the added connector, the multi-round questioning and answering flow module corresponding to the multi-round questioning and answering system;

correspondingly updating, according to the deletion position of at least one deleted broadcast node and/or deleted connector in the multi-round questioning and answering flowchart corresponding to the multi-round questioning and answering system, the multi-round questioning and answering flow module corresponding to the multi-round questioning and answering system; and correspondingly updating, according to the original position and the adjusted position of at least one adjusted broadcast node and/or adjusted connector in the multi-round questioning and answering flowchart corresponding to the multi-round questioning and answering system, the multi-round questioning and answering flow module corresponding to the multi-round questioning and answering system.

In this way, a method for updating the multi-round questioning and answering system when the multi-round questioning and answering flow module corresponding to the multi-round questioning and answering system is modified is provided, so that the flow designer can conveniently realize the modification to the multi-round questioning and answering flow module, even he/she is not good at code writing. The workload of the developers is minimized.

Figure 22:
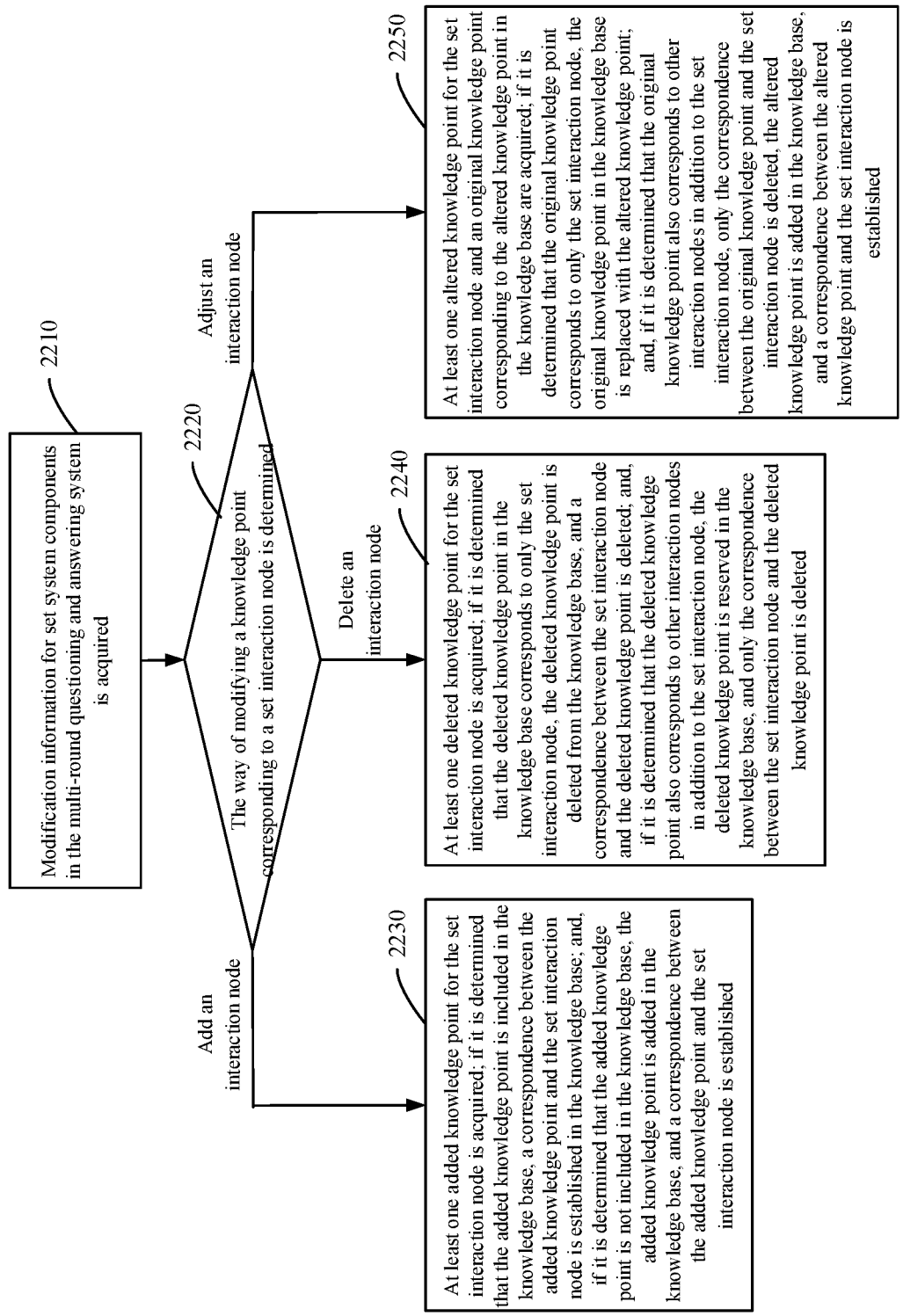
FIG. 22 is a flowchart of the method for modifying a multi-round questioning and answering system according to yet another embodiment of the present invention.

FIG. 22 is a flowchart of the method for modifying a multi-round questioning and answering system according to yet another embodiment of the present invention. As shown in FIG. 22, this embodiment is optimized based on the above embodiment. In this embodiment, the operation of updating the multi-round questioning and answering system when the modification content is modification to a knowledge point corresponding to a set interaction node in the multi-round questioning and answering flow module is further subdivided. Correspondingly, the method in this embodiment of the present invention includes the following steps.

Step 2210: Modification information for set system components in the multi-round questioning and answering system is acquired.

In this embodiment, modification information for set system components in the multi-round questioning and answering system specifically includes modification to a knowledge point corresponding to a set interaction node in the multi-round questioning and answering flow module. Specifically, the modification information includes: adding, deleting and/or adjusting a knowledge point corresponding to an interaction node.

Step 2220: The way of modifying a knowledge point corresponding to a set interaction node is determined: if it is to add a knowledge point, a step 2230 is executed; if it is to delete a knowledge point, a step 2240 is executed; and if it is to adjust a knowledge point, a step 2250 is executed.

Step 2230: At least one added knowledge point for the set interaction node is acquired; if it is determined that the added knowledge point is included in the knowledge base, a correspondence between the added knowledge point and the set interaction node is established in the knowledge base; and, if it is determined that the added knowledge point is not included in the knowledge base, the added knowledge point is added in the knowledge base, and a correspondence between the added knowledge point and the set interaction node is established.

Step 2240: At least one deleted knowledge point for the set interaction node is acquired; if it is determined that the deleted knowledge point in the knowledge base corresponds to only the set interaction node, the deleted knowledge point is deleted from the knowledge base, and a correspondence between the set interaction node and the deleted knowledge point is deleted; and, if it is determined that the deleted knowledge point also corresponds to other interaction nodes in addition to the set interaction node, the deleted knowledge point is reserved in the knowledge base, and only the correspondence between the set interaction node and the deleted knowledge point is deleted.

Step 2250: At least one altered knowledge point for the set interaction node and an original knowledge point corresponding to the altered knowledge point in the knowledge base are acquired; if it is determined that the original knowledge point corresponds to only the set interaction node, the original knowledge point in the knowledge base is replaced with the altered knowledge point; and, if it is determined that the original knowledge point also corresponds to other interaction nodes in addition to the set interaction node, only the correspondence between the original knowledge point and the set interaction node is deleted, the altered knowledge point is added in the knowledge base, and a correspondence between the altered knowledge point and the set interaction node is established.

By the technical solutions in this embodiment of the present invention, a method for updating a multi-round questioning and answering system when a knowledge point corresponding to a set interaction node in the multi-round questioning and answering flow module is modified is provided, so that the flow designer can conveniently realize the modification to a knowledge point corresponding to a set interaction node, even he/she is not good at code writing. The workload of the developers is minimized.

Figure 23:
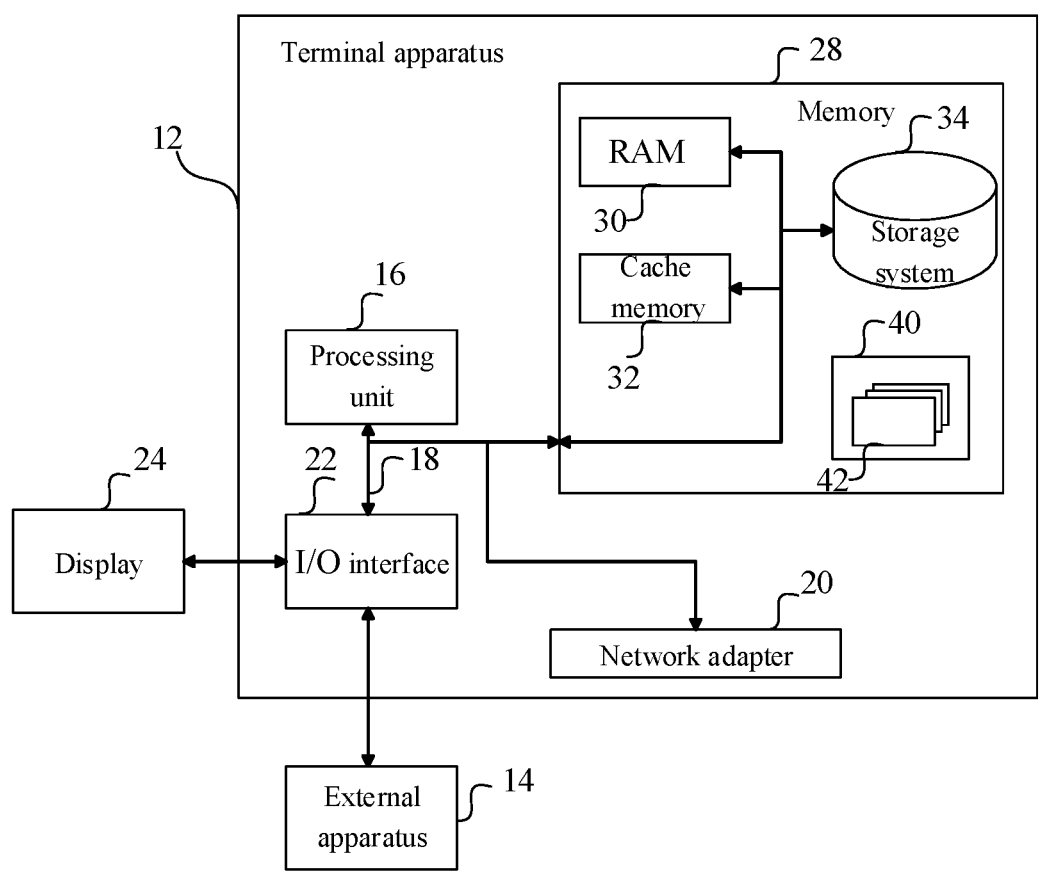
FIG. 23 is a schematic structure diagram of a computer apparatus according to an embodiment of the present invention.

FIG. 23 is a schematic structure diagram of a computer apparatus according to an embodiment of the present invention. Referring to FIG. 23, a block diagram of an exemplary computer apparatus 12 used to perform the implementations of the present invention. The computer apparatus 12 shown in FIG. 23 is only exemplary and shall not form any limitation to the functions and the application scope of the embodiments of the present invention.

As shown in FIG. 23, the computer apparatus 12 shows up as a computing apparatus. The components of the computer apparatus 12 may include, but not limited to, one or more processors or processing units 16, a system memory 28, and a bus 18 for connecting different system components (including the system memory 28 and the processing unit 16).

The bus 18, representing one or more of several bus structures, includes a memory bus or memory controller, a peripheral bus, an accelerated graphics port, a processor, or a local bus using any one of the several bus structures. For example, these architectures include, but not limited to, Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer apparatus 12 typically includes a variety of computer system readable media. Such media may be any available media that is accessible by the computer apparatus 12, including both volatile and non-volatile media, removable and non-removable media.

The system memory 28 may include computer system readable media in the form of volatile memory, such as a random access memory (RAM) 30 and/or a cache memory 32. The computer apparatus 12 may further include other removable/non-removable, volatile/non-volatile computer system storage media. By way of example only, a storage system 34 can be provided for reading from and writing to non-removable, non-volatile magnetic media (not shown in FIG. 23, typically called "hard drive"). Although not shown in FIG. 23, a magnetic disk drive for reading from and writing to a removable, non-volatile magnetic disk (e.g., a "floppy disk"), and an optical disk drive for reading from or writing to a removable, non-volatile optical disk (e.g., a CD-ROM, DVD-ROM or other optical media) can be provided. In such instances, each can be connected to the bus 18 by one or more data media interfaces. The memory 28 may include at least one program product having a set (e.g., at least one) of program modules that are configured to carry out the functions of embodiments of the present invention.

A program/utility 40, having a set (at least one) of program modules 42, may be stored in the memory 28. Such program modules 42 include, but not limited to, an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the present invention as described herein.

The computer apparatus 12 may also communicate with one or more external devices 14 (e.g., a keyboard, a pointing device, a display 24, etc.); one or more devices that enable a user to interact with the computer apparatus 12; and/or any devices (e.g., network card, modem, etc.) that enable the computer apparatus 12 to communicate with one or more other computing devices. Such communication may occur via Input/Output (I/O) interfaces 22. Still yet, the computer apparatus 12 can communicate with one or more networks (e.g., a local area network (LAN), a general wide area network (WAN), and/or a public network (e.g., the Internet)) through a network adapter 20. As depicted, the network adapter 20 communicates with the other components of the computer apparatus 12 through the bus 18. It should be understood that, although not shown in FIG. 23, other hardware and/or software components could be used in conjunction with the computer apparatus 12, including, but not limited to, microcode, device drivers, redundant processing units, external disk drive arrays, RAID systems, tape drives, and data archival storage systems, etc.

The processing unit 16 executes, by running the programs stored in the system memory 28, various functional applications and data processing, for example, the methods provided in the embodiments of the present invention.

In an embodiment, the present invention provides a computer readable storage medium having computer programs stored thereon that, when executed by a processor, implement the methods provided in the embodiments of the present invention.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any combination of the foregoing. More specific examples (a non-exhaustive list) of the computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in any combination of one or more programming languages, including object oriented programming languages such as Java, Smalltalk, C++, and conventional procedural programming languages such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of networks, including a local area network (LAN) or a wide area network (WAN), or the connection may be made to an external computer (for example, through the Internet using an Internet Service Provider).

The foregoing descriptions are merely preferred embodiments of the present invention and not intended to limit the present invention. Any modifications, equivalent replacements or the like made without departing from the spirit and principle of the present invention shall be regarded as falling into the protection scope of the present invention.

What is claimed is:

1. A multi-round questioning and answering method, applied to a multi-round questioning and answering system, comprising steps of:
    acquiring initial request information input by an interactive user, and matching the initial request information with a knowledge point in a knowledge base, wherein the knowledge base comprises multiple knowledge points and each knowledge point comprises a question and an answer;
    if it is determined that the initial request information input by the interactive user matches with a thematic question in a thematic knowledge point, triggering, according to a thematic answer in the thematic knowledge point, a root node of a multi-round questioning and answering flow module corresponding to the thematic knowledge point, the multi-round questioning and answering flow module comprising multiple layers of interaction nodes, the multiple layers of interaction nodes comprising a first interaction node, the multi-round questioning and answering flow module corresponding to a multi-round questioning and answering flowchart; and
    performing questioning and answering interaction with the interactive user according to the first interaction node to which the multi-round questioning and answering flow module is proceeded, one or more knowledge points corresponding to the first interaction node stored in the knowledge base and user interaction information input for the first interaction node by the interactive user.

2. The method according to claim 1, wherein the multi-round questioning and answering system comprises:
the multi-round questioning and answering flowchart comprising multiple graphic components, each of the graphic components comprising multiple interaction nodes;
one or more knowledge points stored in the knowledge base and corresponding to each of the interaction nodes in the multi-round questioning and answering flowchart, the knowledge point corresponding to the interaction node comprising an interaction question used for being compared with the received user interaction information and an interaction answer used for determining a next proceeding trend for the multi-round questioning and answering flow module; and
a thematic knowledge point stored in the knowledge base, the thematic knowledge point comprising a thematic question and a thematic answer, wherein the thematic question is used for representing a trigger condition for the multi-round questioning and answering flow module matching with the multi-round questioning and answering system and the thematic answer is used for establishing a trigger relationship between the thematic knowledge point and the multi-round questioning and answering flow module.

3. The method according to claim 2, wherein the multi-round questioning and answering flowchart corresponding to the multi-round questioning and answering flow module comprises:
a standardized code framework, which is generated according to the graphic components in the multi-round questioning and answering flowchart and matching with the multi-round questioning and answering flowchart; and
custom codes, which are generated according to custom configuration information matching with the graphic components in the multi-round questioning and answering flowchart, correspond to the graphic components, and are added at positions associated with the graphic components in the standardized code framework.

4. The method according to claim 3, wherein the custom configuration information comprises:
interrupt options corresponding to the interaction nodes;
wherein, when the multi-round questioning and answering flow module is proceeded to an interaction node at which an interrupt function is activated, and if the user interaction information is received before broadcasting of the broadcast content corresponding to the interaction node ends, the broadcasting of the broadcast content is stopped.

5. The method according to claim 2, wherein the step of performing questioning and answering interaction with the interactive user according to a first interaction node to which the multi-round questioning and answering flow module is proceeded currently, one or more knowledge points corresponding to the first interaction node stored in the knowledge base and user interaction information input for the first interaction node by the interactive user comprises:
acquiring user interaction information input for the first interaction node by the user;
matching the user interaction information with interaction questions in one or more knowledge points corresponding to the first interaction node;
if the user interaction information successfully matches with an interaction question, returning the interaction answer corresponding to the successfully matched knowledge point to the multi-round questioning and answering flow module so that the multi-round questioning and answering flow module determines a next proceeding trend; and
repeating a process of matching the user interaction information with interaction questions and determining a next proceeding trend, until the multi-round questioning and answering flow module ends or the questioning and answering interaction ends.

6. The method according to claim 5, wherein the step of performing questioning and answering interaction with the interactive user according to a first interaction node to which the multi-round questioning and answering flow module is proceeded currently, one or more knowledge points corresponding to the first interaction node stored in the knowledge base and user interaction information input for the first interaction node by the interactive user further comprises:
if the user interaction information does not match with all of the one or more knowledge points corresponding to the first interaction node and a rejection-preferred function is activated on the first interaction node providing a rejection response to the interactive user and requesting the interactive user to input user interaction information for the first interaction node again; and
upon acquiring new user interaction information, returning to match the user interaction information with interaction questions in one or more knowledge points corresponding to the first interaction node.

7. The method according to claim 5, wherein the step of performing questioning and answering interaction with the interactive user according to a first interaction node to which the multi-round questioning and answering flow module is proceeded currently, one or more knowledge points corresponding to the first interaction node stored in the knowledge base and user interaction information input for the first interaction node by the interactive user further comprises:
if the user interaction information does not match with all of the one or more knowledge points corresponding to the first interaction node and a knowledge-preferred function is activated on the first interaction node, globally searching the received user interaction information in the knowledge base;
if it is determined that the knowledge base includes a knowledge point in which a question matches with the user interaction information, providing the interactive user with an answer corresponding to the knowledge point searched; and
if it is determined that a question in each knowledge point in the knowledge base does not match with the user interaction information, providing a match failure response to the interactive user, requesting the interactive user to input user interaction information for the first interaction node again, and upon acquiring the new user interaction information, returning to match the user interaction information with interaction questions in one or more knowledge points corresponding to the first interaction node.

8. The method according to claim 2, wherein the step of performing questioning and answering interaction with the interactive user according to a first interaction node to which the multi-round questioning and answering flow module is proceeded currently, one or more knowledge points corresponding to the first interaction node stored in the knowledge base and user interaction information input for the first interaction node by the interactive user comprises:

if it is determined that a backtrack function is activated on the first interaction node, acquiring one or more knowledge points respectively corresponding to the first interaction node and upper-layer nodes of the first interaction node stored in the knowledge base; and if it is determined that the received user interaction information matches with the interaction question of the upper-layer node of the first interaction node in the knowledge base, controlling the proceeding of the multi-round questioning and answering flow module to the upper-layer node matched, and returning the interaction answer corresponding to the successfully matched knowledge point to the multi-round questioning and answering flow module so that the multi-round questioning and answering flow module determines a next proceeding trend.

9. The method according to claim 3, wherein the multi-round questioning and answering flow module comprises at least one transaction node; and when the transaction node in the multi-round questioning and answering flow module is triggered successfully, the transaction node constructs transaction information according to at least one dynamic variable input to the transaction node itself, then transmits the transaction information to a corresponding service invocation address, and returns a result of transaction processing fed back by the service invocation address to the multi-round questioning and answering flow module so that the multi-round questioning and answering flow module continues an execution according to the result of transaction processing.

10. The method according to claim 9, wherein the multi-round questioning and answering system further comprises:

a knowledge point stored in the knowledge base and corresponding to the transaction node in the multi-round questioning and answering flow module;

the knowledge point corresponding to the transaction node comprises a transaction question and a transaction answer, and the transaction answer comprises an associated transaction node, a type of at least one incoming parameter, a type of at least one missing parameter, and counter-question content matching with the type of the missing parameter;

the transaction question is used for being compared with the received user input information; and the type of the incoming parameter is used for being compared with the type of a dynamic variable contained in the user input information, the type of the missing parameter and the counter-question content matching with the type of the missing parameter are used for determining the counter-question content corresponding to the type of the missing parameter in the user input information, and the associated transaction node is used for determining a transaction node to which the dynamic variable contained in the user input information is input.

11. The method according to claim 9, wherein the custom configuration information comprises a service invocation address corresponding to the transaction node, the service invocation address pointing to a service interface associated with the transaction node;

the custom configuration information further comprises broadcast content corresponding to a first node;

the first node is connected to the transaction node via a connector and located in the downstream of the transaction node, and the first node comprises a broadcast node or other transaction nodes; and the broadcast content comprises: a result of transaction processing received by the transaction node, a combination of the result of transaction processing received by the transaction node and preset information, or a combination of the result of transaction processing received by the transaction node and a dynamic variable input to the transaction node.

12. The method according to claim 9, wherein the step of constructing, by the transaction node, transaction information according to at least one dynamic variable input to the transaction node itself and transmitting the transaction information to a corresponding service invocation address comprises:

constructing, by the transaction node, transaction information according to at least one dynamic variable input to the transaction node itself and an incoming parameter definition item corresponding to the transaction node, and transmitting the transaction information to a service invocation address matching with the transaction node; and the incoming parameter definition item comprises a name of at least one incoming parameter and an incoming parameter variable matching with the name of incoming parameter, the name of the incoming parameter is a parameter name that can be recognized by a service interface associated with the transaction node, and the incoming parameter variable matches with the dynamic variable input to the transaction node.

13. The method according to claim 9, wherein the step of returning a result of transaction processing fed back by the service invocation address to the multi-round questioning and answering flow module so that the multi-round questioning and answering flow module continues an execution according to the result of transaction processing comprises:

if it is determined that the transaction node is associated with at least two downstream connectors, determining, according to the result of transaction processing and dynamic condition configuration information of each of the downstream connectors, a downstream connector matching with the result of transaction processing; and controlling the proceeding of the multi-round questioning and answering flow module to a downstream node connected to the downstream connector to continue an execution;

wherein the dynamic condition configuration information comprises an outputting parameter definition item and a condition setup value, the outputting parameter definition item matches with at least one result of transaction processing received by the transaction node, and the condition setup value is used for realizing condition comparison with the result of transaction processing in the outputting parameter definition item.

14. A method for generating a multi-round questioning and answering system which executes the multi-round questioning and answering method according to claim 1, comprising steps of:

acquiring one or more graphic multi-round questioning and answering flowcharts;

generating, according to graphic components contained in each of the multi-round questioning and answering flowcharts, a standardized code framework matching with the multi-round questioning and answering flowchart, wherein each of the graphic components comprises multiple interaction nodes;

generating, according to custom configuration information matching with the graphic components in the multi-round questioning and answering flowcharts, custom codes corresponding to the graphic components, adding the custom codes at positions associated with the graphic components in the standardized code frameworks to generate multi-round questioning and answering flow modules corresponding to the multi-round questioning and answering flowcharts;

establishing a correspondence between each of the interaction nodes and one or more knowledge points in a knowledge base, a knowledge point corresponding to the interaction node comprising an interaction question used for being compared with the received user interaction information and an interaction answer used for determining a next proceeding trend for the multi-round questioning and answering flow modules; and adding, in the knowledge base, a thematic knowledge point corresponding to each of the multi-round questioning and answering flow modules, the thematic knowledge point comprising a thematic question used for representing a trigger condition for the multi-round questioning and answering flow module and a thematic answer used for establishing a trigger relationship between the thematic knowledge point and the multi-round questioning and answering flow module.

15. The method according to claim 14, wherein the step of generating, according to graphic components contained in each of the multi-round questioning and answering flowcharts, a standardized code framework matching with the multi-round questioning and answering flowchart comprises:

acquiring a root node in the multi-round questioning and answering flowchart, generating a reference standardized code corresponding to the root node according to a type of the root node, and adding the reference standardized code in an original code framework;

successively acquiring, starting from a next layer of the root node, one node in the multi-round questioning and answering flowchart as a currently traversed node;

acquiring, according to the type of the currently traversed node, an additional standardized code corresponding to the currently traversed node;

correspondingly adding, according to a position of a standardized code of an upper-layer node connected to the currently traversed node via a connector in the original code framework, the additional standardized code in the original code framework;

returning to the operation of successively acquiring, starting from a next layer of the root node, one node in the multi-round questioning and answering flowchart as the currently traversed node, until all nodes in the multi-round questioning and answering flowchart are processed; and using the original code framework obtained after this processing as a standardized code framework matching with the multi-round questioning and answering flowchart.

16. A method for modifying a multi-round questioning and answering system, the multi-round questioning and answering system to be modified executing the multi-round questioning and answering method according to claim 1, comprising steps of:

acquiring modification information for set system components in the multi-round questioning and answering system;

wherein the modification information comprises any one or any combination of the following: modifying a thematic knowledge point corresponding to the multi-round questioning and answering system, modifying a multi-round questioning and answering flow module corresponding to the multi-round questioning and answering system, and modifying knowledge points corresponding to a set interaction node in the multi-round questioning and answering flow module; and correspondingly updating the multi-round questioning and answering system according to the modification information.

17. The method according to claim 16, wherein the modifying a multi-round questioning and answering flow module corresponding to the multi-round questioning and answering system comprises: adding, deleting and/or adjusting interaction nodes in the multi-round questioning and answering flow module; and the step of correspondingly updating the multi-round questioning and answering system according to the modification information comprises:

correspondingly updating, according to the addition position of at least one added interaction node in a multi-round questioning and answering flowchart corresponding to the multi-round questioning and answering system and custom configuration information matching with the added interaction node, the multi-round questioning and answering flow module corresponding to the multi-round questioning and answering system, and establishing a correspondence between the added interaction node and one or more knowledge points in a knowledge base;

correspondingly updating, according to the deletion position of at least one deleted interaction node in the multi-round questioning and answering flowchart corresponding to the multi-round questioning and answering system, the multi-round questioning and answering flow module corresponding to the multi-round questioning and answering system, and deleting a correspondence between the deleted interaction node and one or more knowledge points in the knowledge base; and correspondingly updating, according to the original position and the adjusted position of at least one adjusted interaction node in the multi-round questioning and answering flowchart corresponding to the multi-round questioning and answering system, the multi-round questioning and answering flow module corresponding to the multi-round questioning and answering system.

18. The method according to claim 17, wherein the step of deleting a correspondence between the deleted interaction node and one or more knowledge points in the knowledge base comprises:

searching, in the knowledge base, one or more knowledge points corresponding to the deleted node as a to-be-deleted knowledge point;

if it is determined that the to-be-deleted knowledge point corresponds to only the deleted interaction node, deleting the to-be-deleted knowledge point from the knowledge base, and deleting the correspondence between the deleted interaction node and the to-be-deleted knowledge point; and if it is determined that the to-be-deleted knowledge point also corresponds to other interaction nodes in addition to the deleted interaction node, reserving the to-be-deleted knowledge point in the knowledge base, and deleting only the correspondence between the deleted interaction node and the to-be-deleted knowledge point.

19. The method according to claim 16, wherein the modifying a multi-round questioning and answering flow module corresponding to the multi-round questioning and answering system comprises: adding, deleting and/or adjusting broadcast nodes and/or connectors of the multi-round questioning and answering flow module; and the step of correspondingly updating the multi-round questioning and answering system according to the modification information comprises:

correspondingly updating, according to the addition position of at least one added broadcast node and/or added connector in a multi-round questioning and answering flowchart corresponding to the multi-round questioning and answering system and custom configuration information matching with the added broadcast node and/or the added connector, the multi-round questioning and answering flow module corresponding to the multi-round questioning and answering system;

correspondingly updating, according to the deletion position of at least one deleted broadcast node and/or deleted connector in the multi-round questioning and answering flowchart corresponding to the multi-round questioning and answering system, the multi-round questioning and answering flow module corresponding to the multi-round questioning and answering system; and correspondingly updating, according to the original position and the adjusted position of at least one adjusted broadcast node and/or adjusted connector in the multi-round questioning and answering flowchart corresponding to the multi-round questioning and answering system, the multi-round questioning and answering flow module corresponding to the multi-round questioning and answering system.

20. The method according to claim 16, wherein the modifying knowledge points corresponding to a set interaction node in the multi-round questioning and answering flow module comprises: adding, deleting and/or adjusting knowledge points corresponding to the interaction node; and the step of correspondingly updating the multi-round questioning and answering system according to the modification information comprises:

acquiring at least one added knowledge point for the set interaction node; if it is determined that the added knowledge point is included in the knowledge base, establishing, in the knowledge base, a correspondence between the added knowledge point and the set interaction node; and, if it is determined that the added knowledge point is not included in the knowledge base, adding the added knowledge point in the knowledge base, and establishing a correspondence between the added knowledge point and the set interaction node;

acquiring at least one deleted knowledge point for the set interaction node; if it is determined that the deleted knowledge point in the knowledge base corresponds to only the set interaction node, deleting the deleted knowledge point from the knowledge base, and deleting a correspondence between the set interaction node and the deleted knowledge point; and, if it is determined that the deleted knowledge point also corresponds to other interaction nodes in addition to the set interaction node, reserving the deleted knowledge point in the knowledge base, and deleting only the correspondence between the set interaction node and the deleted knowledge point; and acquiring at least one altered knowledge point for the set interaction node and an original knowledge point corresponding to the altered knowledge point in the knowledge base; if it is determined that the original knowledge point corresponds to only the set interaction node, replacing the original knowledge point in the knowledge base with the altered knowledge point; and, if it is determined that the original knowledge point also corresponds to other interaction nodes in addition to the set interaction node, deleting only the correspondence between the original knowledge point and the set interaction node, adding the altered knowledge point in the knowledge base, and establishing a correspondence between the altered knowledge point and the set interaction node.

* * * * *